(12) United States Patent
Ma

(10) Patent No.: US 12,301,524 B2
(45) Date of Patent: May 13, 2025

(54) METHOD FOR CROSS-APPLICATION INTERCONNECTION BETWEEN DIFFERENT DEVICES AND RELATED APPARATUS

(71) Applicant: Huawei Technologies Co., Ltd., Shenzhen (CN)

(72) Inventor: Zhiwei Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/250,174

(22) PCT Filed: Oct. 22, 2021

(86) PCT No.: PCT/CN2021/125539
§ 371 (c)(1),
(2) Date: Apr. 21, 2023

(87) PCT Pub. No.: WO2022/083722
PCT Pub. Date: Apr. 28, 2022

(65) Prior Publication Data
US 2023/0396571 A1 Dec. 7, 2023

(30) Foreign Application Priority Data

Oct. 22, 2020 (CN) .......................... 202011140974.1
Dec. 31, 2020 (CN) .......................... 202011624842.6

(51) Int. Cl.
*H04L 51/046* (2022.01)
*H04L 51/56* (2022.01)

(52) U.S. Cl.
CPC ............ *H04L 51/046* (2013.01); *H04L 51/56* (2022.05)

(58) Field of Classification Search
CPC .............................. H04L 51/046; H04L 51/56
See application file for complete search history.

(56) References Cited

U.S. PATENT DOCUMENTS 8,443,421 B2   5/2013  Du
9,800,525 B1 * 10/2017  Lerner .................... H04L 51/56
(Continued)

FOREIGN PATENT DOCUMENTS

CN       1633115 A    6/2005
CN     102055732 A    5/2011
(Continued)

OTHER PUBLICATIONS

Ping, W., "Mobile Phone Method to Avoid Repeated RCS Receives the Message," Chongqing Key Lab of Mobile Communications Technology, Chongqing University of Post and Communications, Jan. 2017, 3 pages (English Abstract).

*Primary Examiner* — Azizul Choudhury
(74) *Attorney, Agent, or Firm* — Slater Matsil, LLP

(57) ABSTRACT

In an embodiment a method includes displaying, by a first terminal of a communication system, a first interface of a first instant messaging application, wherein the first interface comprises a second user, the second user being a user registered with a second instant messaging application on a second terminal of the communication system, and wherein the first instant messaging application and the second instant messaging application are different applications, initiating, by the first instant messaging application, a first communication to the second user in response to a first operation in the first interface, wherein the first communication comprises a video call, a voice call, or a message, and displaying, by the second terminal, a second interface of the second instant messaging application, wherein the first communication from a first user is displayed in the second interface, and wherein the first user is a user registered with the first instant messaging application on the first terminal.

17 Claims, 37 Drawing Sheets

(56) References Cited

U.S. PATENT DOCUMENTS

| | | | |
|---|---|---|---|
| 10,019,133 B1* | 7/2018 | McNeill | H04L 51/56 |
| 10,454,856 B2 | 10/2019 | Tao et al. | |
| 10,637,805 B2 | 4/2020 | Wang et al. | |
| 11,050,691 B1* | 6/2021 | DePue | H04W 12/062 |
| 11,171,906 B1* | 11/2021 | Ledet | H04L 51/18 |
| 11,243,685 B2* | 2/2022 | Witkowski | G06F 3/04883 |
| 2001/0025280 A1 | 9/2001 | Mandato et al. | |
| 2006/0020708 A1 | 1/2006 | Hsieh et al. | |
| 2012/0210253 A1* | 8/2012 | Luna | H04L 51/04 |
| | | | 715/753 |
| 2014/0287821 A1 | 9/2014 | Barclay et al. | |
| 2016/0313877 A1* | 10/2016 | Ha | G06F 3/04842 |
| 2017/0041259 A1 | 2/2017 | Tao et al. | |
| 2017/0060396 A1* | 3/2017 | Lewis | G06F 3/0488 |
| 2017/0093781 A1* | 3/2017 | Sharma | H04L 51/56 |
| 2019/0391858 A1* | 12/2019 | Studnicka | G06Q 20/227 |
| 2020/0092234 A1 | 3/2020 | Yang | |
| 2020/0259826 A1* | 8/2020 | Marrone | H04L 63/0861 |
| 2020/0304444 A1 | 9/2020 | Aneja et al. | |
| 2022/0345563 A1 | 10/2022 | Ma | |

FOREIGN PATENT DOCUMENTS

| | | |
|---|---|---|
| CN | 102202015 A | 9/2011 |
| CN | 103973545 A | 8/2014 |
| CN | 105553829 A | 5/2016 |
| CN | 106470145 A | 3/2017 |
| CN | 106559314 A | 4/2017 |
| CN | 107613091 A | 1/2018 |
| CN | 108111405 A | 6/2018 |
| CN | 108737241 A | 11/2018 |
| CN | 109194818 A | 1/2019 |
| CN | 110035004 A | 7/2019 |
| CN | 110752980 A | 2/2020 |
| CN | 111130986 A | 5/2020 |
| EP | 2587746 A1 | 5/2013 |
| WO | 2017054510 A1 | 4/2017 |
| WO | 2021052204 A1 | 3/2021 |

* cited by examiner

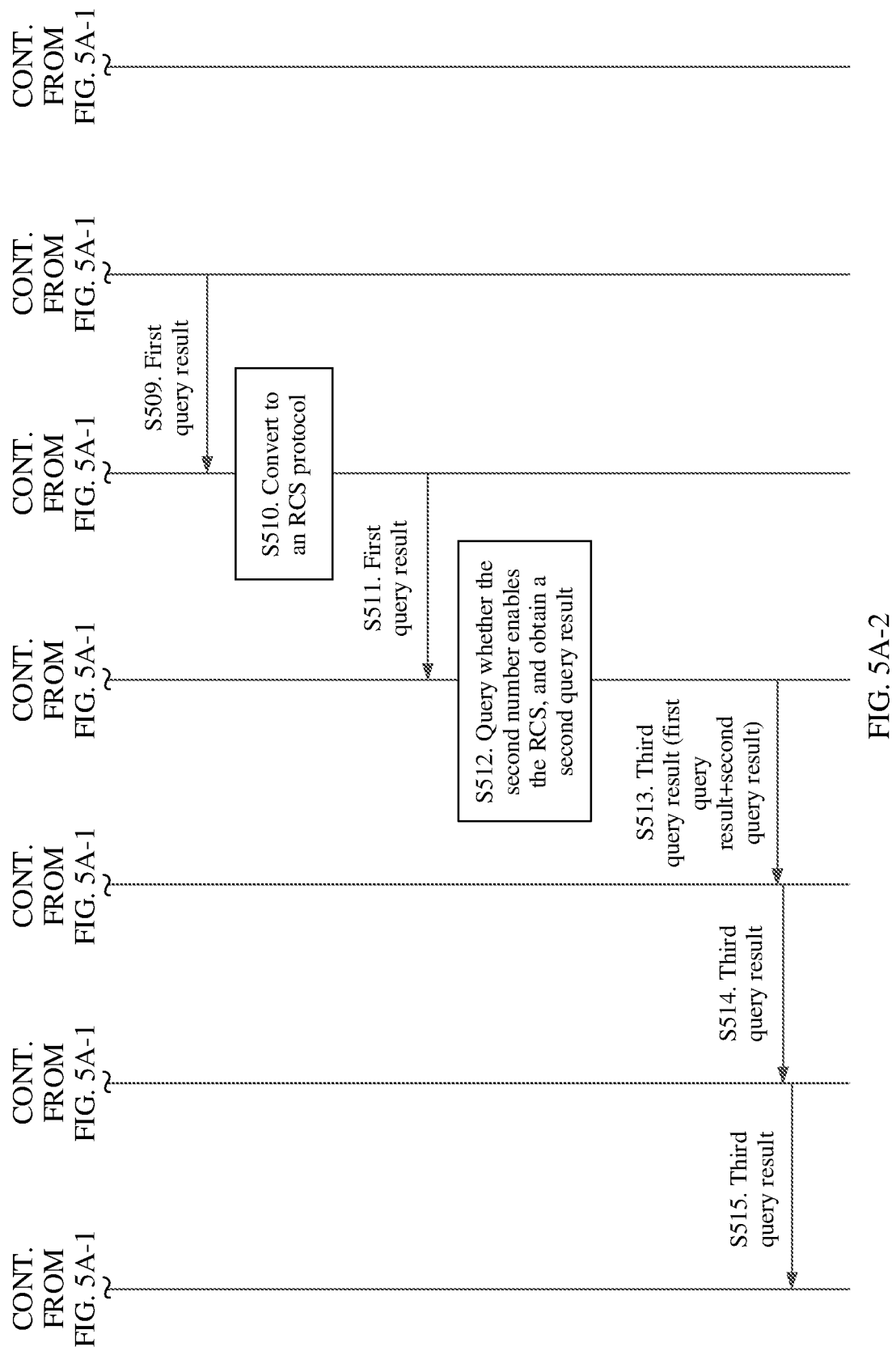

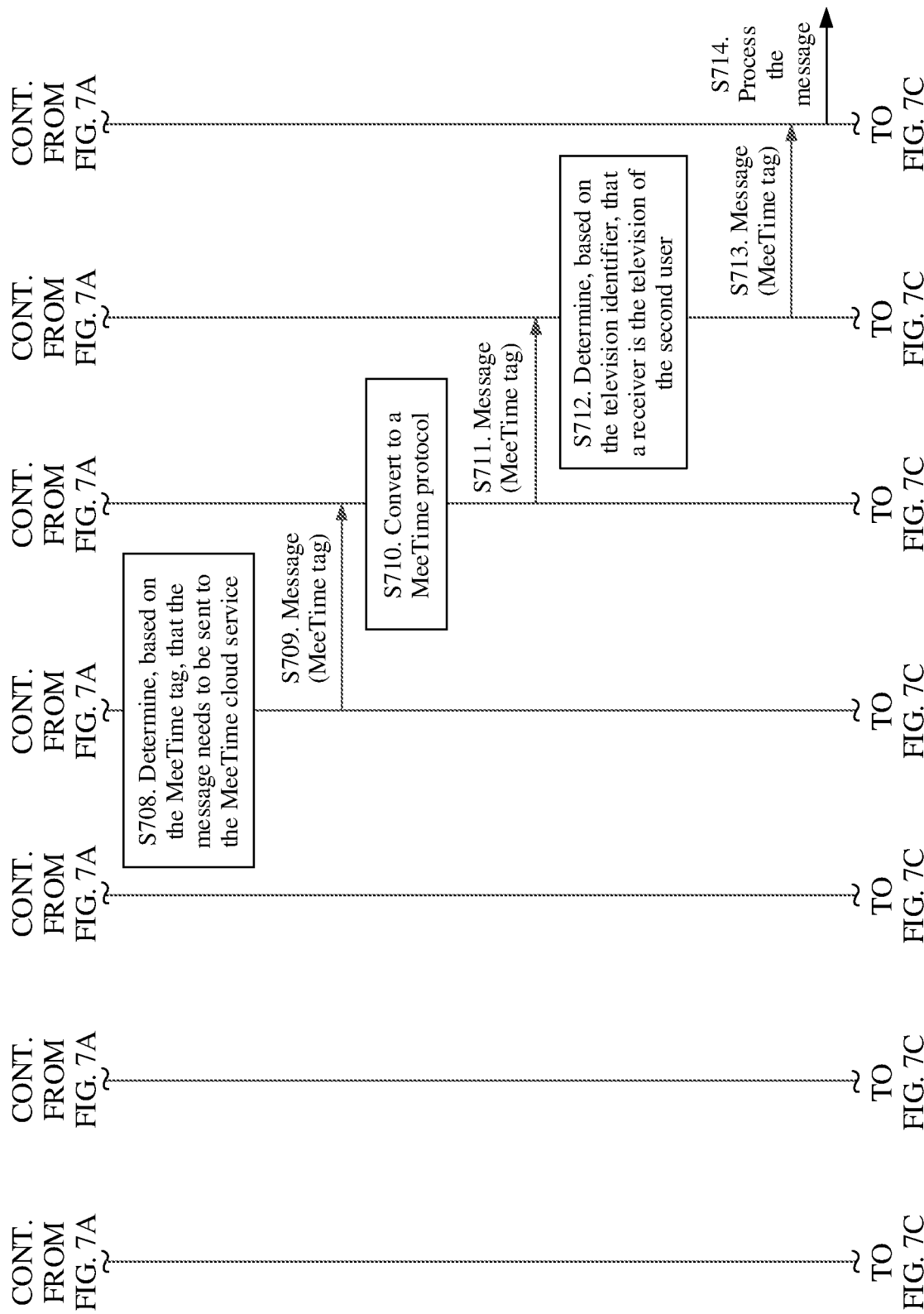

METHOD FOR CROSS-APPLICATION INTERCONNECTION BETWEEN DIFFERENT DEVICES AND RELATED APPARATUS

CROSS-REFERENCE TO RELATED APPLICATIONS

This application is a national stage of International Application No. PCT/CN2021/125539, filed on Oct. 22, 2021, which claims priority to Chinese Patent Application No. 202011624842.6, filed on Dec. 31, 2020 and Chinese Patent Application No. 202011140974.1, filed on Oct. 22, 2020. All of the aforementioned applications are hereby incorporated by reference in their entirety.

TECHNICAL FIELD

This application relates to the field of terminal technologies, and in particular, to a method for cross-application interconnection between different devices and a related apparatus.

BACKGROUND

As instant messaging applications increasingly vary, people communicate with family members and friends by using various instant messaging applications. Usually, two terminal devices need to use a same instant messaging application to perform instant messaging. Take a Huawei MeeTime application as an example. A user A can communicate with a user B through the MeeTime application when the MeeTime application is installed on a terminal of the user A and a terminal of the user B. This manner has a limitation that the terminal of the user A and the terminal of the user B need to have the same instant messaging application. How to overcome this limitation is a problem to be resolved.

SUMMARY

This application provides a method for cross-application interconnection between different devices and a related apparatus, to improve communication convenience.

According to a first aspect, a method for cross-application interconnection between different devices is provided, where the method is applied to a communication system including a first terminal and a second terminal. The method includes: The first terminal displays a first interface of a first instant messaging application on the first terminal, where the first interface includes a second user, the second user is a user registering with a second instant messaging application on the second terminal, and the first instant messaging application and the second instant messaging application are different applications; the first instant messaging application initiates first communication behavior to the second user in response to a first operation in the first interface, where the first communication behavior includes making a video call, making a voice call, or sending a message; and the second terminal displays a second interface of the second instant messaging application, where the first communication behavior from a first user is displayed in the second interface, and the first user is a user registering with the first instant messaging application on the first terminal.

In other words, interconnection can be achieved between different instant messaging applications on the two terminals, to provide convenience for communication.

The first instant messaging application may be pre-installed on the first terminal before delivery of the first terminal, or may be downloaded by a user and installed on the first terminal after the first terminal is purchased by the user after delivery. A relationship between the second instant messaging application and the second terminal may be the same.

In a possible design, the first interface is a first chat interface for chat with the second user, the first operation is an operation of sending a message to the second user in the first chat interface, the first communication behavior is behavior of sending a message to the second user, the second interface is a second chat interface for chat with the first user, and the second chat interface includes a message sent by the first user.

In other words, messages can be sent between different instant messaging applications on the two terminals. It is convenient to perform communication.

In a possible design, the first interface is an address book interface of the first instant messaging application, the first operation is an operation of initiating a voice call or a video call to the second user in the address book interface, the first communication behavior is behavior of initiating a voice call or a video call to the second user, and the second interface is an interface in which an incoming voice call or an incoming video call from the first user is displayed.

In other words, video calls and voice calls can be made between different instant messaging applications on the two terminals. It is convenient to perform communication.

In a possible design, the method further includes: The first instant messaging application queries whether the second user registers with or enables the second instant messaging application; and the first terminal displays a first mark in the first interface when the first instant messaging application determines that the second user registers with or enables the second instant messaging application, where the first mark indicates that the second user registers with or enables the second instant messaging application.

In other words, the first instant messaging application on the first terminal can query whether the second user registers with or enables the second instant messaging application. If yes, the first instant messaging application on the first terminal can connect to and communicate with the second instant messaging application on the second terminal. It is convenient to perform communication.

In a possible design, the second user is a user registering with a third instant messaging application on the second terminal; the third instant messaging application and the first instant messaging application are a same application; a switch button is displayed in the first interface; when the switch button is in a first state, the first instant messaging application is configured to initiate communication behavior to the third instant messaging application on the second terminal; and when the switch button is in a second state, the first instant messaging application is configured to initiate communication behavior to the second instant messaging application on the second terminal; and before that the first instant messaging application initiates first communication behavior to the second user in response to a first operation in the first interface, the method further includes: determining that the switch button is in the second state.

In other words, the first instant messaging application on the first terminal can communicate with the third instant messaging application on the second terminal, or communicate with the second instant messaging application on the second terminal. It is convenient to perform communication.

In a possible design, the communication system further includes a first server, a second server, and a third server, the first server is a server corresponding to the first instant messaging application, the first server supports a first communication protocol, the second server is a server corresponding to the second instant messaging application, the second server supports a second communication protocol, and the third server is connected to the first server and the second server; and that the first instant messaging application initiates first communication behavior to the second user in response to a first operation in the first interface includes:

The first instant messaging application sends first communication information to the first server in response to the first operation, where the first communication information includes a video call request, a voice call request, or a message, and the first communication information supports the first communication protocol;

the first server sends the first communication information to the third server;

the third server performs protocol conversion on the first communication information to obtain second communication information that supports the second communication protocol;

the third server sends the second communication information to the second server; and the second server sends the second communication information to the second terminal.

In other words, the first server corresponding to the first instant messaging application can communicate with the second server corresponding to the second instant messaging application. In this way, communication between the first instant messaging application and the second instant messaging application is achieved.

In a possible design, the communication system further includes the first server, the second server, and the third server, the first server is a server corresponding to the first instant messaging application, the first server supports the first communication protocol, the second server is the server corresponding to the second instant messaging application, the second server supports the second communication protocol, and the third server is connected to the first server and the second server; and that the first instant messaging application queries whether the second user registers with or enables the second instant messaging application includes:

The first instant messaging application sends a first query request to the first server, where the first query request carries identification information of the second user, the first query request is used to request to query whether the second user registers with or enables the second instant messaging application, and the first query request supports the first communication protocol;

the first server sends the first query request to the third server;

the third server performs protocol conversion on the first query request to obtain a second query request that supports the second communication protocol;

the third server sends the second query request to the second server;

the second server determines, based on the second query request, whether the second user registers with or enables the second instant messaging application;

the second server sends a first query result to the third server, where the first query result supports the second communication protocol;

the third server performs protocol conversion on the first query result to obtain a second query result that supports the first communication protocol;

the third server sends the second query result to the first server; and the first server sends the second query result to the first terminal.

In other words, the first server corresponding to the first instant messaging application can communicate with the second server corresponding to the second instant messaging application, and therefore, the first instant messaging application can query whether the second user registers with or enables the second instant messaging application.

In a possible design, the method further includes at least one of the following:

The first instant messaging application is an application that supports the first communication protocol, the second instant messaging application is an application that supports the second communication protocol, the first server is a server that supports the first communication protocol, the second server is a server that supports the second communication protocol, the first communication protocol is a MeeTime protocol, and the second communication protocol is an RCS protocol; or the method further includes at least one of the following:

The first instant messaging application is an application that supports the first communication protocol, the second instant messaging application is an application that supports the second communication protocol, the first server is a server that supports the first communication protocol, the second server is a server that supports the second communication protocol, the first communication protocol is an RCS protocol, and the second communication protocol is a MeeTime protocol; or the method further includes at least one of the following:

The first instant messaging application is a MeeTime application, the second instant messaging application is an RCS application, the first server is a MeeTime server, the second server is an RCS server, the first communication protocol is a MeeTime protocol, and the second communication protocol is an RCS protocol; or the method further includes at least one of the following:

The first instant messaging application is an RCS application, the second instant messaging application is a MeeTime application, the first server is an RCS server, the second server is a MeeTime server, the first communication protocol is an RCS protocol, and the second communication protocol is a MeeTime protocol.

The foregoing is merely an example of the first instant messaging application and the second instant messaging application. Another instant messaging application may be alternatively used. This is not limited in this embodiment of this application.

In a possible design, the first instant messaging application is the RCS application, the second instant messaging application is the MeeTime application, and the method further includes:

displaying, in the first interface, device identifiers of a plurality of devices corresponding to the second user, where the second user registers with MeeTime applications on the plurality of devices; and before that the first instant messaging application initiates first communication behavior to the second user in response to a first operation in the first interface, the method further includes: selecting a first device identifier from the plurality of device identifiers, where a device corresponding to the first device identifier is the second terminal.

In other words, the RCS application on the first terminal can query the device identifiers of the plurality of devices on which the second user registers with the MeeTime applications, such as a television and a mobile phone. In this way, the first user of the first terminal may select a device (for example, a television) in the plurality of devices corresponding to the second user for communication. That is, the first user interconnects and communicates with all-scenario devices of the second user by using the RCS application on the first terminal.

In a possible design, the communication system further includes the first server, the second server, and the third server, the first server is a server corresponding to the first instant messaging application, the first server supports the first communication protocol, the second server is the server corresponding to the second instant messaging application, the second server supports the second communication protocol, and the third server is connected to the first server and the second server; and before the device identifiers of the plurality of devices corresponding to the second user are displayed in the first interface, the method further includes:

The first instant messaging application sends a third query request to the first server, where the third query request carries the identification information of the second user, the third query request is used to request to query a device on which the second user registers with or enables the MeeTime application, and the third query request supports the first communication protocol;

the first server sends the third query request to the third server;

the third server performs protocol conversion on the third query request to obtain a fourth query request that supports the second communication protocol;

the third server sends the fourth query request to the second server;

the second server determines, based on the fourth query request, the device identifiers of the plurality of devices on which the second user registers with or enables the MeeTime applications;

the second server sends a third query result to the third server, where the third query result supports the second communication protocol;

the third server performs protocol conversion on the third query result to obtain a fourth query result that supports the first communication protocol, where both the third query result and the fourth query result indicate the device identifiers of the plurality of devices on which the second user registers with or enables the MeeTime applications;

the third server sends the fourth query result to the first server; and the first server sends the fourth query result to the first terminal.

In other words, the first server corresponding to the first instant messaging application can communicate with the second server corresponding to the second instant messaging application, and therefore, the first instant messaging application can find the device identifiers of the plurality of devices on which the second user registers with or enables the second instant messaging applications.

In a possible design, that the second server sends a third query result to the third server includes:

When determining that the first user exists in a preset list, the second server sends the third query result to the third server, where the preset list indicates that the second user approves to disclose, to a user in the preset list, the plurality of devices corresponding to the second user; or the second server sends an authentication request to the second terminal, where the authentication request indicates whether disclosing, to the first user, the plurality of devices corresponding to the second user is approved; and when receiving a confirmation instruction, the second server sends the third query result to the third server.

In other words, the plurality of devices corresponding to the second user may be disclosed to a user in the preset list or a user confirmed by the second user; otherwise, the plurality of devices corresponding to the second user cannot be obtained. This avoids exposing, by second user, the device that enables the MeeTime application to all users.

According to a second aspect, a method for cross-application interconnection between different devices is provided, where the method is applied to a first terminal. The method includes:

The first terminal displays a first interface of a first instant messaging application on the first terminal, where the first interface includes a second user, the second user is a user registering with a second instant messaging application on a second terminal, and the first instant messaging application and the second instant messaging application are different applications; and the first instant messaging application initiates first communication behavior to the second user in response to a first operation in the first interface, where the first communication behavior includes making a video call, making a voice call, or sending a message.

In a possible design, the first interface is a first chat interface for chat with the second user, the first operation is an operation of sending a message to the second user in the first chat interface, and the first communication behavior is behavior of sending a message to the second user.

In a possible design, the first interface is an address book interface of the first instant messaging application, the first operation is an operation of initiating a voice call or a video call to the second user in the address book interface, and the first communication behavior is behavior of initiating a voice call or a video call to the second user.

In a possible design, the method further includes: The first instant messaging application queries whether the second user registers with or enables the second instant messaging application; and the first terminal displays a first mark in the first interface when the first instant messaging application determines that the second user registers with or enables the second instant messaging application, where the first mark indicates that the second user registers with or enables the second instant messaging application.

In a possible design, the method further includes: displaying a switch button in the first interface, where when the switch button is in a first state, the first instant messaging application is configured to initiate communication behavior to a third instant messaging application on the second terminal, where the third instant messaging application and the first instant messaging application are a same application; and when the switch button is in a second state, the first instant messaging application is configured to initiate communication behavior to the second instant messaging application on the second terminal.

In a possible design, that the first instant messaging application queries whether the second user registers with or enables the second instant messaging application includes:

The first instant messaging application sends a first query request to a first server, where the first query request carries identification information of the second user, and the first query request is used to request to query whether the second user registers with or enables the second instant messaging application; and the first instant messaging application receives a query result from the first server.

In a possible design, the method further includes at least one of the following: The first instant messaging application is a MeeTime application; and the second instant messaging application is an RCS application; or the method further includes at least one of the following: The first instant messaging application is an RCS application; and the second instant messaging application is a MeeTime application; or the method further includes at least one of the following: The first instant messaging application is an application that supports a first communication protocol, the second instant messaging application is an application that supports a second communication protocol, the first communication protocol is a MeeTime protocol, and the second communication protocol is an RCS protocol; or the method further includes at least one of the following: The first instant messaging application is an application that supports a first communication protocol, the second instant messaging application is an application that supports a second communication protocol, the first communication protocol is an RCS protocol, and the second communication protocol is a MeeTime protocol.

In a possible design, the first instant messaging application is the RCS application, the second instant messaging application is the MeeTime application, and the method further includes:

displaying, in the first interface, device identifiers of a plurality of devices corresponding to the second user, where the second user registers with MeeTime applications on the plurality of devices; and before that the first instant messaging application initiates first communication behavior to the second user in response to a first operation in the first interface, the method further includes: selecting a first device identifier from the plurality of device identifiers, where a device corresponding to the first device identifier is the second terminal.

In a possible design, before the device identifiers of the plurality of devices corresponding to the second user are displayed in the first interface, the method further includes:

The first instant messaging application sends a third query request to the first server, where the third query request carries the identification information of the second user, and the third query request is used to request to query a device on which the second user registers with or enables the MeeTime application; and the first instant messaging application receives a query result from the first server.

According to a third aspect, a method for cross-application interconnection between different devices is provided, where the method is applied to a second terminal. The method includes:

The second terminal displays a second interface of a second instant messaging application on the second terminal, where first communication behavior from a first user is displayed in the second interface; the first communication behavior includes making a video call request, making a voice call request, or sending a message; the first user is a user registering with a first instant messaging application on a first terminal; and the first instant messaging application and the second instant messaging application are different applications; and the second instant messaging application processes the first communication behavior in response to an operation in the second interface.

In a possible design, the second interface is a second chat interface for chat with the first user, the first communication behavior is receiving a message sent by a second user, and the processing the first communication behavior includes message replying and message deletion.

In a possible design, the first communication behavior is behavior of making a voice call or a video call to the second user, the second interface is an interface in which an incoming video call or an incoming voice call from the first user is displayed, and the processing the first communication behavior includes call answering and call rejection.

In a possible design, the method further includes at least one of the following: The first instant messaging application is a MeeTime application; and the second instant messaging application is an RCS application; or the method further includes at least one of the following: The first instant messaging application is an RCS application; and the second instant messaging application is a MeeTime application; or the method further includes at least one of the following: The first instant messaging application is an application that supports a first communication protocol, the second instant messaging application is an application that supports a second communication protocol, the first communication protocol is a MeeTime protocol, and the second communication protocol is an RCS protocol; or the method further includes at least one of the following: The first instant messaging application is an application that supports a first communication protocol, the second instant messaging application is an application that supports a second communication protocol, the first communication protocol is an RCS protocol, and the second communication protocol is a MeeTime protocol.

According to a fourth aspect, a method for cross-application interconnection between different devices is provided. The method is applied to a first server, where the first server is a server corresponding to a first instant messaging application on a first terminal. The method includes:

The first server receives first communication information from the first terminal, where the first communication information includes a video call request, a voice call request, or a message that is sent from a first user to a second user; the first user is a user registering with the first instant messaging application on the first terminal; the second user is a user registering with a second instant messaging application on a second terminal; and the first instant messaging application and the second instant messaging application are different applications; and the first server sends the first communication information to a second server, so as to send the first communication information to the second user through the second server, where the second server is a server corresponding to the second instant messaging application.

In a possible design, that the first server sends the first communication information to a second server includes:

The first server sends the first communication information to a third server, so as to convert a communication protocol of the first communication information from a first communication protocol to a second communication protocol by using the third server; and the first server sends, to the second server, the first communication information on which protocol conversion is performed, where the first communication protocol is a communication protocol supported by the first server, and the second communication protocol is a communication protocol supported by the second server.

In a possible design, the method further includes at least one of the following: The first server is a server that supports the first communication protocol, the first instant messaging application is an application that supports the first communication protocol, the second server is a server that supports the second communication protocol, the second instant messaging application is an application that supports the second communication protocol, the first communication protocol is a MeeTime protocol, and the second communication protocol is an RCS protocol; or the method further includes at least one of the following: The first server is a server that supports the first communication protocol, the first instant messaging application is an application that supports the first communication protocol, the second server is a server that supports the second communication protocol, the second instant messaging application is an application that supports the second communication protocol, the first communication protocol is an RCS protocol, and the second communication protocol is a MeeTime protocol; or the method further includes at least one of the following: The first instant messaging application is a MeeTime application, the second instant messaging application is an RCS application, the first server is a MeeTime server, the second server is an RCS server, the first communication protocol is a MeeTime protocol, and the second communication protocol is an RCS protocol; or the method further includes at least one of the following: The first instant messaging application is an RCS application, the second instant messaging application is a MeeTime application, the first server is an RCS server, the second server is a MeeTime server, the first communication protocol is an RCS protocol, and the second communication protocol is a MeeTime protocol.

In a possible design, the method further includes:

The first server receives the first query request from the first instant messaging application, where the first query request carries identification information of the second user, the first query request is used to request to query whether the second user registers with or enables the second instant messaging application, and the first query request supports the first communication protocol;

the first server sends the first query request to the third server, so as to perform protocol conversion on the first query request by using the third server to obtain a second query request supporting the second communication protocol, and the third server sends the second query request to the second server; and the first server receives a query result from the third server, and sends the query result to the first instant messaging application.

In a possible design, the method further includes:

The first server receives a third query request from the first instant messaging application, where the third query request carries the identification information of the second user, the third query request is used to request to query a device on which the second user registers with or enables the MeeTime application, and the third query request supports the first communication protocol;

the first server sends the third query request to the third server, so as to perform protocol conversion on the third query request by using the third server to obtain a fourth query request supporting the second communication protocol, and the third server sends the fourth query request to the second server; and the first server receives a query result from the third server, and sends the query result to the first instant messaging application.

According to a fifth aspect, a method for cross-application interconnection between different devices is provided. The method is applied to a third server that communicates with a first server and a second server. The first server is a server corresponding to a first instant messaging application and supports a first communication protocol. The second server is a server corresponding to a second instant messaging application and supports a second communication protocol. The first instant messaging application and the second instant messaging application are different applications. The method includes:

The third server receives first communication information from the first server, where the first communication information includes a video call request, a voice call request, or a message that is sent from a first user to a second user; the first user is a user registering with the first instant messaging application; and the second user is a user registering with a second instant messaging application;

the third server performs protocol conversion on the first communication information to obtain second communication information that supports the second communication protocol; and the third server sends the second communication information to the second server, so as to send the second communication information to the second user through the second server.

In a possible design, the method further includes:

The third server receives a first query request from the first server, where the first query request carries identification information of the second user, the first query request is used to request to query whether the second user registers with or enables the second instant messaging application, and the first query request supports the first communication protocol;

the third server performs protocol conversion on the first query request to obtain a second query request that supports the second communication protocol;

the third server sends the second query request to the second server;

the third server receives a first query result from the second server, where the first query result supports the second communication protocol;

the third server performs protocol conversion on the first query result to obtain a second query result that supports the first communication protocol; and the third server sends the second query result to the first server.

In a possible design, the method further includes at least one of the following: The first instant messaging application is a MeeTime application, the second instant messaging application is an RCS application, the first server is a MeeTime server, the second server is an RCS server, the first communication protocol is a MeeTime protocol, and the second communication protocol is an RCS protocol; or the method further includes at least one of the following: The first instant messaging application is an RCS application, the second instant messaging application is a MeeTime application, the first server is an RCS server (like an RCS Hub in FIG. 4), the second server is a MeeTime server (like a MeeTime cloud service in FIG. 4, which is also referred to as MeeTime cloud server), the first communication protocol is an RCS protocol, and the second communication protocol is a MeeTime protocol.

In a possible design, the method further includes:
The third server (like a MeeTime-RCS converged gateway in FIG. 4) receives the first query request from the first server, where the first query request carries identification information of the second user, the first query request is used to request to query a device on which the second user registers with or enables the second instant messaging application, and the first query request supports the first communication protocol;
the third server performs protocol conversion on the first query request to obtain a second query request that supports the second communication protocol;
the third server sends the second query request to the second server;
the third server receives a first query result from the second server, where the first query result supports the second communication protocol;
the third server performs protocol conversion on the first query result to obtain a second query result that supports the first communication protocol; and
the third server sends the second query result to the first server.

According to a sixth aspect, a method for cross-application interconnection between different devices is provided. The method is applied to a second server, where the second server is a server corresponding to a second instant messaging application on a second terminal. The method includes:
The second server receives first communication information from a first server, where the first communication information includes a video call request, a voice call request, or a message that is sent from a first user to a second user; the first user is a user registering with a first instant messaging application on the first terminal; the second user is a user registering with the second instant messaging application on the second terminal; and the first instant messaging application and the second instant messaging application are different applications; and
the second server sends the first communication information to the second user.

In a possible design, that the second server receives first communication information from a first server includes:
The second server receives the first communication information from the first server through a third server, where the third server is a server configured to connect the first server and the second server, and the third server is configured to convert a communication protocol of the first communication information, which is from the first server, from a first communication protocol to a second communication protocol; the first communication protocol is a protocol supported by the first server; and the second communication protocol is a protocol supported by the second server.

In a possible design, the method further includes: The second server receives a second query request sent by the third server, where the second query request is used to request to query whether the second user registers or enables the second instant messaging application;
the second server determines, based on the second query request, whether the second user registers with or enables the second instant messaging application; and
the second server sends a first query result to the third server.

In a possible design, the method further includes at least one of the following: The first instant messaging application is a MeeTime application, the second instant messaging application is an RCS application, the first server is a MeeTime server, the second server is an RCS server, the first communication protocol is a MeeTime protocol, and the second communication protocol is an RCS protocol; or the method further includes at least one of the following: The first instant messaging application is an RCS application, the second instant messaging application is a MeeTime application, the first server is an RCS server, the second server is a MeeTime server, the first communication protocol is an RCS protocol, and the second communication protocol is a MeeTime protocol.

In a possible design, the method further includes:
The second server receives a fourth query request sent by the third server, where the fourth query request is used to indicate that the first user requests to query a device on which the second user registers with or enables a MeeTime application;
the second server determines, based on the fourth query request, device identifiers of a plurality of devices on which the second user registers with or enables MeeTime applications; and
the second server sends a third query result to the third server.

In a possible design, that the second server sends a third query result to the third server includes:
When determining that the first user exists in a preset list, the second server sends the third query result to the third server, where the preset list indicates that the second user approves to disclose, to a user in the preset list, the plurality of devices corresponding to the second user; or the second server sends an authentication request to the second terminal, where the authentication request indicates whether disclosing, to the first user, the plurality of devices corresponding to the second user is approved; and when receiving a confirmation instruction, the second server sends the third query result to the third server.

According to a seventh aspect, a communication system is further provided, including a first terminal and a second terminal.

The first terminal includes a processor and a memory. The memory stores one or more computer programs. The one or more computer programs include instructions. When the instructions are executed by the processor, the first terminal is enabled to execute the steps that are for the first terminal in the method provided in the first aspect.

The second terminal includes a processor and a memory. The memory stores one or more computer programs. The one or more computer programs include instructions. When the instructions are executed by the processor, the second terminal is enabled to execute the steps that are for the second terminal in the method provided in the first aspect.

According to an eighth aspect, a first terminal is further provided, including:

a processor, a memory, and one or more programs.

The one or more programs are stored in the memory. The one or more programs include instructions. The first terminal performs the steps in the method according to the second aspect when the processor executes the instructions.

According to a ninth aspect, a second terminal is further provided, including:

a processor, a memory, and one or more programs.

The one or more programs are stored in the memory. The one or more programs include instructions. The second terminal performs the steps in the method according to the third aspect when the processor executes the instructions.

According to a tenth aspect, a first server is further provided, including:

a processor, a memory, and one or more programs, where the one or more programs are stored in the memory, the one or more programs include instructions, and the first server performs the steps in the method according to the fourth aspect when the processor executes the instructions.

According to an eleventh aspect, a third server is further provided, including:

a processor, a memory, and one or more programs, where the one or more programs are stored in the memory, the one or more programs include instructions, and the third server performs the steps in the method according to the fifth aspect when the processor executes the instructions.

According to a twelfth aspect, a second server is further provided, including:

a processor, a memory, and one or more programs, where the one or more programs are stored in the memory, the one or more programs include instructions, and the second server performs the steps in the method according to the sixth aspect when the processor executes the instructions.

According to a thirteenth aspect, a chip is provided. The chip is coupled to a memory in an electronic device, and is configured to invoke a computer program stored in the memory and perform the technical solutions according to any one of the first aspect to the sixth aspect of embodiments of this application. In embodiments of this application, coupling means that two components are directly or indirectly combined.

According to a fourteenth aspect, a computer-readable storage medium is provided. The computer-readable storage medium is configured to store a computer program, and when the computer program is run on a computer, the computer is enabled to perform the method according to any one of the first aspect to the sixth aspect.

According to a fifteenth aspect, a computer program product including a computer program is provided, and when the computer program is run on a computer, the computer is enabled to perform the method according to any one of the first aspect to the sixth aspect.

According to a sixteenth aspect, a graphical user interface on an electronic device is provided, where the electronic device has a display, a memory, and a processor; the processor is configured to execute one or more computer programs stored in the memory; and the graphical user interface includes a graphical user interface displayed when the electronic device performs the method according to the first aspect to the sixth aspect.

For beneficial effects of the second aspect to the sixteenth aspect, refer to the beneficial effects of the first aspect. Details are not described again.

BRIEF DESCRIPTION OF THE DRAWINGS

FIG. 6A-1 to FIG. 6C are schematic diagrams of a principle of communication between an RCS application on a first terminal and a MeeTime application on a second terminal according to an embodiment of this application;

FIG. 7A to FIG. 7C are a schematic diagram of a principle of communication between an RCS application on a first terminal and a television of a second user according to an embodiment of this application;

FIG. 9A-1 to FIG. 9B are schematic diagrams of a principle of communication between a MeeTime application on a second terminal and an RCS application on a first terminal according to an embodiment of this application;

DETAILED DESCRIPTION OF ILLUSTRATIVE EMBODIMENTS

Figure 1A:
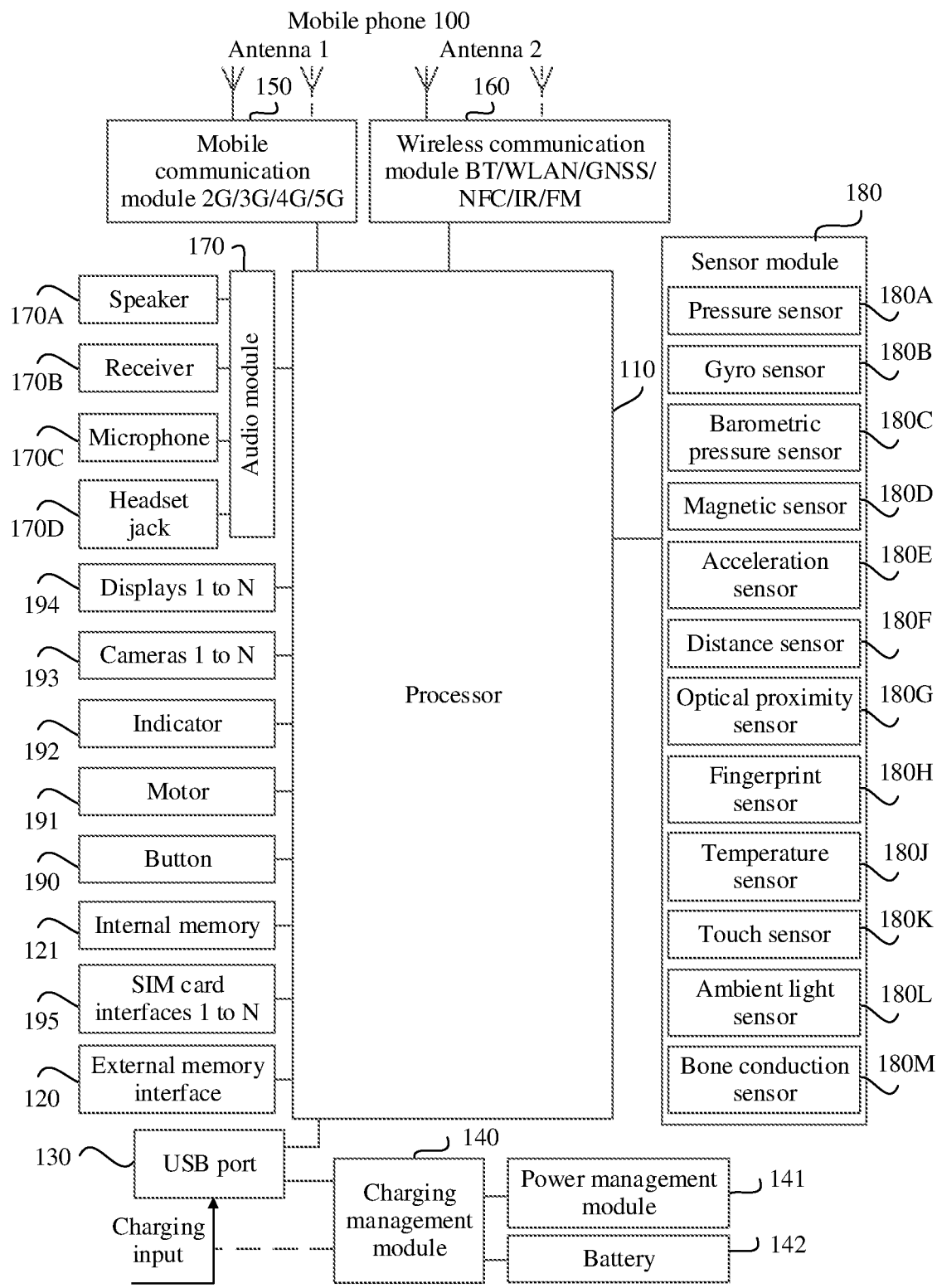
FIG. 1A is a schematic diagram of a hardware structure of a terminal device according to an embodiment of this application.

Some terms in embodiments of this application are described below, so that a person skilled in the art has a better understanding.

(1) Application (Application, App)

An application is a software program that can implement one or more specific functions. There may be various types of applications, for example, a video playing application, a photographing application, and an instant messaging application. The instant messaging application includes, for example, a Huawei MeeTime application, various email applications, WeChat (WeChat), Tencent chat software (QQ), WhatsApp Messenger, Line (Line), Kakao Talk, or DingTalk. An application mentioned in the following descriptions may be an application installed before delivery of an electronic device, or may be an application downloaded by a user through a network or an application obtained from another electronic device (for example, an application sent by another electronic device) in a process of using the electronic device.

(2) In embodiments of this application, "at least one" means one or more, and "a plurality of" means two or more. The term "and/or" describes an association relationship between associated objects and represents that three relationships may exist. For example, A and/or B may indicate the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces).

In addition, unless otherwise stated, ordinal numbers such as "first" and "second" in embodiments of this application are used to distinguish between a plurality of objects, but are not intended to limit sizes, content, an order, a time sequence, priorities, or importance of the plurality of objects. For example, a "first terminal" and a "second terminal" are merely intended to distinguish between different terminals, but do not indicate that the terminals are different in priority, importance, or the like.

A method for cross-application information exchange between different devices provided in embodiments of this application may be applied to an electronic device. The following describes embodiments of an electronic device, a graphical user interface (graphical user interface, GUI) used on the electronic device, and a communication system using the electronic device. In some embodiments of this application, the electronic device may be a portable electronic device, like a mobile phone, a PAD, a portable computer, a wearable device (like a smart watch, smart glasses, a smart band, or a smart helmet) having a wireless communication function, or an in-vehicle device. An example embodiment of the portable electronic device includes but is not limited to a portable electronic device using iOS®, Android®, Microsoft®, or another operating system.

For example, FIG. 1A is a schematic diagram of a structure of an electronic device.

As shown in FIG. 1A, the electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the electronic device. The controller may generate an operation control signal based on instruction operation code and a time sequence signal, to control instruction reading and instruction execution. A memory may be further disposed in the processor 110, and is configured to store instructions and data. In some embodiments, the memory in the processor 110 is a cache. The memory may store an instruction or data that has been used or that is cyclically used by the processor 110. If the processor 110 needs to use the instruction or the data again, the processor may directly invoke the instruction or the data from the memory. This avoids repeated access and reduces waiting time of the processor 110. Therefore, system efficiency is improved.

The USB port 130 is a port that conforms to a USB standard specification, and may be specifically a mini USB port, a micro USB port, a USB Type C port, or the like. The USB port 130 may be configured to connect to a charger to charge the electronic device, or may be configured to transmit data between the electronic device and a peripheral device. The charging management module 140 is configured to receive a charging input from the charger. The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like.

A wireless communication function of the electronic device may be implemented by using the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna of the electronic device may be configured to cover one or more communication bands. Different antennas may be reused to improve antenna utilization. For example, the antenna 1 may be reused as a diversity antenna of a wireless local area network. In some other embodiments, the antenna may be used with a tuning switch.

The mobile communication module 150 may provide a solution that is applied to the electronic device and that is for wireless communication such as 2G, 3G, 4G, and 5G communication. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 and at least some modules of the processor 110 may be disposed in a same device.

The wireless communication module 160 may provide a solution that is applied to the electronic device and that is used in wireless communication, such as a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), infrared (infrared, IR). The wireless communication module 160 may be one or more components that integrate at least one communication processor module. The wireless communication module 160 receives an electromagnetic wave through the antenna 2, performs processing such as frequency modulation and filtering on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The display 194 is configured to display a display interface of an application, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device may include one or N displays 194, where N is a positive integer greater than 1.

The camera 193 is configured to capture a static image or a video. The camera 193 may include a front-facing camera and a rear-facing camera.

The internal memory 121 may be configured to store computer-executable program code. The executable program code includes instructions. The processor 110 runs the instructions stored in the internal memory 121, to perform various function applications of the electronic device and data processing. The internal memory 121 may include a program storage area and a data storage area. The program storage area may store an operating system, software code of at least one application (for example, an iQIYI application or a WeChat application), and the like. The data storage area may store data (for example, an image and a video) and the like generated in a process of using the electronic device. In addition, the internal memory 121 may include a high-speed random access memory, and may further include a nonvolatile memory, for example, at least one magnetic disk storage device, a flash storage device, or a universal flash storage (universal flash storage, UFS).

The external memory interface 120 may be configured to connect to an external storage card, for example, a micro SD card, to extend a storage capability of the electronic device. The external memory card communicates with the processor 110 through the external memory interface 120, to implement a data storage function. For example, files such as pictures and videos are stored in the external storage card.

The electronic device can implement audio functions, for example, a music playing function and a recording function, by using the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display 194. The gyro sensor 180B may be configured to determine a motion posture of the electronic device. In some embodiments, angular velocities of the electronic device around three axes (namely, axes x, y, and z) may be determined by using the gyro sensor 180B.

The gyro sensor 180B may be configured to implement image stabilization during photographing. The barometric pressure sensor 180C is configured to measure barometric pressure. In some embodiments, the electronic device calculates an altitude based on a barometric pressure value measured by the barometric pressure sensor 180C, to assist in positioning and navigation. The magnetic sensor 180D includes a Hall sensor. The electronic device may detect opening and closing of a flip cover by using the magnetic sensor 180D. In some embodiments, when the electronic device is a flip phone, the electronic device may detect opening and closing of a flip cover by using the magnetic sensor 180D. Further, a feature like automatic unlocking upon opening is set based on a detected opening or closing state of the flip cover or a clamshell. The acceleration sensor 180E may detect magnitude of accelerations in various directions (usually on three axes) of the electronic device, and may detect magnitude and a direction of gravity when the electronic device is still. The acceleration sensor 180E may be further configured to identify a posture of the electronic device, and is used in applications such as switching between a landscape mode and a portrait mode or a pedometer.

The distance sensor 180F is configured to measure a distance. The electronic device may measure the distance through infrared or laser. In some embodiments, in a photographing scenario, the electronic device may measure the distance by using the distance sensor 180F, to implement quick focusing. The optical proximity sensor 180G may include, for example, a light-emitting diode (LED) and an optical detector, for example, a photodiode. The light-emitting diode may be an infrared light-emitting diode. The electronic device emits infrared light by using the light-emitting diode. The electronic device detects reflected infrared light from a nearby object by using the photodiode. When detecting sufficient reflected light, the electronic device can determine that there is an object near the electronic device. When detecting insufficient reflected light, the electronic device can determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a flip cover mode or a pocket mode to automatically unlock or lock the screen.

The ambient light sensor 180L is configured to sense ambient light brightness. The electronic device may adaptively adjust brightness of the display 194 based on sensed ambient light brightness. The ambient light sensor 180L may also be configured to automatically adjust white balance during photographing. The ambient light sensor 180L may further cooperate with the optical proximity sensor 180G to detect whether the electronic device is in a pocket, so as to avoid an unintentional touch. The fingerprint sensor 180H is configured to collect a fingerprint. The electronic device may use a feature of a collected fingerprint to implement fingerprint-based unlock, application lock access, fingerprint-based photographing, fingerprint-based call answering, and the like.

The temperature sensor 180J is configured to detect a temperature. In some embodiments, the electronic device executes a temperature processing policy based on temperature detected by the temperature sensor 18J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel". The touch sensor 180K may be disposed on the display 194, and the touch sensor 180K and the display 194 constitute a touchscreen, which is referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device, and is located at a position different from that of the display 194.

The bone conduction sensor 180M may obtain a vibration signal. In some embodiments, the bone conduction sensor 180M may obtain a vibration signal of a vibration bone in a human vocal-cord part. The bone conduction sensor 180M may also be in contact with a human pulse, and receive a blood pressure beating signal.

The button 190 includes a power button, a volume button, and the like. The button 190 may be a mechanical button, or may be a touch button. The electronic device may receive a button input, and generate a button signal input related to user settings and function control of the electronic device. The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device.

It may be understood that the components shown in FIG. 1A do not constitute a specific limitation on the electronic device. The electronic device in this embodiment of the present invention may include more or fewer components than those in FIG. 1A. In addition, a combination/connection relationship between components in FIG. 1A may be adjusted or modified.

Figure 1B:
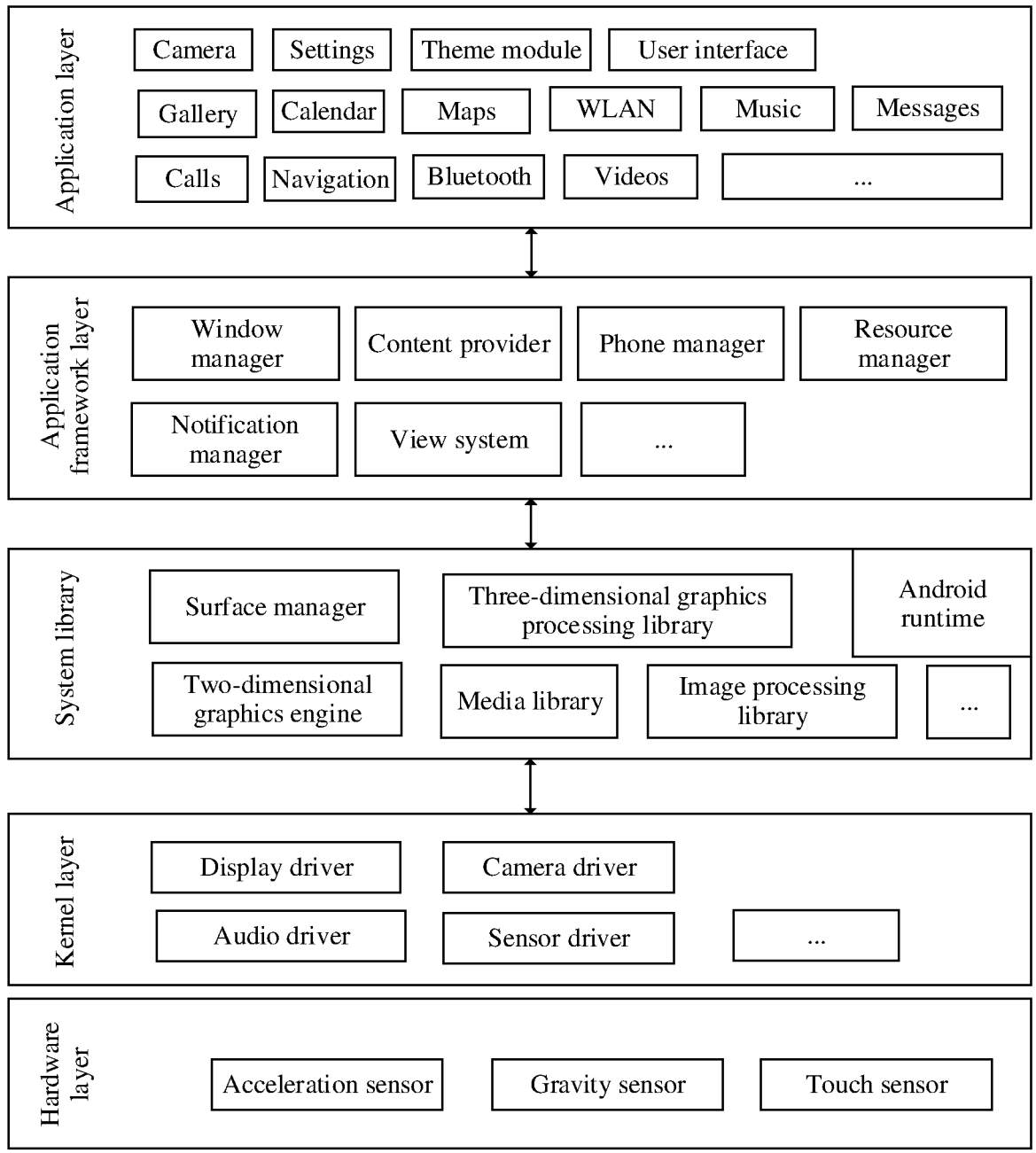
FIG. 1B is a schematic diagram of a software structure of a terminal device according to an embodiment of this application.

FIG. 1B is a block diagram of a software structure of an electronic device according to an embodiment of this application.

As shown in FIG. 1B, a software structure of the electronic device may be a layered structure. For example, software may be divided into several layers, and each layer has a clear role and responsibility. The layers communicate with each other through a software interface. In some embodiments, the Android system is divided into four layers: an application layer, an application framework (framework, FWK) layer, an Android runtime (Android runtime) and system library, and a kernel layer from top to bottom.

The application layer may include various application packages. As shown in FIG. 1B, the application layer may include Camera, Settings, Theme module, User interface (user interface, UI), a third-party application, and the like. The third-party application may include "WeChat", "QQ", "Gallery", "Calendar", "Calls", "Maps", "Navigation", "WLAN", "Bluetooth", "Music", "Videos", "Messages", and the like.

The application framework layer provides an application programming interface (application programming interface, API) and a programming framework for an application at the application layer. The application framework layer may include some predefined functions. As shown in FIG. 1B, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like. The content provider is configured to: store and obtain data, and make the data accessible to an application. The data may include a video, an image, audio, calls that are made and answered, a browsing history and bookmarks, contacts, and the like.

The view system includes visual controls such as a control for displaying a text and a control for displaying a picture. The view system may be configured to construct an application. A display interface may include one or more views. For example, a display interface including an SMS message notification icon may include a view in which a text is displayed and a view in which an image is displayed.

The phone manager is configured to provide a communication function of the electronic device, for example, management of a call status (including answering, declining, or the like).

The resource manager provides various resources such as a localized character string, an icon, an image, a layout file, and a video file for an application.

The notification manager enables an application to display notification information in a status bar, and may be used to convey a message of a notification type. The message may automatically disappear after a short stay without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an alert sound is played, the electronic device vibrates, or an indicator light blinks.

The Android runtime includes a kernel library and a virtual machine. The Android runtime is responsible for scheduling and management of the Android system.

The kernel library includes two parts: a function that needs to be invoked in Java language and a kernel library of Android. The application layer and the application framework layer run in the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, such as a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording in a plurality of commonly used audio and video formats, and static image files. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The hardware layer may include various types of sensors, for example, the acceleration sensor, the gyro sensor, and the touch sensor in embodiments of this application.

Figure 1C:
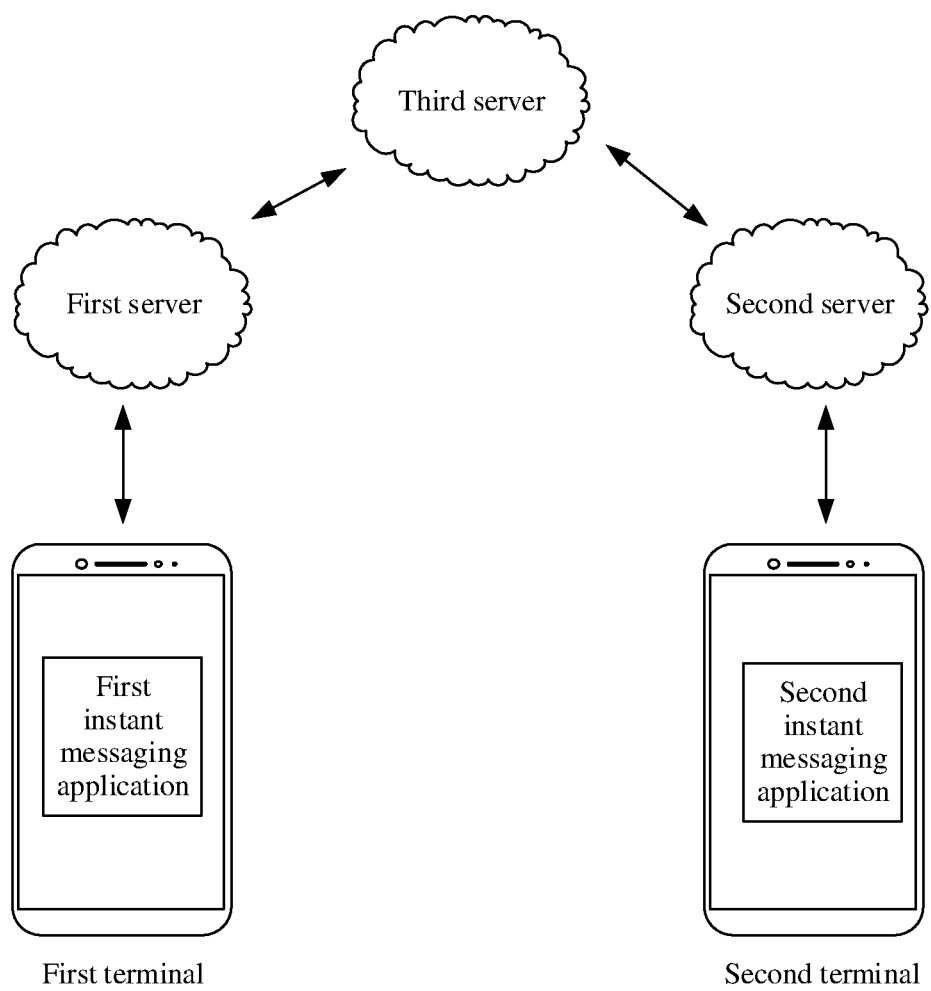
FIG. 1C is a schematic diagram of a communication system according to an embodiment of this application.

FIG. 1C is a schematic diagram of a communication system according to an embodiment of this application. As shown in FIG. 1C, the communication system includes at least two terminals, such as a first terminal and a second terminal. For hardware structures of the first terminal and the second terminal, refer to FIG. 1A. For software structures, refer to FIG. 1B. The first terminal may be any device on which an instant messaging application can be installed, like a mobile phone, a tablet computer, a PC, a watch, or a band. The second terminal may be any device on which an instant messaging application can be installed, like a mobile phone, a tablet computer, a PC, a watch, or a band. The first terminal and the second terminal may be the same or different. For example, both the first terminal and the second terminal are mobile phones; or one of the first terminal and the second terminal is a mobile phone, and the other is a tablet computer; or one is a mobile phone, and the other is a band. This is not limited in this embodiment of this application.

The first terminal includes a first instant messaging application. The first instant messaging application may be a Huawei MeeTime application, WeChat (WeChat), Tencent chat software (QQ), WhatsApp Messenger, Line (Line), an RCS application, Kakao Talk, or the like.

The second terminal includes a second instant messaging application. The second instant messaging application may be a Huawei MeeTime application, WeChat (WeChat), Tencent chat software (QQ), WhatsApp Messenger, Line (Line), RCS, Kakao Talk, or the like.

Generally, if the first instant messaging application and the second instant messaging application are not a same application, the first instant messaging application on the first terminal cannot communicate with the second instant messaging application on the second terminal. For example, the first instant messaging application is the Huawei MeeTime application, and the second instant messaging application is the RCS application. If the MeeTime application is not installed on the second terminal, the first terminal cannot communicate with the second terminal through the MeeTime application. Similarly, if the RCS application is not installed on the first terminal, the second terminal cannot communicate with the first terminal through the RCS application.

In the method for cross-application interconnection between different devices provided in embodiments of this application, when the first instant messaging application and the second instant messaging application are not a same application, the first terminal may communicate with the second instant messaging application on the second terminal through the first instant messaging application, or the second terminal may communicate with the first instant messaging application on the first terminal through the second instant messaging application, to implement cross-application information exchange between different devices. This method for cross-application interconnection between different devices is more applicable because the method overcomes a limitation that two devices need to use a same instant messaging application for communication.

Refer to FIG. 1C. The communication system further includes a first server and a second server, where the first server is a server corresponding to the first instant messaging application on the first terminal, and the second server is a server corresponding to the second instant messaging application on the second terminal. For example, when the first instant messaging application is the MeeTime application, the first server is a MeeTime cloud server, and when the second instant messaging application is an RCS application, the second server is an RCS server.

According to the existing solution, the first server cannot communicate with the second server. Therefore, the first instant messaging application on the first terminal cannot communicate with the second instant messaging application on the second terminal.

In this embodiment of this application, the communication system shown in FIG. 1C further includes a third server. The third server is configured to connect the first server and the second server for information exchange between the first server and the second server, to implement information exchange between the first instant messaging application on the first terminal and the second instant messaging application on the second terminal.

Usually, communication protocols used by the first instant messaging application and the second instant messaging application are different. It is assumed that the first instant messaging application uses a first communication protocol, to be specific, the first communication protocol is used for information exchange between the first instant messaging application and the first server. It is assumed that the second instant messaging application uses a second communication protocol, to be specific, the second communication protocol is used for information exchange between the second instant messaging application and the second server.

If interconnection between the first instant messaging application and the second instant messaging application is to be implemented, protocol conversion needs to be performed for interconnection between the first server and the second server. In this embodiment of this application, the third server may perform protocol conversion, for example, conversion between the first communication protocol and the second communication protocol. For example, the first instant messaging application on the first terminal sends first communication information to the first server, where the first communication information may be, for example, a video call request, a voice call request, or a message initiated to the second terminal. The first communication information is based on the first communication protocol. The first server sends the first communication information to the third server. The third server performs protocol conversion to convert a communication protocol of the first communication information from the first communication protocol to the second communication protocol, and then sends the first communication information that is based on the second communication protocol to the second server. Then, the second server sends the first communication information to the second instant messaging application on the second terminal. In this way, cross-application information exchange between different devices is implemented. In other words, the third server performs protocol conversion to implement interconnection between the first server and the second server, so as to implement interconnection between the first instant messaging application and the second instant messaging application.

The example in which the first instant messaging application uses a communication protocol and the second instant messaging application uses another communication protocol is used above. Optionally, the first instant messaging application may use a plurality of communication protocols. For example, the first instant messaging application has a video/voice call function, and further includes a message (message) sending function. Different communication protocols are used for different functions. For example, a text protocol 1 is used for a message sending function of the first instant messaging application, and a volite protocol 1 is used for a video/voice call function. Similarly, the second communication application may also use a plurality of communication protocols. For example, a text protocol 2 is used for a message sending function of the second instant messaging application, and a volite protocol 2 is used for a video/voice call function. In this case, the third server may implement conversion between the text protocol 1 and the text protocol 2, and may also implement conversion between the volite protocol 1 and the volite protocol 2.

For example, in a scenario in which the first instant messaging application on the first terminal sends a message (message) to the second instant messaging application on the second terminal, the first terminal sends the message to the first server. In this case, the message uses the text protocol 1. The first server sends the message to the third server, and the third server converts the text protocol 1 of the message into the text protocol 2 that adapts to the second server. In this case, the third server may send, to the second server, the message on which protocol conversion is performed, and the second server sends the message to the second terminal. In this way, message (message) transmission between the first instant messaging application and the second instant messaging application is implemented.

For another example, in a scenario in which the first instant messaging application on the first terminal initiates a video/voice call to the second instant messaging application on the second terminal, the first terminal sends a video/voice call request to the first server, where the video/voice call request is based on the volite protocol 1. The first server sends the video/voice call request to the third server, and the third server converts the volite protocol 1 of the video/voice call request into the volite protocol 2 that adapts to the second server. In this case, the third server may send the video/voice call request on which protocol conversion is performed to the second server, and the second server sends the video/voice call request to the second terminal, to implement a video/voice call between the first instant messaging application and the second instant messaging application.

A message (message) transmission process between the first instant messaging application and the second instant messaging application is used as an example in the following embodiments for describing in detail a method for cross-application interconnection between different devices provided in this application.

A first terminal and a second terminal are needed for describing the solution. For ease of understanding, it is assumed that the first terminal and the second terminal meet the following conditions:

The first terminal is a mobile phone, a user of the first terminal is a first user, for example, David, and a phone number of the first terminal is a first number. The first terminal includes a first instant messaging application, and an example in which the first instant messaging application is a Huawei MeeTime application is used.

The second terminal is a mobile phone, a user of the second terminal is a second user, for example, John, and a phone number of the second terminal is a second number. The second terminal includes a second instant messaging application, and an example in which the second instant messaging application is an RCS application is used.

For brevity, the first instant messaging application is referred to as a first application for short, and the second instant messaging application is referred to as a second application for short.

The following briefly describes the Huawei MeeTime application and the RCS application.

1. MeeTime Application

Figure 2A:
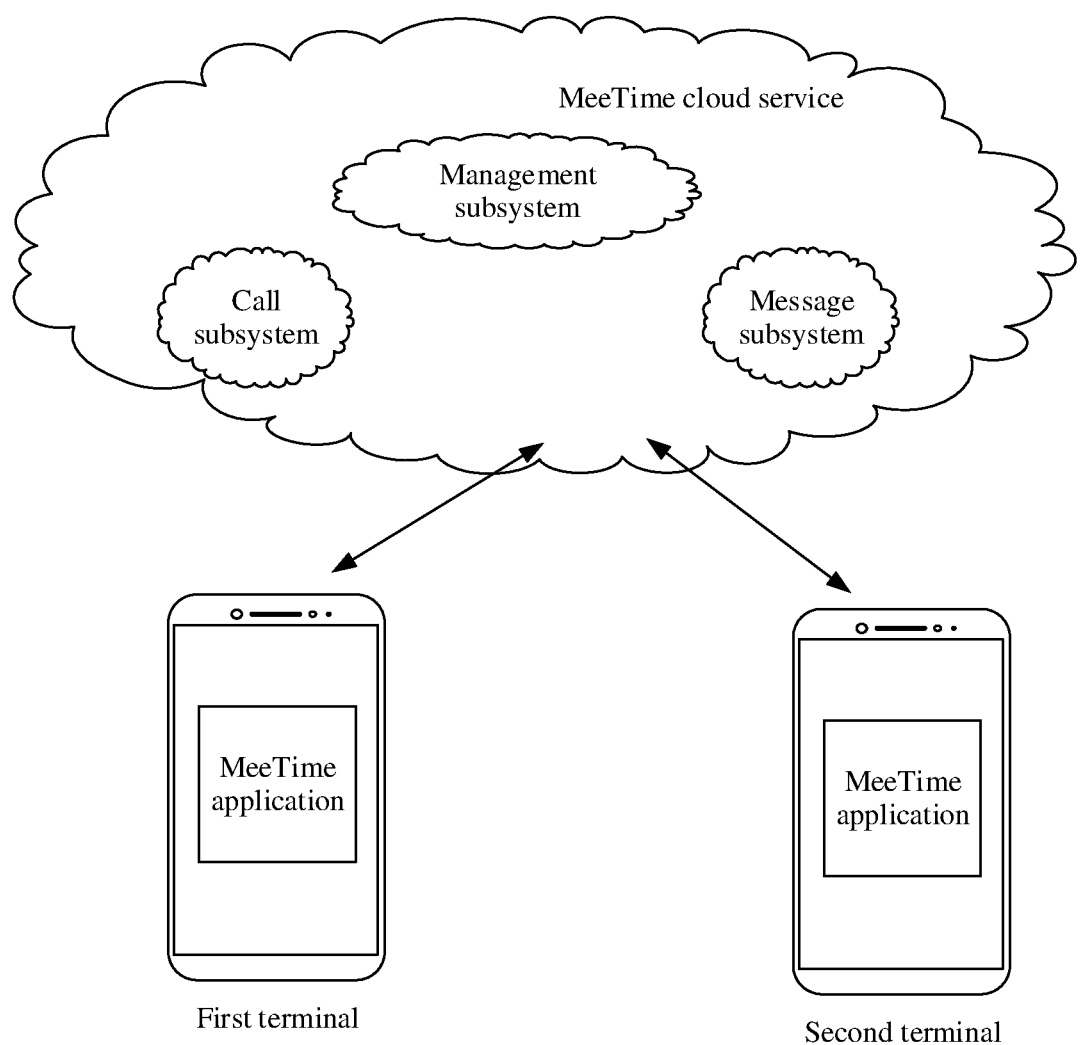
FIG. 2A to FIG. 2D are schematic diagrams of a communication principle of a MeeTime application according to an embodiment of this application.

FIG. 2A is a schematic diagram of a communication system supporting the MeeTime application. As shown in FIG. 2A, the system includes a first terminal, a second terminal, and a MeeTime cloud service. The first terminal includes the MeeTime application, and the second terminal also includes the MeeTime application. The MeeTime cloud service may be understood as a cloud server, and a type of the cloud server is not limited in this application. The MeeTime cloud service includes a call subsystem, a management subsystem, and a message subsystem. The call subsystem is used for managing voice and video calls. The message subsystem is used for message management (for example, message sending and receiving). The management subsystem is responsible for MeeTime registration, and recording and storage of phone numbers that enable MeeTime functions.

The first terminal and the second terminal may first register before using the MeeTime application. It may be understood that if the MeeTime application is installed on the first terminal and the second terminal before delivery, the first terminal and the second terminal may register with the MeeTime application directly, and if the MeeTime application is not installed on the first terminal and the second terminal before delivery, the first terminal and the second terminal may download and install the MeeTime application, and then register with the application.

Figure 2B:
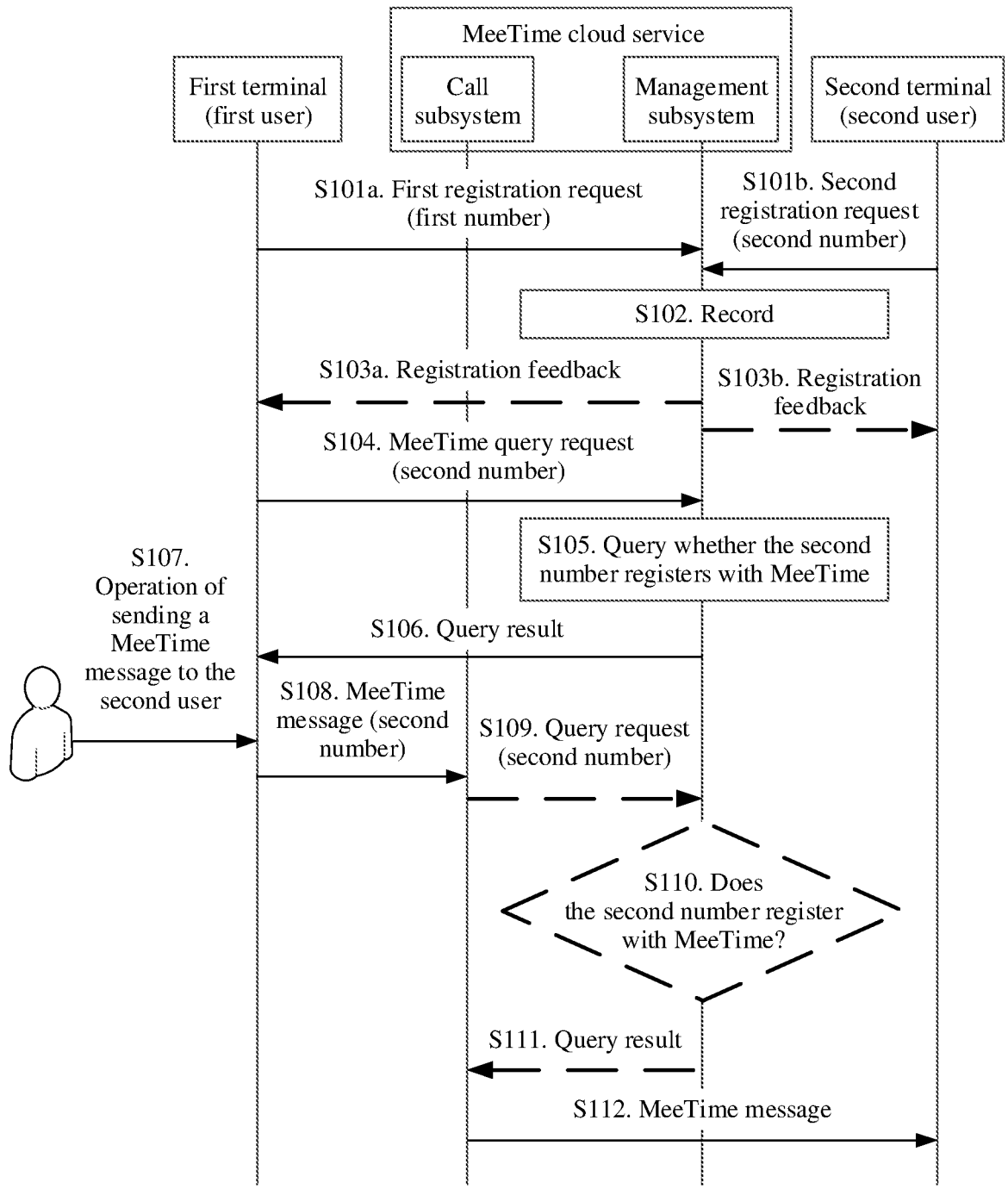

For example, refer to FIG. 2B. Steps S101 to S103 are a process in which the first terminal and the second terminal register with the MeeTime application. Specifically, the process includes the following steps.

S101. The first terminal and the second terminal send registration requests to the management subsystem in the MeeTime cloud service. Specifically, S101 includes S101a and S101b. S101a. The first terminal sends a first registration request to the MeeTime cloud service, where the first registration request carries a first number of the first terminal. S101b. The second terminal sends a second registration request to the MeeTime cloud service, where the second registration request carries a second number of the second terminal. A sequence of executing S101A and S101b is not limited.

S102. The management subsystem in the MeeTime cloud service performs recording, to be specific, records that the first number and the second number register with the MeeTime application.

S103. The management subsystem in the MeeTime cloud service sends registration feedbacks to the first terminal and the second terminal, where the registration feedback indicates whether registration succeeds. Specifically, S103 includes S103a and S103b. S103a. The MeeTime cloud service sends the registration feedback to the first terminal. S103b. The MeeTime cloud service sends the registration feedback to the second terminal. A sequence of executing S103a and S103b is not limited. S103a and S103b are optional steps, and may or may not be performed. Therefore, the steps are represented by dashed lines in the figure. If the steps are not performed, the MeeTime cloud service does not need to send registration feedback to a registered user.

The foregoing is described by using an example in which the first terminal and the second terminal register with the MeeTime application. It may be understood that more terminal devices may register with the MeeTime application, and the same registration principles is used. Therefore, the MeeTime cloud service may store a large quantity of phone numbers registering with the MeeTime application.

After the first terminal and the second terminal register with the MeeTime application, a MeeTime application on the first terminal may discover a MeeTime function of the second terminal, and the MeeTime application on the second terminal may also discover a MeeTime function of the first terminal. For example, refer to FIG. 2B. A process in which the first terminal discovers the MeeTime capability of the second terminal may include steps S104 to S106. Specifically, the process includes the following steps.

S104. The first terminal sends a MeeTime query request to the management subsystem in the MeeTime cloud service, where the MeeTime query request carries a number for query, that is, the second number, and is used to request to query whether the second number registers with MeeTime.

S105. The management subsystem in the MeeTime cloud service determines whether the second number registers with MeeTime.

S106. The management subsystem in the MeeTime cloud service sends a query result to the first terminal, where the query result indicates whether the second number registers with MeeTime.

Figure 2C:
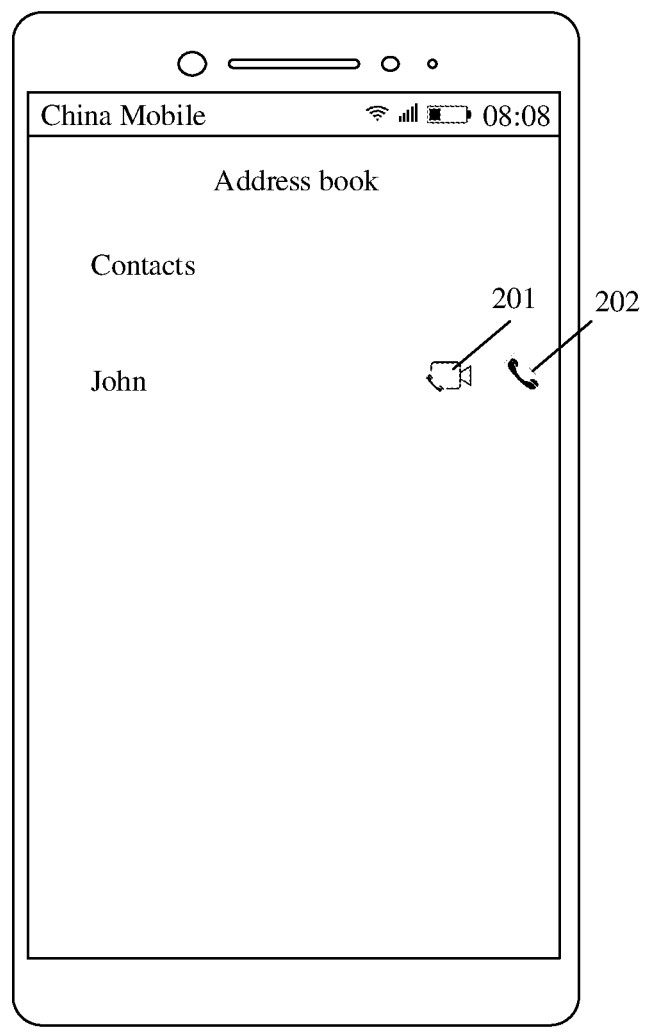
Figure 2C:
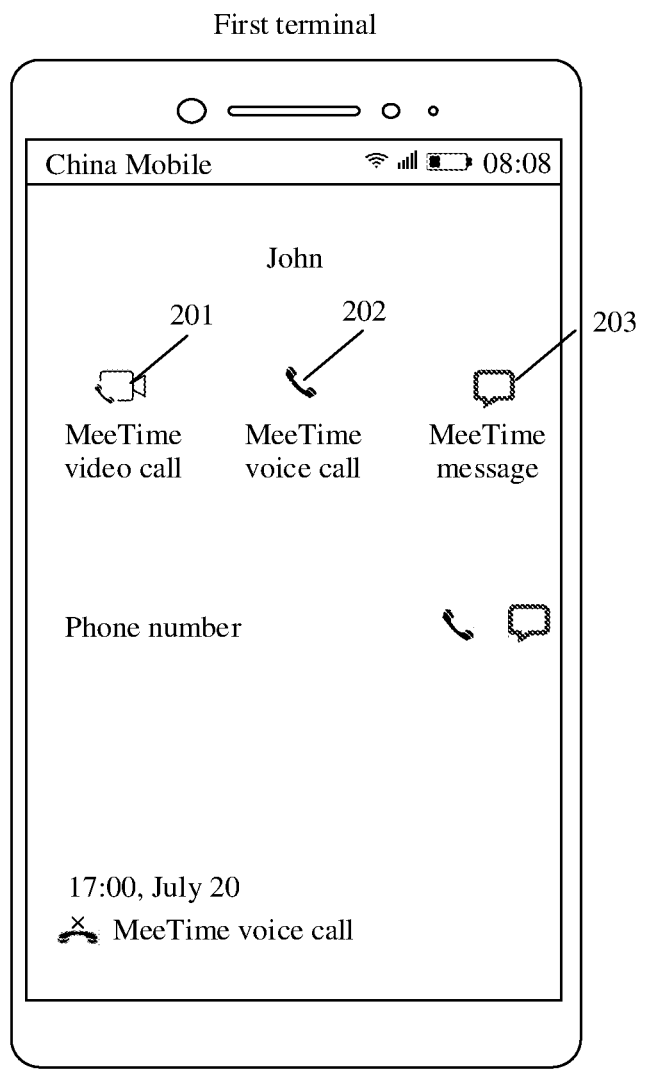
Figure 2C:
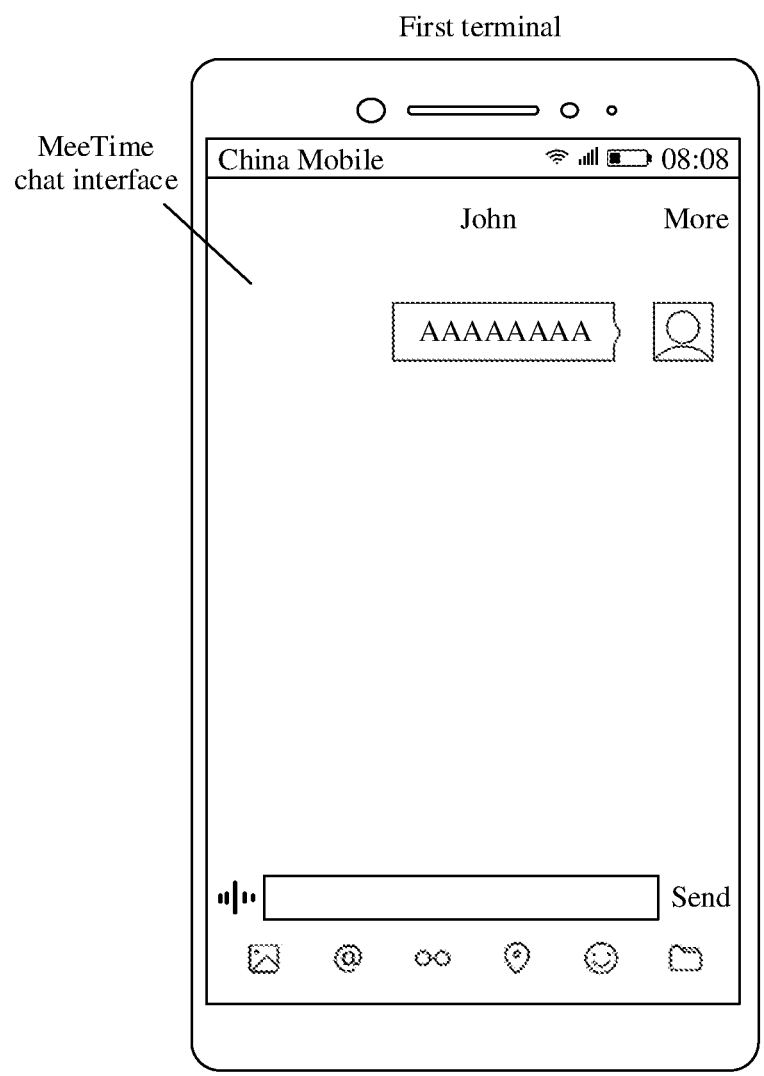
Figure 2C:
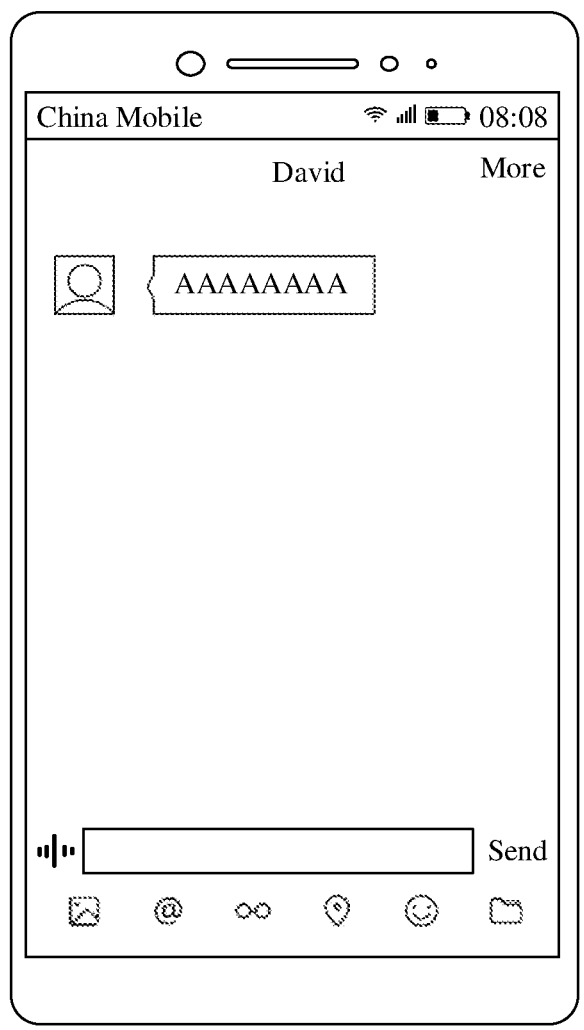

After the MeeTime application on first terminal finds that the second terminal registers with MeeTime, marking can be performed in a specific manner. For example, when an address book of the first terminal includes the second number of the second terminal, marking may be performed in the address book. For example, refer to FIG. 2C(a). FIG. 2C(a) is a schematic diagram of an address book of the first terminal. The address book includes the second user, namely, John, and has a MeeTime video call mark 201 and a MeeTime voice call mark 202, to indicate that the second user enables the MeeTime application. The first terminal may give the second user a video call by using the MeeTime video call mark 201, and give the second user a voice call by using the MeeTime voice call mark 202. In other words, the first terminal can find a contact registering with the MeeTime application based on all phone numbers in the address book. For example, the first terminal reports phone numbers of all contacts in the address book to the MeeTime cloud service. Because the MeeTime cloud service stores all phone numbers that register with the MeeTime application, the MeeTime cloud service can determine contacts that are in the address book of the first terminal and whose phone numbers register with the MeeTime application, and notify the first terminal of the contacts that register with the MeeTime application. The first terminal may mark, in a specific manner, a contact registering with the MeeTime application in the address book.

After finding that the second terminal registers with MeeTime, the first terminal may send a message to the MeeTime application on the second terminal through the MeeTime application. For example, refer to FIG. 2B. A process in which the first terminal sends a MeeTime message to the second terminal may include steps S107 to S112. Specifically, the process includes the following steps.

S107. The first terminal detects an operation of sending the MeeTime message to the second user.

Before S107, the process may further include the following step: The first terminal displays a MeeTime interface for chat with the second user, and sends the MeeTime message to the second user in the chat interface. In one manner, the first terminal displays, in the address book, the MeeTime chat interface of the second user. Refer to FIG. 2C(a). When detecting an operation (for example, a tap operation) on a contact John, the first terminal displays an interface shown in FIG. 2C(b). The interface includes a MeeTime video call mark 201, a MeeTime voice call mark 202, and a MeeTime message mark 203. When detecting an operation for the MeeTime message mark 203, the first terminal displays an interface shown in FIG. 2C(c). The interface may be understood as a MeeTime interface in which chat between the first user of the first terminal and the second user (namely, John) is displayed. A picture, a voice message, a location, an emoticon, and the like may be sent to the second user in the MeeTime chat interface. For example, the operation in S107 may include an operation of entering text information in a text box and then tapping a "send" button, or an operation of selecting and sending a picture.

S108. The first terminal sends a MeeTime message to the message subsystem in the MeeTime cloud service, where the MeeTime message carries a peer number, that is, the second number, and further carries specific content of the message sent to the second user, for example, may be text content, a picture, or location information.

Because the MeeTime message carries the second number, the MeeTime cloud service may query whether the second number registers with the MeeTime cloud service, to avoid sending the MeeTime message to a phone number that does not register with MeeTime. Optionally, the MeeTime message may further carry the first number of the first terminal. In this way, the MeeTime cloud service may further query whether the first number registers with the MeeTime application, to avoid receiving a message from an unregistered user. Specifically, a process of querying whether a phone number registers with the MeeTime application may be implemented by performing the following steps S209 to S211.

S109. The message subsystem sends a query request to the management subsystem, where the query request carries the second number. Optionally, if the MeeTime message carries the first number, the query request may further carry the first number.

S110. The management subsystem in the MeeTime cloud service queries whether the second number registers with MeeTime. Optionally, if the query request carries the first number, the management subsystem may further query whether the first number registers with MeeTime.

Because all phone numbers registering with the MeeTime application are recorded in the management subsystem, the management subsystem determines whether the second number exists in all the recorded phone numbers, and if yes, determines that the second number registers with the MeeTime application. In this manner, sending the MeeTime message to a phone number that does not register with the MeeTime application is avoided. Optionally, the query request may further carry the first number. In this way, whether the first number of the first terminal registers with the MeeTime application may be further queried, to ensure that only a phone number registering with MeeTime can send a MeeTime message. In this way, security is improved.

S111. The management subsystem sends a query result to the call subsystem.

The query result may be that the second number registers with the MeeTime application or the second number does not register with the MeeTime application. Optionally, if the query request further includes the first number, the query result may further indicate that the first number registers or does not register with the MeeTime application. Optionally, S209 to S211 may or may not be performed. This is not limited in this embodiment of this application. Therefore, S209 to S211 are represented by dashed lines in the figure. When the query result indicates that the second number registers with the MeeTime application, S212 may be performed.

S112. The call subsystem sends the MeeTime message to the second terminal.

When receiving the MeeTime message, the second terminal may display a display interface shown in FIG. 2C(d). The interface is a MeeTime interface in which chat between the second user and the first user on the second terminal is displayed, and the interface includes the MeeTime message sent by the first user, for example, text information, an image, and a location.

The foregoing embodiment describes a process in which the first terminal sends, through the MeeTime application, the MeeTime message to the MeeTime application on the second terminal. It should be noted that the MeeTime message is based on a MeeTime protocol. The following briefly describes the MeeTime protocol.

The MeeTime protocol may be a text protocol in a binary compiled language. A number system of the compiled language is not limited. Alternatively, decimal numbers or the like may be used. A MeeTime protocol may be carried in the Transmission Control Protocol (Transmission Control Protocol, TCP). For example, refer to the following Table 1, which is an example of a format of the MeeTime protocol.

TABLE 1

|  | Protocol header | | | | | Service header | | | Service data |
| --- | --- | --- | --- | --- | --- | --- | --- | --- | --- |
|  | Length | Version | ServiceType | Control | TraceId | MsgType | MsgHeaderLength | MsgHeader | MsgBody |
| TCP Header | 2 Byte | 2 Byte | 1 Byte | 1 Byte | 8 Byte | 2 Byte | 2 Byte | | |

As shown in Table 1, the MeeTime protocol includes a protocol header, a service header, and service data. The protocol header mainly carries protocol information, the service header mainly carries service-related information, and the service data carries specific service data, for example, specific content of the MeeTime message sent by the first user to the second user, such as text information, a picture, and a location. The following describes the protocol header, the service header, and the service data.

The protocol header includes: BodyLength (BodyLength), Version (Version), ServiceType (ServiceType), Control (Control), and TraceId (TraceId).

BodyLength: indicates a length of a part that starts from "version" and includes a part of the protocol header, the whole service header, and the whole service data. The total length can be understood as a total of occupied bytes.

Version: indicates a current protocol version number, for example, MeeTime version 1.0 or MeeTime version 2.0.

ServiceType: indicates a service type which may also be referred to as a type of service, for example, call signaling or message signaling. The call signaling indicates that a current service is a MeeTime voice or video call, and the message signaling indicates that a current service is MeeTime message receiving and sending.

Control: indicates a control field. For example, each field is limited to a specific number of bits to avoid excessive traffic consumption caused by a large quantity of bits.

TraceId: indicates a trace ID, which is used for packet tracing on the terminal side and the side of the MeeTime cloud service.

The service header includes MsgType, MsgHeaderLength, MsgHeader, and MsgBody.

MsgType: indicates a sub-message type corresponding to ServiceType. If ServiceType is message signaling, MsgType includes, for example, message sending and message receipt, where the message receipt includes, for example, message read, message unread, and message inputting.

MsgHeaderLength: indicates a service header length of the sub-message type.

MsgHeader is a service header of the sub-message type. If MsgType indicates message sending, MsgHeader indicates a format of a message to be sent, for example, a picture format, a text format, and a location format. Take the picture format as an example. The MsgHeader may further include information such as resolution and pixels of the picture.

The service data includes MsgBody.

MsgBody is service data of the sub-message type, and indicates specific content of a sent message, like a text, a picture, or a location.

An example in which the first terminal and the second terminal perform MeeTime registration by using a phone number is used in the foregoing embodiment. In this case, the first registration request and the second registration request in S101 in FIG. 2B include only the phone number. Optionally, in addition to performing registration only by using the phone number, the first terminal and the second terminal may alternatively perform registration by using the phone number, a device identifier and/or a Huawei system account. The device identifier may be a model of the device, a type of the device (like a mobile phone or a television), or the like.

For example, the phone number, the system account, and the device identifier are used for registration. It is assumed that the phone number of the first terminal is the first number, a system account of the first terminal is a first account, the phone number of the second terminal is the second number, and a system account of the second terminal is a second account. A registration process of the first terminal may be the first terminal sending the first registration request to the MeeTime cloud service, where the first registration request carries the first number, the first account, and a device identifier of the first terminal. A registration process of the second terminal may be the second terminal sending the second registration request to the MeeTime cloud service, where the second registration request carries the second number, the second account, and a device identifier of the second terminal. Therefore, after receiving the registration requests from the first terminal and the second terminal, the MeeTime cloud service may perform recording, for example, store a correspondence among a phone number, a system account, and a device identifier. For example, refer to the following Table 2 which shows an example of the correspondence.

TABLE 2

| Phone number  | Device identifier | System account |
| --- | --- | --- |
| First number  | Huawei Mate 30 | First account  |
| Second number | Huawei P40     | Second account |

Usually, a system account can be used to log in to different devices. For example, the first user includes two devices: a mobile phone and a television, and both use the first account to log in. A phone number of the mobile phone is the first number, and registration may be performed by using the first number, the first account, and the device type (that is, a mobile phone). Similarly, the television may also register with the MeeTime application by using the first number, the first account, and the device type (that is, a television). Because the television does not have a SIM card, the television may obtain the first number in a specific manner. For example, a user inputs the first number on the television; or the television displays a QR code, and a user scans the QR code by using a mobile phone to connect to the television and sends the first number to the television. After obtaining the first number, the television may perform registration by using the first number, the first account, and the device identifier. To be specific, the television sends a registration request to the MeeTime cloud service, where the registration request carries the first number, the first account, and the device identifier: Huawei Vision X65. When receiving the registration request from the television, the MeeTime cloud service performs recording. For example, refer to Table 3.

TABLE 3

| Phone number  | Device identifier | System account |
| --- | --- | --- |
| First number  | Huawei Vision X65 | First account  |
| Second number | Huawei Vision X55 | Second account |

It may be understood that the MeeTime cloud service may integrate the foregoing Table 2 and Table 3 to obtain the following Table 4.

TABLE 4

| Phone number  | Device identifier                  | System account |
| --- | --- | --- |
| First number  | Huawei Vision X65<br>Huawei Mate 30 | First account  |
| Second number | Huawei Vision X55<br>Huawei P40    | Second account |

Because device identifiers of different devices corresponding to users (for example, phone numbers) are stored in the MeeTime cloud service, a MeeTime video/voice call may be initiated or a MeeTime message may be sent to a television or a mobile phone of a peer user.

Figure 2D:
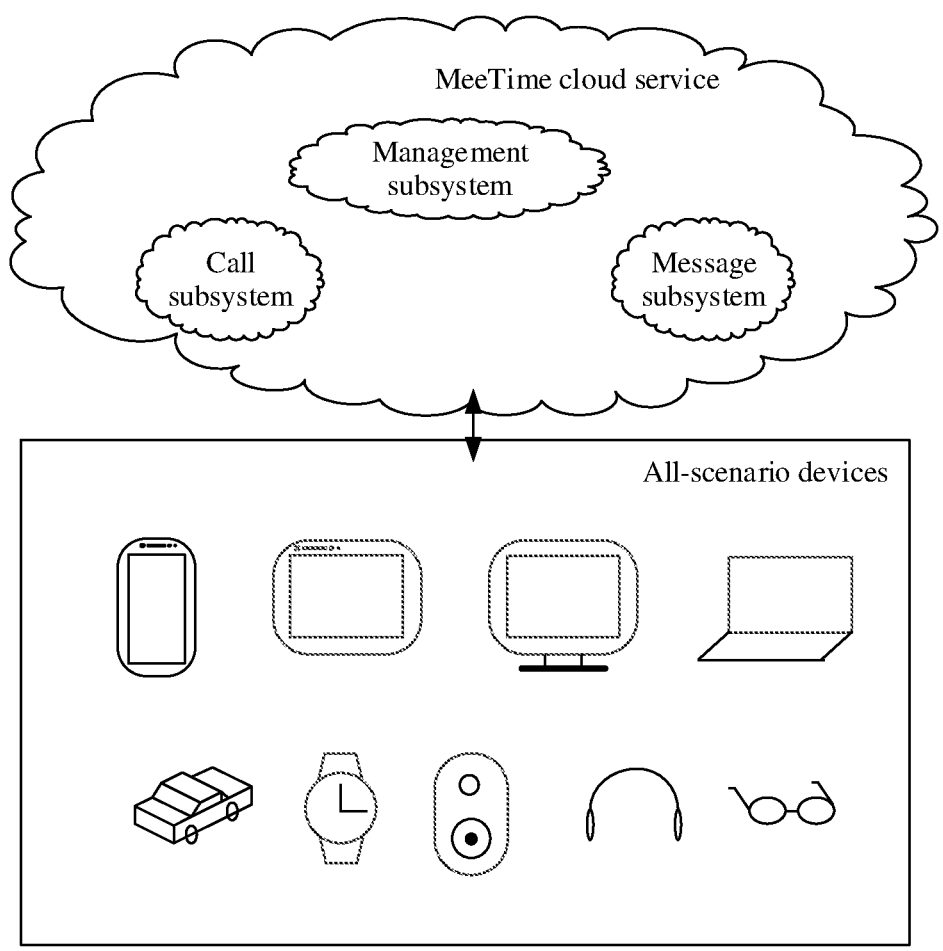

In this way, interconnection between all-scenario devices can be achieved by using the MeeTime cloud service. For example, refer to FIG. 2D. The all-scenario device is a general term for various types of devices, for example, a mobile phone, a sound box, or a smart screen like a tablet computer, a PC, or a television, and may further include a wearable device like a watch, a band, a headset, and glasses. By using the MeeTime cloud service, communication between the all-scenario devices can be implemented. For example, communication between a mobile phone and a television, between a mobile phone and a head unit, and between a mobile phone and a watch can be implemented.

However, the Huawei MeeTime application has some limitations. For example, when two terminals use MeeTime to send MeeTime messages to each other or make MeeTime voice or video calls, the MeeTime application on the two terminals needs to be registered with. This method is not applicable to a terminal on which the MeeTime application is not installed or a terminal on which the MeeTime application is not registered with.

2. RCS Application

The RCS application is an application having a 5G message function compared with a conventional SMS application. That is, the RCS application is upgraded from the conventional SMS application. Usually, the conventional SMS applications can send and receive texts and pictures (that is, MMS messages). Compared with the conventional SMS application, the RCS application supports rich media messages (also referred to as 5G messages or RCS messages) such as images and texts, emoticons, audio/video messages, group chats, locations, and files of users, and can be applied to more types of services.

Before introducing a communication system that supports the RCS application, IP multimedia subsystem (IP multimedia subsystem, IMS), rich media information services (rich communication services, RCS), and RCS Hub are first introduced.

The IMS is responsible for network access of a terminal. The terminal may be a mobile terminal, a fixed-line phone terminal, a multimedia terminal, a PC, or the like. An access manner is not limited to using a cellular radio frequency interface, WCDMA for wireless communication, or a wired LAN, xDSL, or other technologies. The IMS is used to enable various types of terminals to establish IP connections. Through the IP connections, terminals can transmit information to each other. There are a plurality of IMSs. For example, different carriers correspond to different IMSs. For example, China Telecom corresponds to IMS1, China Unicom corresponds to IMS2, and China Mobile corresponds to IMS3.

The RCS integrates communication services such as voice call, messaging, and location sharing services to enrich user experience of native mobile phone applications such as "Calls", "Messages", and "Contacts". By using the RCS, in addition to sending texts, images, or audio/videos, interaction functions can be implemented, for example, checking whether the other party is online. There are various RCS. For example, different carriers correspond to different RCS. For example, China Telecom corresponds to RCS1, China Unicom corresponds to RCS2, and China Mobile corresponds to RCS3. In this case, RCS1 corresponding to China Telecom provides communication services for China Telecom phone numbers, RCS2 corresponding to China Unicom provides communication services for China Unicom phone numbers, and RCS3 corresponding to China Mobile provides communication services for China Mobile phone numbers.

The RCS Hub is a higher-level server set above the RCS, and is configured to manage all the RCS, for example, the foregoing RCS1 to RCS3.

Figure 3A:
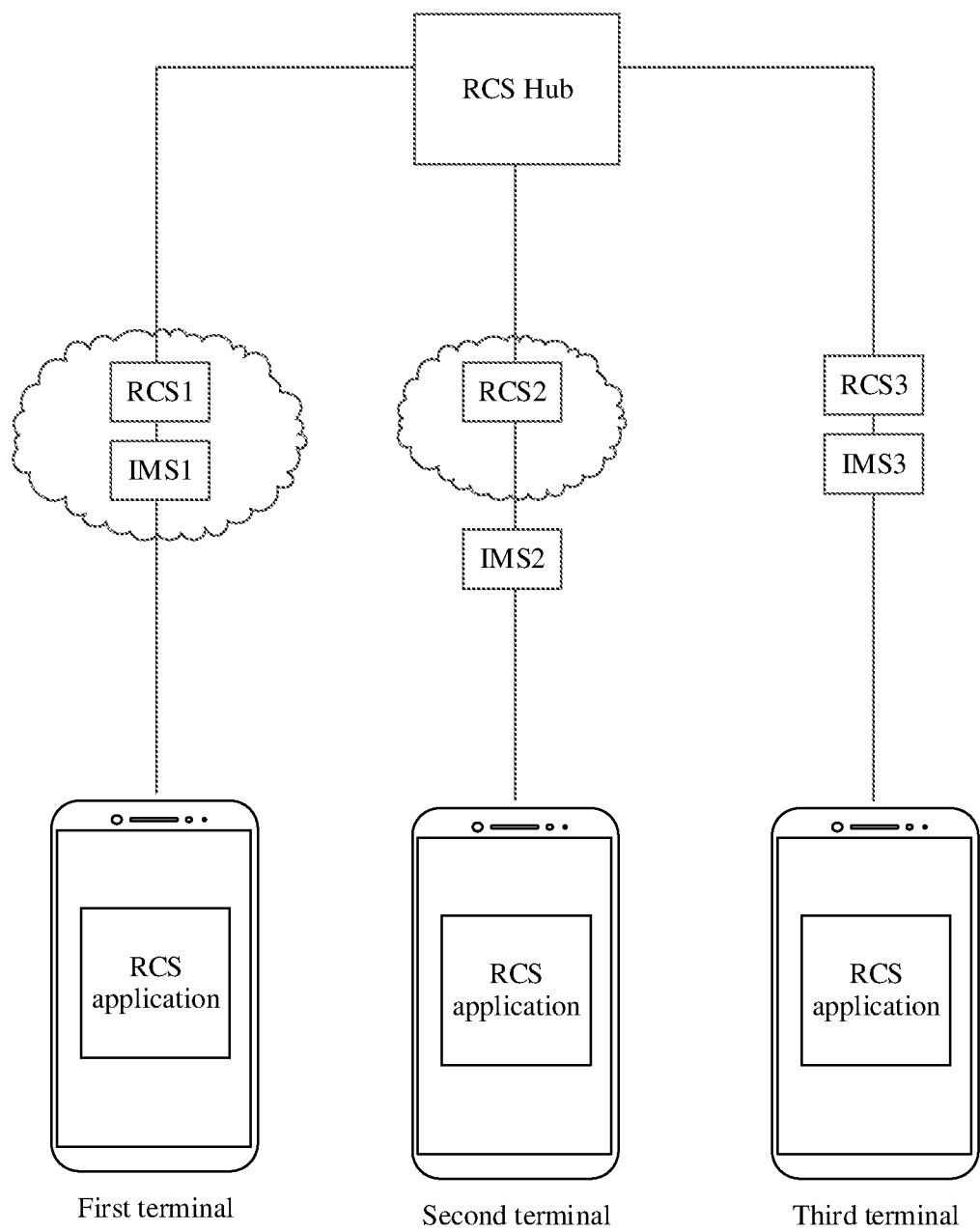
FIG. 3A to FIG. 3E are schematic diagrams of a communication principle of an RCS application according to an embodiment of this application.

FIG. 3A is a schematic diagram of a communication system supporting the RCS application. The system includes a first terminal, a second terminal, an IMS1, an IMS2, an RCS1, an RCS2, and an RCS Hub. The first terminal is within a management range of the IMS1. To be specific, the first terminal accesses a network through the IMS1, and the IMS1 is within a range of the RCS1. When receiving an RCS message from a terminal within the management range of the IMS1, the IMS1 sends the RCS message to the RCS1 for processing. The second terminal is within a management range of the IMS2. To be specific, the second terminal accesses a network through the IMS2, and the IMS2 is within a range of the RCS2. When receiving an RCS message from a terminal within the management range of the IMS2, the IMS2 sends the RCS message to the RCS2 for processing. The RCS Hub manages the RCS1 and the RCS2.

Figure 3B:
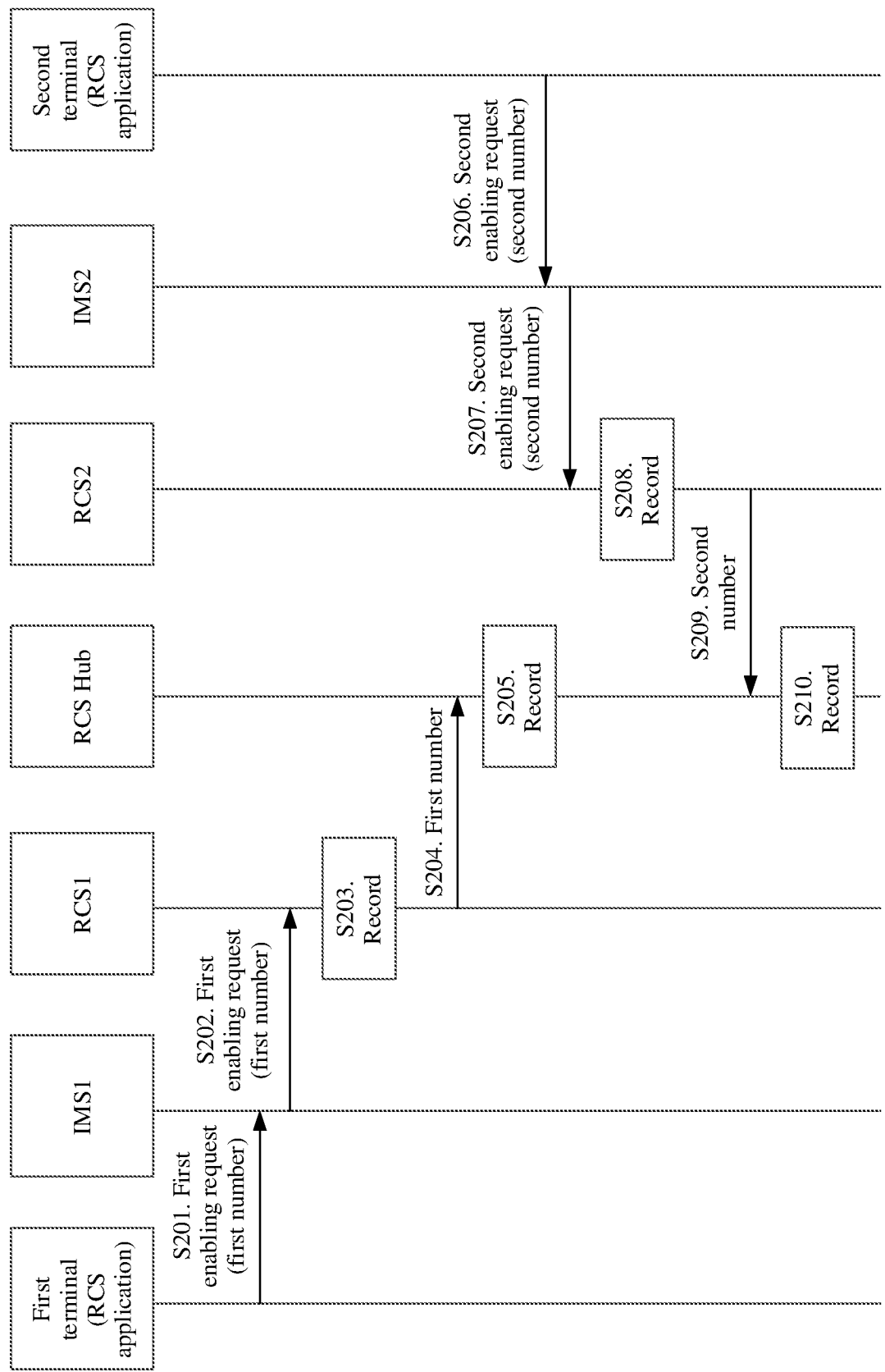

The first terminal and the second terminal may first enable an RCS function before using the RCS application. For example, refer to FIG. 3B. FIG. 3B shows a process in which the first terminal and the second terminal enable the RCS. The process includes the following steps.

S201. The first terminal sends a first enabling request to the IMS1, where the first enabling request carries a first number of the first terminal.

Optionally, the RCS is preconfigured for an SIM card, in other words, the SIM card is a SIM card that supports the RCS. In this case, when the SIM card is inserted into the first terminal, a first enabling request may be sent to enable the RCS. Alternatively, when the SIM card is inserted into the first terminal, the first terminal provides an enabling button. When it is detected that the user triggers the enabling button, the first enabling request is sent to enable the RCS.

S202. The IMS1 sends the first enabling request to the RCS1.

S203: The RCS1 performs recording, that is, records the first number.

S204. The RCS1 sends the first number to the RCS Hub.

S205. The RCS Hub performs recording, that is, records the first number.

A principle used in a process in which the second terminal enables the RCS is the same as that used in the process in which the first terminal enables the RCS. Details are as follows.

S206. The second terminal sends a second enabling request to the IMS2, where the second enabling request carries a second number of the second terminal.

S207. The IMS2 sends the second enabling request to the RCS2.

S208. The RCS2 performs recording, that is, records the second number.

S209. The RCS2 sends the second number to the RCS Hub.

S210. The RCS Hub performs recording, that is, records the second number.

If the first number of the first terminal and the second number of the second terminal do not belong to a same carrier, the IMS1 and the IMS2 are not the same, and the RCS1 and the RCS2 are not the same. If the first number of the first terminal and the second number of the second terminal belong to a same carrier, the IMS1 and the IMS2 may be the same, and the RCS1 and the RCS2 may be the same. In other words, all phone numbers stored in the RCS1 belong to a same carrier, and all phone numbers stored in the RCS2 belong to another carrier. However, all the numbers of the RCS1 and the RCS2 are recorded by the RCS Hub, in other words, the RCS Hub stores a phone number recorded in each RCS. For example, refer to Table 5. The RCS Hub stores a large quantity of phone numbers and an RCS recording each phone number.

TABLE 5

| RCS1 | 156xxxxxxxx (China Unicom) |
| --- | --- |
|  | 185xxxxxxxx (China Unicom) |
| RCS2 | 138xxxxxxxx (China Mobile) |
|  | 159xxxxxxxx (China Mobile) |
| RCS3 | 133xxxxxxxx (China Telecom) |

The foregoing is a process in which the first terminal and the second terminal enable the RCS, and a principle used in a process in which another terminal enables the RCS is the same.

Figure 3C:
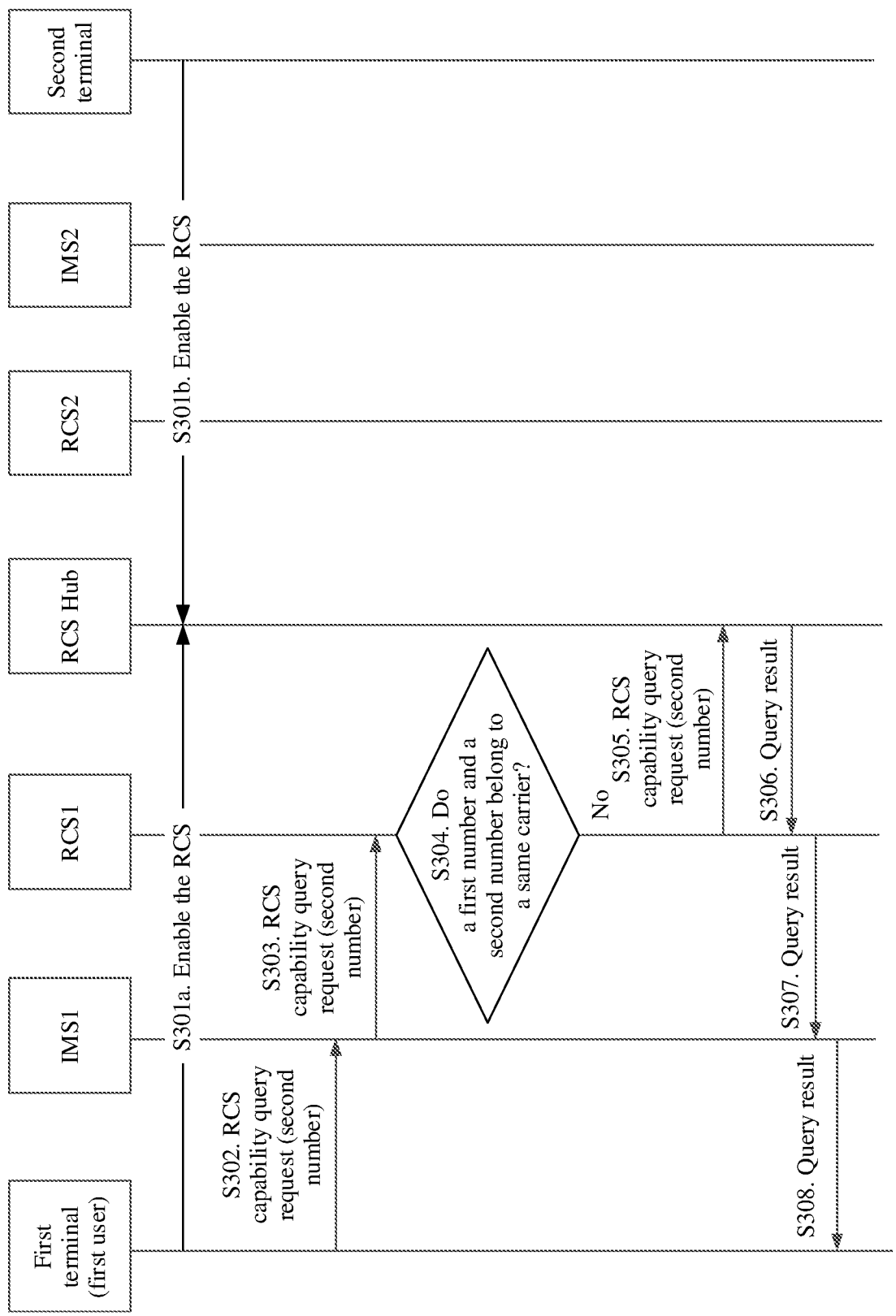

After the first terminal and the second terminal enable the RCS, the first terminal can discover an RCS function of the second terminal, and the second terminal can also discover an RCS function of the first terminal. An example in which the first terminal discovers the RCS function of the second terminal is used. Refer to FIG. 3C. FIG. 3C is a schematic flowchart in which an RCS application on the first terminal discovers the RCS function of the second terminal. As shown in FIG. 3C, the process includes the following steps.

S301. The first terminal and the second terminal enable the RCS. Specifically, S301 includes S301a and S301b.

S302. The first terminal sends, to the IMS1, an RCS capability query request used for requesting to query whether the second number enables the RCS, where the RCS capability query request carries the first number and the second number.

S303. The IMS1 sends the RCS capability query request to the RCS1.

S304. The RCS1 determines whether the first number and the second number belong to the same carrier. If yes, the RCS locally queries whether the second number exists. If yes, the RCS1 determines that the second number enables the RCS; otherwise, the RCS1 determines that the second number does not enable the RCS. If the first number and the second number do not belong to the same carrier, perform S305.

As described above, if the first number and the second number belong to the same carrier, both the first number and the second number enable the RCS1. Therefore, the first number and the second number exist in the RCS1. If the first number and the second number do not belong to the same carrier, the second number does not exist in the RCS1. In this case, the RCS Hub can be used to query whether the second number enables the RCS.

S305. The RCS1 sends the RCS capability query request to the RCS Hub.

S306. The RCS Hub sends a query result to the RCS1.

As described above, the RCS Hub stores the phone numbers from all RCS. When the phone numbers include the second number, it is determined that the second number enables the RCS; otherwise, it is determined that the second number does not enable the RCS.

S307. The RCS1 sends a query result to the IMS1.

S308. The IMS1 sends the query result to the first terminal.

When finding that the second terminal has the RCS function, the first terminal may perform marking in a specific manner. For example, when an address book of the first terminal stores the second number of the second terminal, the first terminal may perform marking in the address book. For example, refer to FIG. 3D(a). The address book of the first terminal displays a second user like John, and further displays an RCS video call mark 301, an RCS voice call mark 302, and an RCS message mark 303, which are used to indicate that the second user John enables the RCS. Optionally, the first terminal may discover a contact that enables the RCS in the address book.

Therefore, the first terminal may report the address book to the RCS1 (for example, send the address book to the RCS1 through the IMS1), and the RCS1 reports the address book to the RCS Hub. Because the RCS Hub learns of all phone numbers enabling the RCS, the RCS Hub can determine contacts whose phone numbers enable the RCS in the address book of the first terminal, and notify the first terminal. The first terminal may mark, in a specific manner, a contact that enables the RCS in the address book.

After finding that the second terminal enables the RCS, the first terminal may perform RCS communication with the second terminal. The RCS communication may include RCS video/voice communication, or RCS message exchange. The following uses RCS message exchange as an example. Refer to FIG. 3E. FIG. 3E is a schematic flowchart of sending an RCS message by the first terminal to the second terminal. As shown in the figure, the process includes the following steps.

S401. The first terminal detects an operation of sending the RCS message to the second number.

Before S401, the process may further include the following step: The first terminal displays an RCS interface for chat with the second user, and sends the RCS message to the second user in the RCS chat interface. For example, refer to FIG. 3D(a). When detecting an operation for contact John, the first terminal displays an interface shown FIG. 3D(b). The interface may be understood as an RCS interface in which chat with the second number, that is, John, is displayed. The RCS chat interface includes an image sending option, a voice message sending option, a video call option, and the like for the user. That is, the first user of the first terminal may send various types of RCS messages to the second user. For example, the operation in S401 may include an operation of entering text information in a text box and then tapping a "send" button, or an operation of selecting and sending a picture.

S402. The first terminal sends the RCS message to the IMS1, where the RCS message includes the second number, and the RCS message includes specific content of the message sent by the first terminal, for example, text information, a picture, and a location. Optionally, the RCS message may further carry the first number.

S403. The IMS1 sends the RCS message to the RCS1.

S404. The RCS1 sends the RCS message to the RCS Hub.

Optionally, before S404, the RCS1 may first determine whether the first number and the second number belong to the same carrier. If yes, the RCS1 may directly send the RCS message to the second terminal because the RCS1 is responsible for terminals belonging to a same carrier. If the first number of the first terminal and the second number of the second terminal belong to the same carrier, both the first terminal and the second terminal enable the RCS1. Therefore, the RCS1 may directly send the RCS message to the second terminal. If the RCS1 determines that the first number and the second number do not belong to the same carrier, the RCS1 cannot directly send the RCS message to the second terminal, but may send the RCS message to the second terminal through the RCS Hub. A process of sending the RCS message to the second terminal through the RCS Hub is implemented by performing the following steps.

S405. The RCS Hub determines that an RCS corresponding to the second number is the RCS2.

For example, refer to Table 5. The RCS Hub stores phone numbers enable RCS of different carriers. Therefore, according to Table 5, the RCS Hub can determine an RCS corresponding to the second number, for example, the RCS2.

S406. The RCS Hub sends the RCS message to the RCS2.

S407. The RCS2 sends the RCS message to the IMS2.

S408. The IMS2 sends the RCS message to the second terminal. Because the RCS message carries the second number of the second terminal, the IMS2 may send the RCS message to the second terminal based on the second number.

Figure 3D:
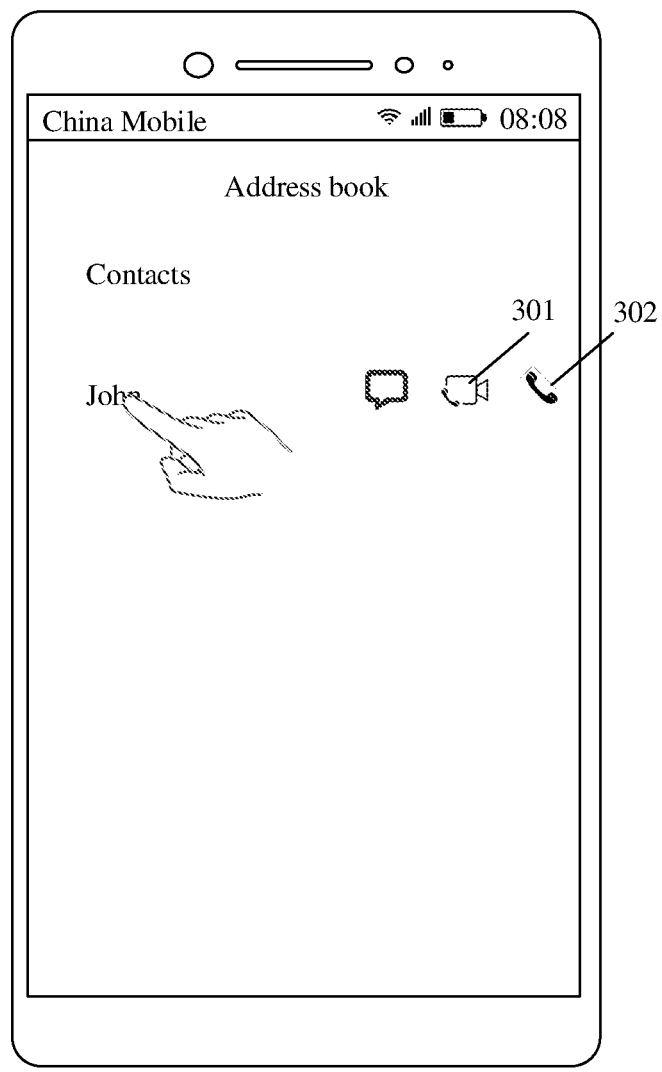
Figure 3D:
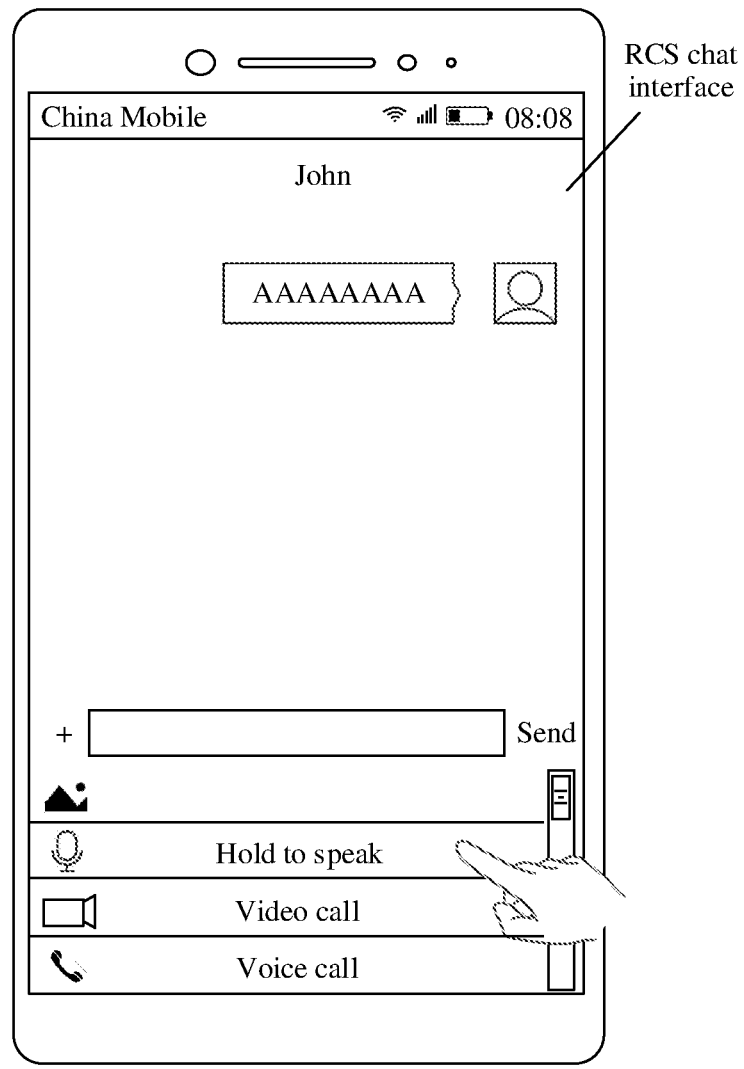
Figure 3D:
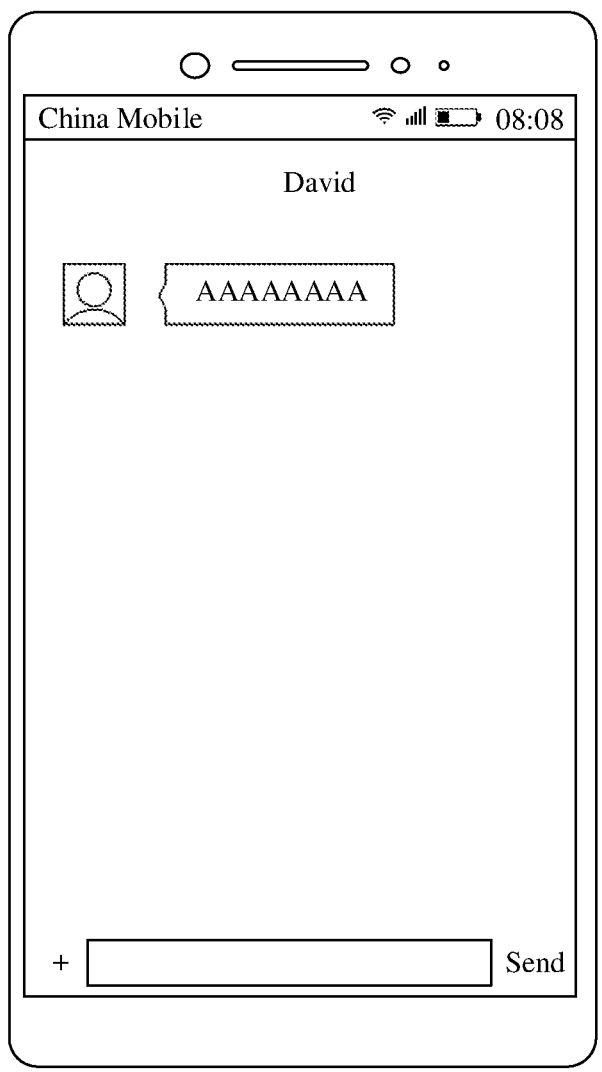
Figure 3E:
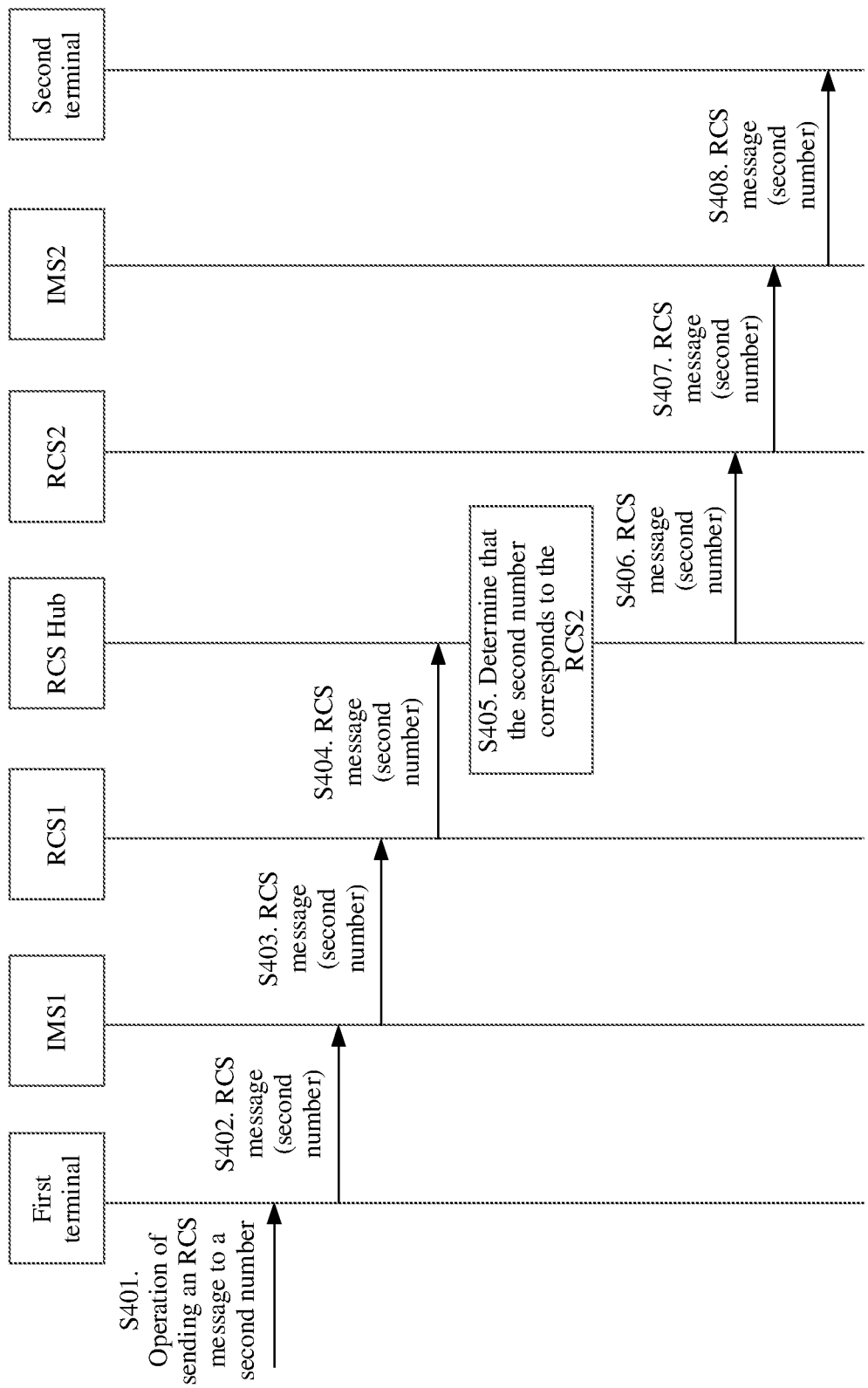

For example, refer to FIG. 3D(c). The second terminal displays the RCS message sent by the first user (that is, David).

The foregoing embodiment describes the process in which the first terminal sends the RCS message to the second terminal by using the RCS application. It should be noted that processing based on an RCS protocol is required for sending the RCS message. The following briefly describes the RCS protocol.

The RCS protocol is defined by the GSMA and carried by UDP or TCP. Featured by heavy traffic consumption and excessive interaction processes, the RCS protocol is a SIP protocol and has a large message body. For example, refer to the following Table 6. Table 6 is an example format of the RCS protocol.

TABLE 6

| TCP\UDP Header | SIP message body |
|---|---|
| ... | ... |

A format of the SIP message body includes:
message-header
CRLF (carriage return and line feed)
message-body The message-header contains RCS protocol information, such as Conversation-ID (a randomly generated character string). The message-body field contains a sender number, a receiver number, and specific content of sent information.

The RCS application has a 5G function compared with the conventional SMS application. Usually, the conventional SMS application is installed on every terminal device. For example, regardless of manufacturers and models of mobile phones, the SMS application is installed on the mobile phones. Therefore, the RCS application is installed on every terminal, and users do not need to worry about a situation where the RCS application is not installed. In other words, there are substantial potential users of the RCS application. However, the RCS application has limitations. For example, a carrier of the RCS application is a mobile phone, and cannot be a random device like a television, a tablet computer, or a PC that does not have a SIM card.

The foregoing describes the Huawei MeeTime application and the RCS application. The two applications have advantages and disadvantages. Currently, the MeeTime application cannot interwork with the RCS application. For example, a MeeTime application on a terminal can interwork only with a MeeTime application on another terminal, or an RCS application on a terminal can interwork only with an RCS application on another terminal. A MeeTime application on one device cannot communicate with an RCS application on another device. According to the method for cross-application interconnection between different devices provided in embodiments of this application, communication between a MeeTime application on one terminal and an RCS application on another terminal can be implemented.

Figure 4:
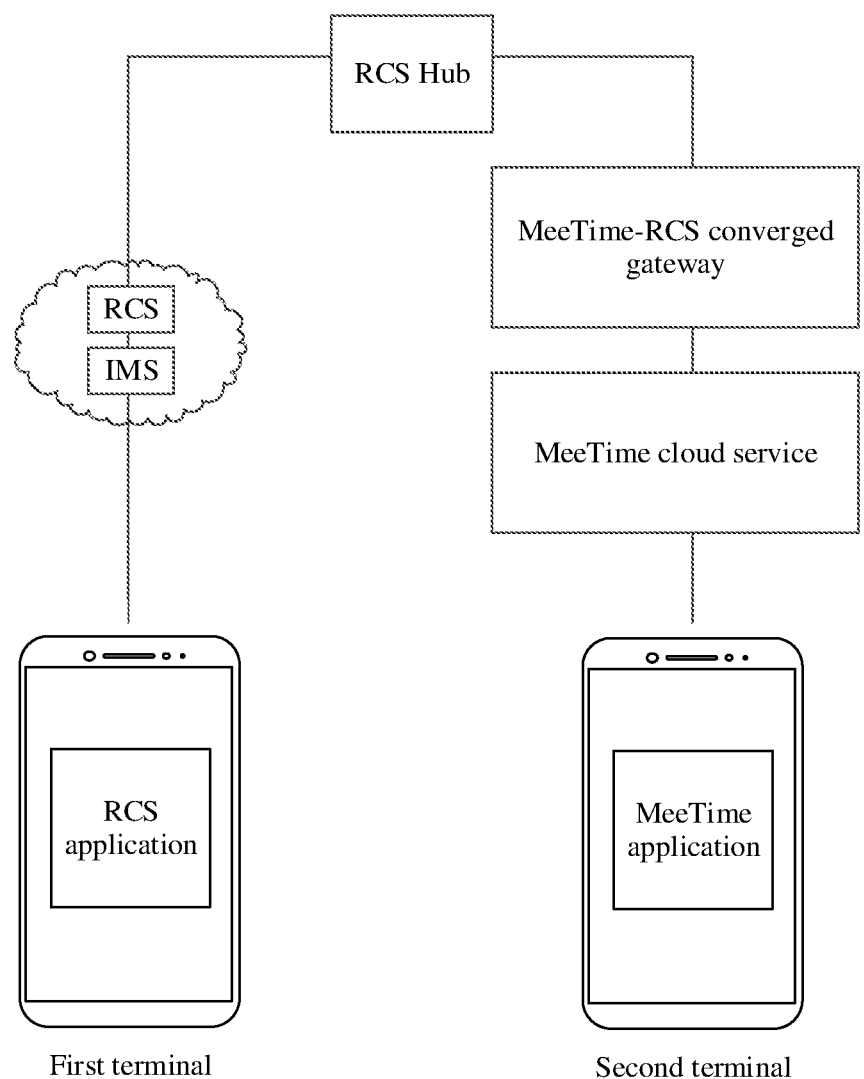
FIG. 4 is a schematic diagram of a principle of communication between an RCS application and a MeeTime application according to an embodiment of this application.

An example in which the first terminal enables the RCS application and the second terminal registers with the MeeTime application is used for ease of description. FIG. 4 is a schematic diagram of a structure of a communication system for implementing the method for cross-application interconnection between different devices according to an embodiment of this application. As shown in FIG. 4, the system includes a first terminal and a second terminal. The first terminal includes an RCS application. The system further includes an IMS that manages the first terminal, an RCS that manages the IMS, and an RCS Hub that manages and controls the RCS. For a process of information exchange between the RCS application on the first terminal, the IMS, and the RCS Hub of the RCS, refer to FIG. 3B or FIG. 3C. Details are not described herein again. A MeeTime application is installed on the second terminal. The system further includes a MeeTime cloud service, which is used for communicating with the MeeTime application on the second terminal. For a process of information exchange between the second terminal and the MeeTime cloud service, refer to FIG. 2B. Details are not described herein again.

The system further includes a MeeTime-RCS converged gateway (the name is merely an example, and may be another name). The MeeTime-RCS converged gateway connects the RCS Hub and the MeeTime cloud service, and can perform conversion between a MeeTime protocol and the RCS protocol, to implement interconnection between the RCS application on the first terminal and the MeeTime application on the second terminal.

By comparing the communication system corresponding to the MeeTime application shown in FIG. 2A with the communication system shown in FIG. 4, it can be learnt that compared with the communication system shown in FIG. 2A, in addition to the MeeTime cloud service, the communication system shown in FIG. 4 includes the MeeTime-RCS converged gateway and the IMS, the RCS, and the RCS Hub that support the RCS application. By comparing the communication system corresponding to the RCS application shown in FIG. 3A with the communication system shown in FIG. 4, it can be learnt that compared with the communication system shown in FIG. 3A, the communication system shown in FIG. 4 includes the MeeTime-RCS converged gateway and the MeeTime cloud service in addition to the IMS, the RCS, and the RCS Hub. In other words, connection between the RCS Hub and the MeeTime cloud service is implemented by using the MeeTime-RCS converged gateway. In this way, interconnection between the RCS application on the first terminal and the MeeTime application on the second terminal are implemented.

The following embodiments are described by using an architecture shown in FIG. 4 as an example.

Specifically, Embodiment 1 and Embodiment 2 are included. Embodiment 1 describes a process of communication between an RCS application on a first terminal and a MeeTime application on a second terminal. Embodiment 2 describes a process about communication between a MeeTime application on the second terminal and an RCS application on the first terminal.

Embodiment 1

In Embodiment 1, an example in which the first terminal includes the RCS application and the second terminal includes the MeeTime application is used to describe a process in which the first terminal initiates communication to the MeeTime application on the second terminal by using the RCS application. The communication includes making a MeeTime video/voice call, and further includes sending a MeeTime message. In Embodiment 1, sending a MeeTime message is used as an example for description.

In Embodiment 1, the RCS application on the first terminal can find whether the second terminal registers with MeeTime, and if yes, the RCS application may be used to communicate with the MeeTime application on the second terminal. Specifically, for a process in which the RCS application on the first terminal discovers the MeeTime function of the second terminal, refer to FIG. 5A-1 to FIG. 5C. For a process of communication between the RCS application on the first terminal and the MeeTime application on the second terminal, refer to FIG. 6A-1 to FIG. 7C.

Figures 1, 5A:
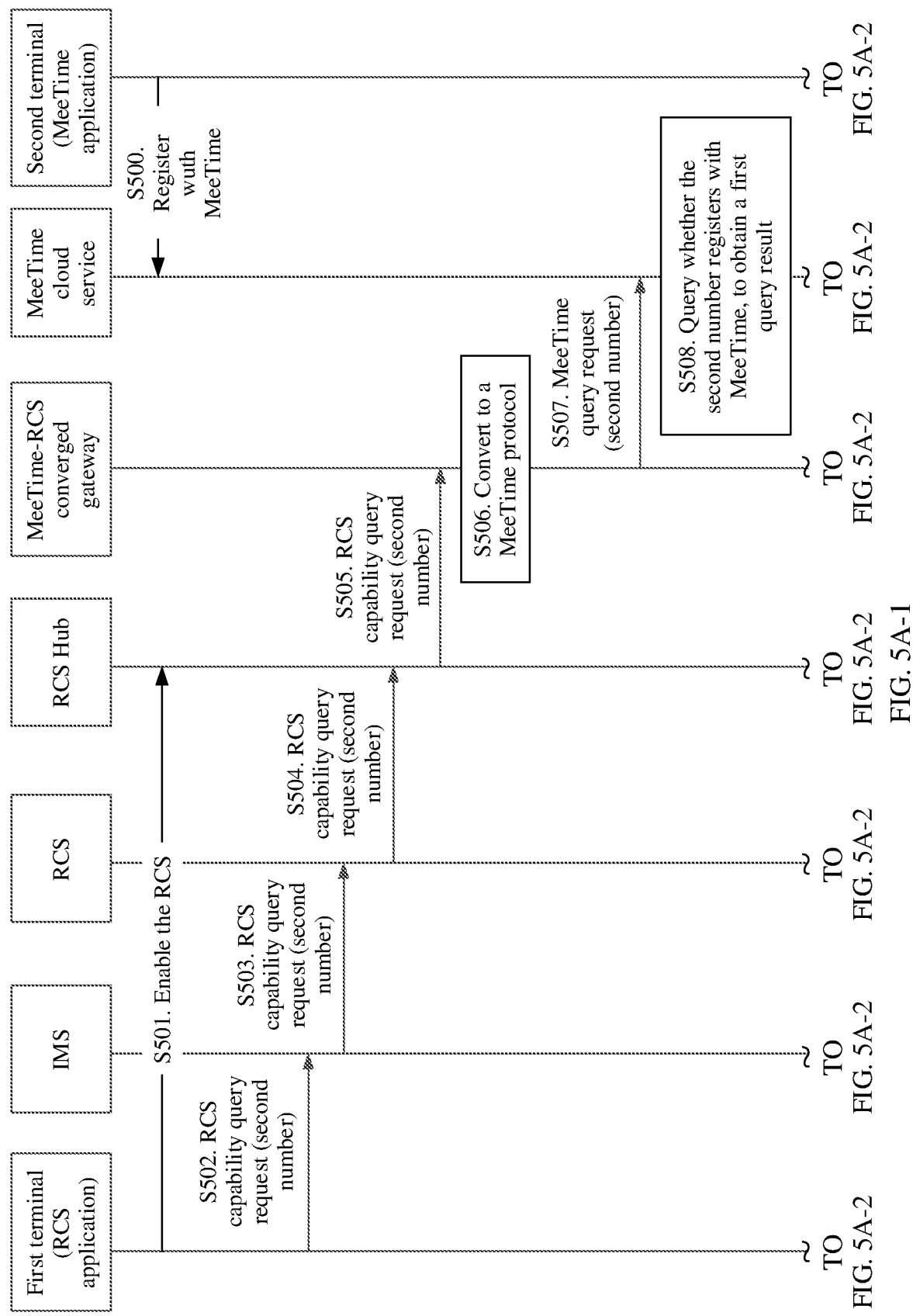
FIG. 5A-1 to FIG. 5C are schematic diagrams of querying, by an RCS application on a first terminal, whether a second terminal enables a MeeTime application according to an embodiment of this application.
Figures 1, 6A:
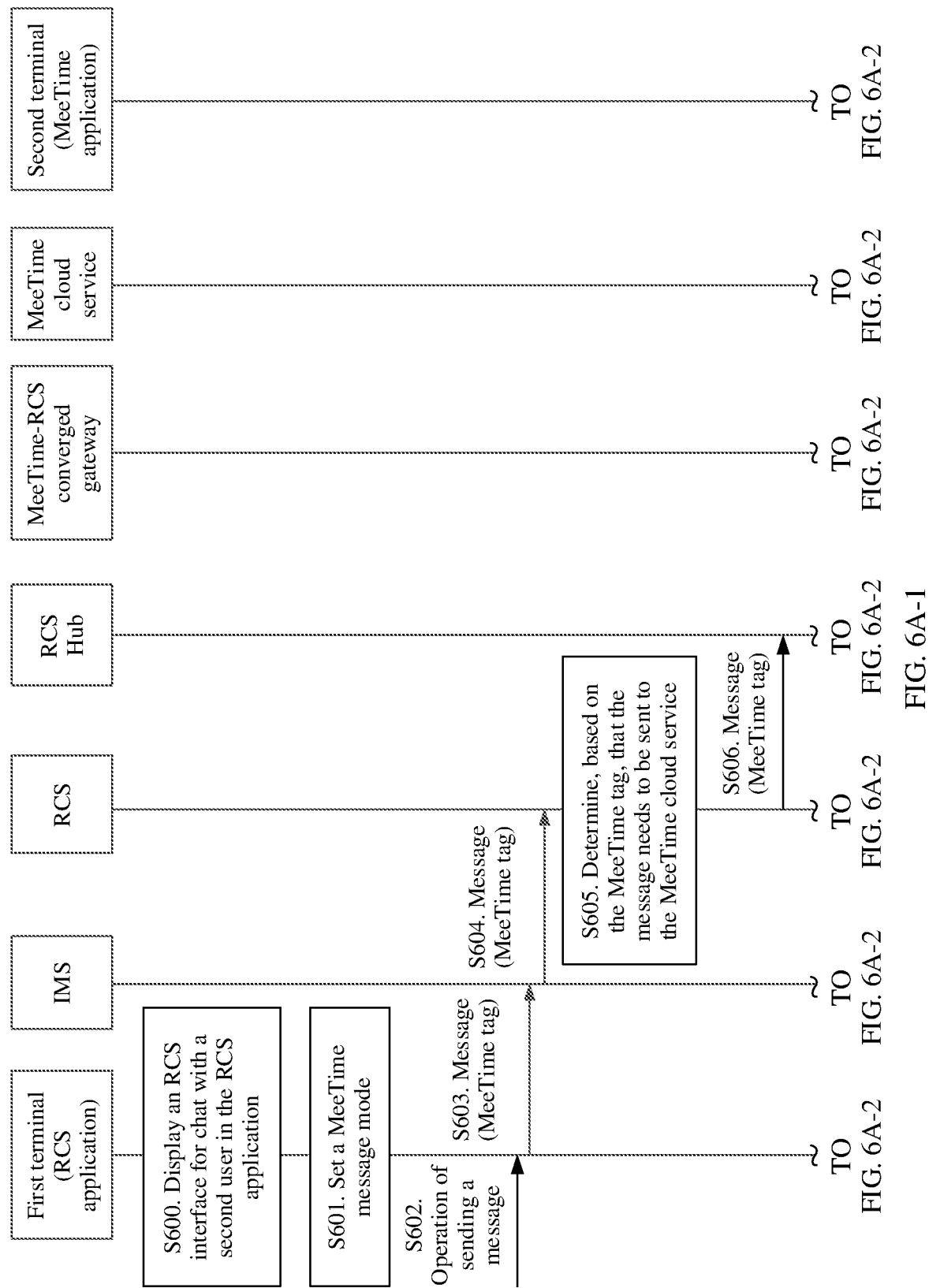
Figures 2, 6A:
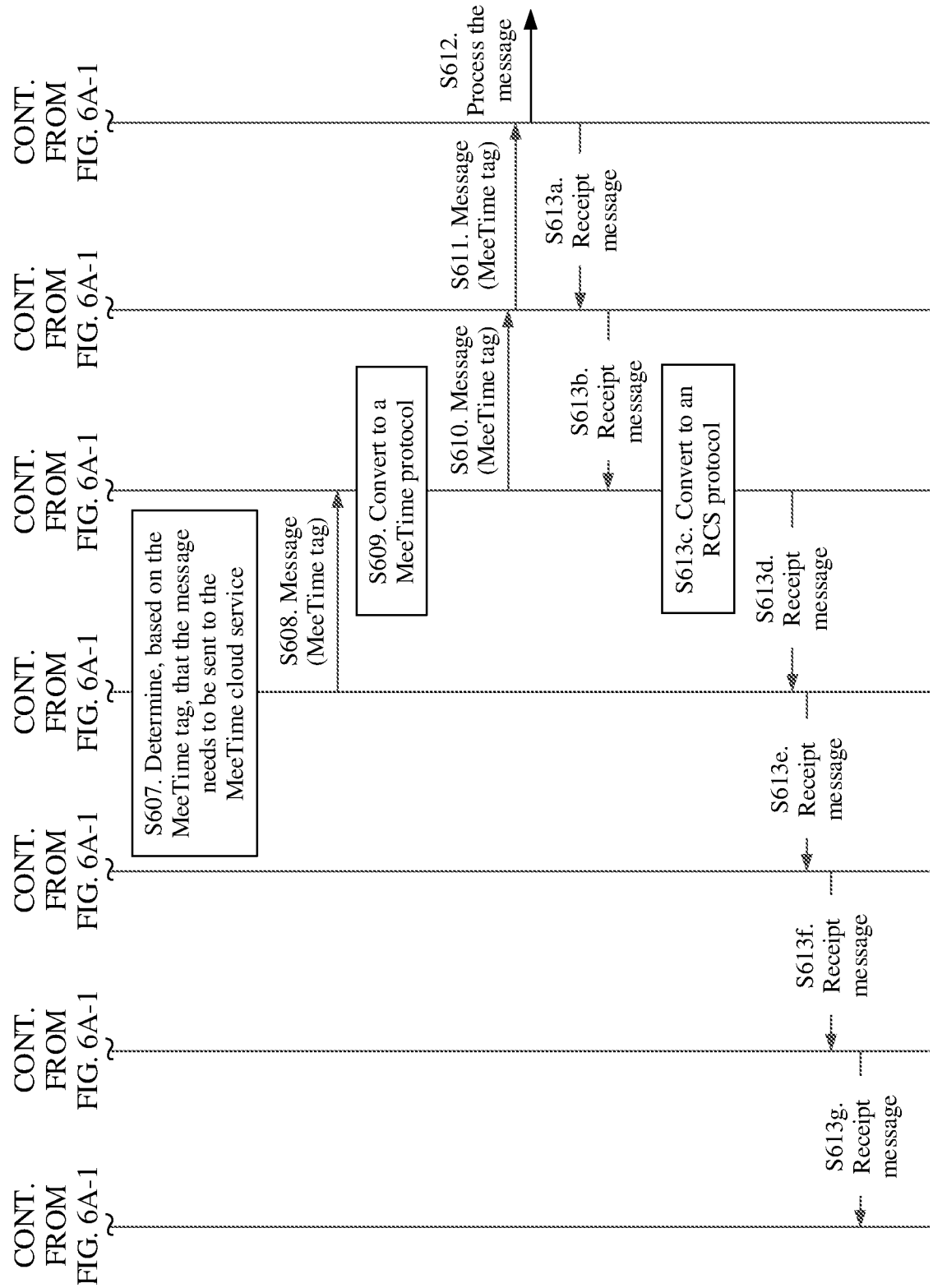

Refer to FIG. 5A-1 and FIG. 5A-2. FIG. 5A-1 and FIG. 5A-2 are a schematic flowchart of discovering a MeeTime function of the second terminal by the RCS application on the first terminal. As shown in FIG. 5A-1 and FIG. 5A-2, the process includes the following steps.

S500. The second terminal registers with the MeeTime application. For a process in which the second terminal registers with the MeeTime application, refer to the foregoing descriptions of the MeeTime application. Details are not described herein again.

S501. The first terminal enables the RCS. For a process in which the first terminal enables the RCS, refer to the foregoing descriptions of the RCS application. Details are not described herein again.

It should be noted that an execution sequence of S500 and S501 is not limited.

S502. The first terminal sends an RCS capability query request to an IMS, where the RCS capability query request carries the second number of the second terminal. The RCS capability query request is used to request to query an RCS capability of the second number (that is, whether the RCS is enabled). The RCS capability query request is encapsulated by using an RCS protocol.

Optionally, the first terminal may immediately send the RCS capability query request after enabling the RCS, where the RCS capability query request may carry all numbers in the address book of the first terminal, in other words, the first terminal immediately queries contacts having an RCS capability via all numbers in the address book after enabling the RCS. Alternatively, the first terminal sends the RCS capability query request when detecting an operation used to trigger querying of the RCS capability of the second user. The operation triggered by the user to query the RCS capability of the second user may be, for example, an operation of displaying an RCS interface for chat with the second user, that is, when detecting display of the RCS interface for chat with the second user, the first terminal sends the RCS capability query request.

S503. The IMS sends the RCS capability query request to the RCS.

S504. The RCS sends the RCS capability query request to the RCS Hub.

For ease of understanding, comparison may be made with the foregoing process in FIG. 3E in which the RCS application on the first terminal queries the RCS capability of the second terminal. In FIG. 3E, when the RCS receives the RCS capability query request, if the first number and the second number belong to different carriers, the RCS sends the RCS capability query request to the RCS Hub, to query whether the second number enables the RCS. If the first number and the second number belong to a same carrier, the RCS does not need to send the RCS capability query request to the RCS Hub, but the RCS locally queries the RCS capability. However, in FIG. 5A-1, when receiving the RCS capability query request, the RCS sends the RCS capability query request to the RCS Hub by default, to query whether the second number enables the RCS and whether the second number registers with the MeeTime. In other words, the RCS does not need to determine whether the first number and the second number belong to the same carrier. By default, the RCS sends the RCS capability query request to the RCS Hub, which reduces workload of the RCS.

S505. The RCS Hub sends the RCS capability query request to the MeeTime-RCS converged gateway.

The MeeTime-RCS converged gateway converts a protocol of the RCS capability query request to a MeeTime protocol. Comparison with FIG. 3E is made. In FIG. 3E, when receiving the RCS capability query request, the RCS Hub determines whether the second number enables the RCS and feeds back a query result. In FIG. 5A-1, the RCS Hub needs to determine whether the second number enables the RCS and feed back the result, and needs to send the RCS capability query request to the MeeTime-RCS converged gateway, to query whether the second number registers with MeeTime.

The MeeTime-RCS converged gateway may provide a first capability query interface. The first capability query interface is configured to receive an RCS capability query request.

S506. The MeeTime-RCS converged gateway converts the protocol of the RCS capability query request to the MeeTime protocol, so as to obtain the MeeTime query request.

The RCS capability query request received by the MeeTime-RCS converged gateway from the RCS Hub is encapsulated by using the RCS protocol. If the MeeTime query request is to be sent to the MeeTime cloud service, the protocol of the RCS capability query request needs to be converted to the MeeTime protocol. For descriptions of the MeeTime protocol and the RCS protocol, refer to the foregoing descriptions. Details are not described herein again.

S507. The MeeTime-RCS converged gateway sends the MeeTime query request to the MeeTime cloud service.

S508. The MeeTime cloud service queries whether the second number registers with the MeeTime application, to obtain a first query result.

S509. The MeeTime cloud service sends the first query result to the MeeTime-RCS converged gateway, where the first query result is encapsulated by using the MeeTime protocol.

S510. The MeeTime-RCS converged gateway converts a protocol of the first query result to the RCS protocol.

Because the first query result received by the MeeTime-RCS converged gateway from the MeeTime cloud service is encapsulated by using the MeeTime protocol. If the first query result is to be sent to the RCS Hub, the protocol of the first query result needs to be converted to the RCS protocol.

S511. The MeeTime-RCS converged gateway sends the first query result on which protocol conversion is performed to the RCS Hub.

S512. The RCS Hub queries whether the second number enables the RCS and obtains a second query result.

S513. The RCS Hub sends a third query result to the RCS. The third query result includes the first query result and the second query result.

S514. The RCS sends the third query result to the IMS.

S515. The IMS sends the third query result to the first terminal.

In the foregoing embodiment, the first query result and the second query result are sent to the first terminal together. Optionally, the first query result and the second query result may be separately sent. For example, after S504, the RCS Hub immediately performs S512, that is, queries whether the second number enables RCS, and feeds back the second query result to the first terminal. In this way, S512 does not need to be performed after S511, and the first query result is sent in S513 to S515.

Figure 5B:
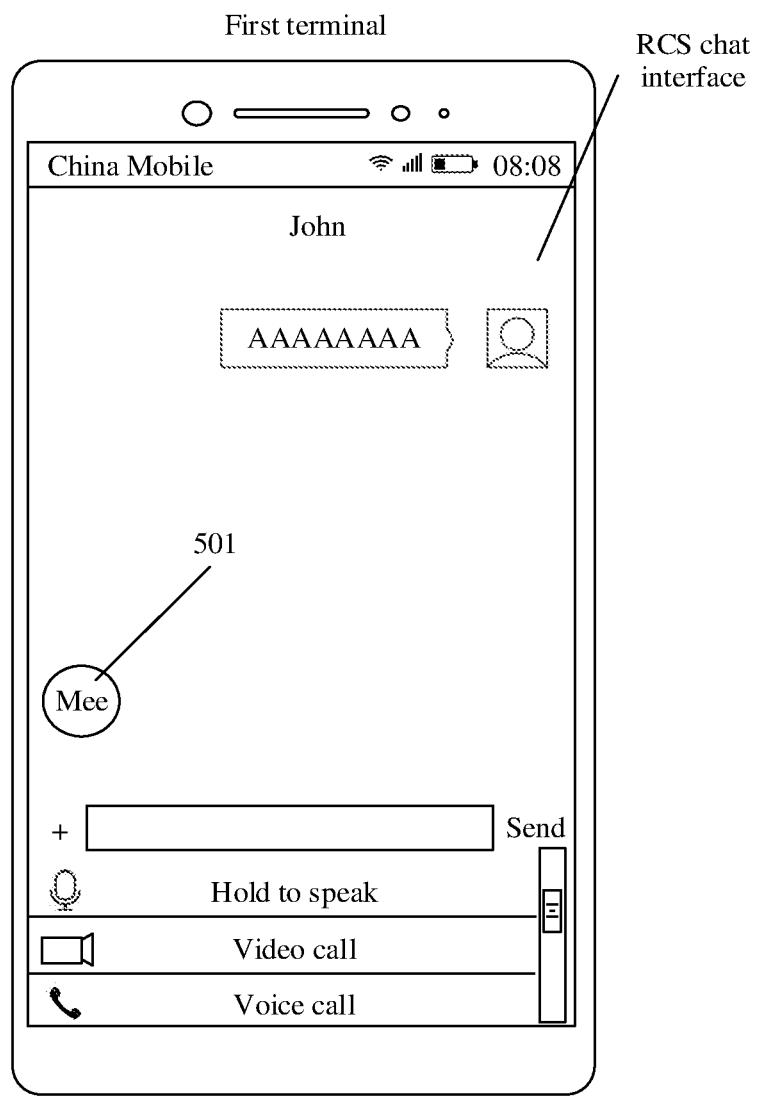

When determining that the second number registers with the MeeTime application, the first terminal may perform marking. For example, the first terminal may perform marking in the RCS interface in which the chat with the second number is displayed. Refer to FIG. 5B. FIG. 5B shows an RCS interface in which chat with the second user (that is, John) in the RCS application on the first terminal is displayed. The RCS chat interface includes a MeeTime mark 501 which indicates that the second user, that is, John, registers with the MeeTime application. Optionally, a display position and a display style of the MeeTime mark 501 in the RCS interface displaying the chat with the second number are not limited (for example, the mark may be a bubble). For ease of understanding, FIG. 3D(b) may be compared with FIG. 5B. The RCS application in FIG. 3D(b) cannot discover a MeeTime function of a chat peer. Therefore, no MeeTime mark is displayed in the chat interface. However, the RCS application on the first terminal in Embodiment 1 can discover a MeeTime capability of a chat peer, and display a MeeTime mark in the chat interface. The interface shown in FIG. 5B is still used as an example. The MeeTime mark 501 in the interface may be used for switch between a MeeTime mode and an RCS mode. For example, when the MeeTime mark 501 is selected (for example, the MeeTime mark 501 displays a first color or first brightness), text information entered in a text box by the user, a voice message, a picture, a location, and the like that are sent are all MeeTime messages sent to the MeeTime application of the peer. That is, when the MeeTime mark 501 is selected, the RCS application on the first terminal communicates with the MeeTime application on the second terminal. For example, when the MeeTime mark 501 is not selected (for example, the MeeTime mark 501 displays a second color or second brightness), text information entered in a text box by the user, a voice message, a picture, and a location that are sent are all MeeTime messages sent to the RCS application of the peer. That is, when the MeeTime mark 501 is not selected, the RCS application on the first terminal communicates with the RCS application on the second terminal.

Figure 5C:
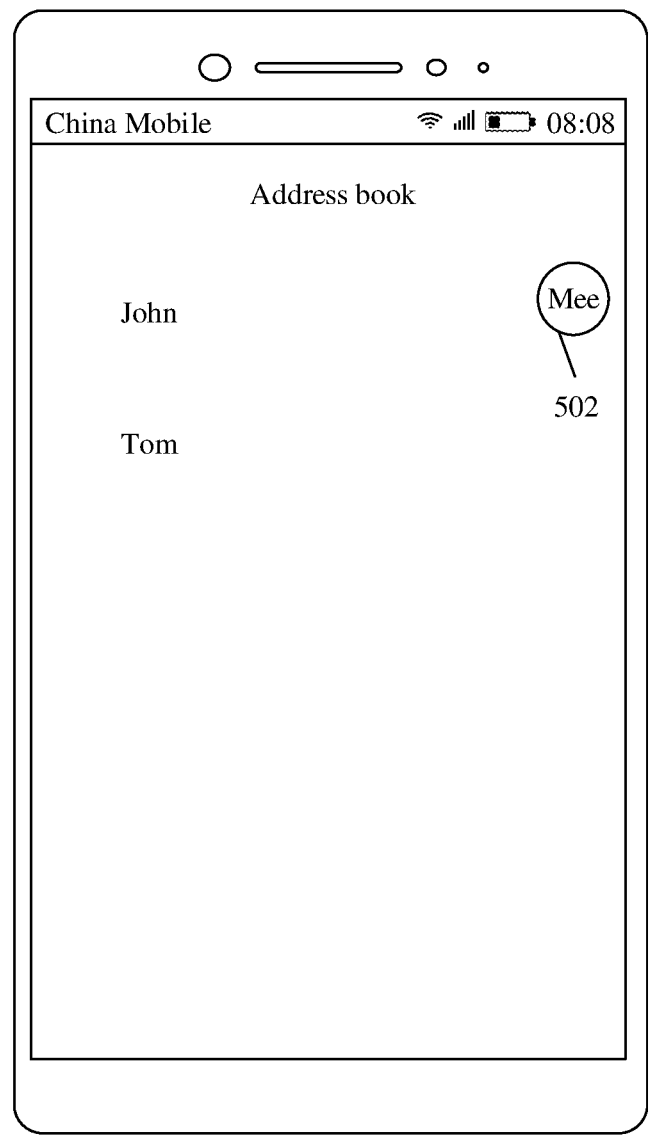

In addition to perform marking in the RCS interface displaying the chat with the second user (that is, John), marking may be further performed in the address book to indicate that the second user registers with the MeeTime application. For example, refer to FIG. 5C. FIG. 5C is a schematic diagram of the address book of the first terminal. The address book includes contacts whose phone numbers are stored in the first terminal, for example, contacts John and Tom. If John enables the MeeTime function, a MeeTime mark 502 corresponding to the contact John is displayed on an address book interface, indicating that the contact John enables the MeeTime function. If Tom does not enable the MeeTime application, a MeeTime mark corresponding to contact Tom is not displayed. When detecting an operation of taping the MeeTime mark 502, the first terminal may display the interface shown in FIG. 5B, and the MeeTime mark 501 in the interface is selected.

The following describes a process in which the RCS application on the first terminal sends a MeeTime message to the second terminal.

Refer to FIG. 6A-1 and FIG. 6A-2. FIG. 6A-1 and FIG. 6A-2 are a schematic flowchart of sending a MeeTime message to the second terminal by the RCS application on the first terminal. As shown in FIG. 6A-1 and FIG. 6A-2, the process includes the following steps.

S600: In response to an operation, the first terminal displays the RCS interface for chat with the second user in the RCS application.

For example, the RCS interface in which the chat with the second user is displayed may be the interface shown in FIG. 5B, and includes the MeeTime mark 501 indicating that the second user registers with the MeeTime application.

S601. The first terminal sets a MeeTime message mode. For example, in the interface shown in FIG. 5B, when the MeeTime mark 501 is selected, the MeeTime message mode is set.

S602. The first terminal detects an operation of sending a message to the second user.

For example, the interface shown in FIG. 5B is still used as an example. The operation may be an operation of entering text information in a text box and then tapping a "send" button by the user. When the MeeTime mark 501 is selected, it indicates that the user needs to send a MeeTime message to the second user. In this case, to indicate that the message sent by the first terminal needs to be sent to the MeeTime cloud service, the message may carry a MeeTime tag used to identify that the message needs to be sent to the MeeTime cloud service, and the message is encapsulated by using an RCS protocol.

S603. The first terminal sends the message to the IMS, where the message carries the second number of the second user, specific content of the sent information, and further carries a MeeTime tag.

S604. The IMS sends the message to the RCS.

S605. The RCS determines, based on the MeeTime tag carried in the message, that the message needs to be sent to the MeeTime cloud service. Therefore, the RCS sends the message to the RCS Hub, and then the RCS Hub sends the message to MeeTime cloud service.

S606. The RCS sends the message to the RCS Hub.

S607. The RCS Hub determines, based on the MeeTime tag carried in the message, that the message needs to be sent to the MeeTime cloud service. Therefore, the RCS Hub sends the message to the MeeTime-RCS converged gateway, and then the MeeTime-RCS converged gateway sends the message to MeeTime cloud service.

S608. The RCS Hub sends the message to the MeeTime-RCS converged gateway.

The MeeTime-RCS converged gateway may provide a first message receiving and sending interface. The first message receiving and sending interface is configured to receive a message from the RCS Hub.

S609. The MeeTime-RCS converged gateway converts a protocol of the message to a MeeTime protocol.

The message received by the MeeTime-RCS converged gateway from the RCS Hub is encapsulated by using the RCS protocol. If the message needs to be sent to the MeeTime cloud service, the protocol needs to be converted to the MeeTime protocol. For descriptions of the MeeTime protocol and the RCS protocol, refer to the foregoing descriptions. Details are not described herein again.

S610. The MeeTime-RCS converged gateway sends the message on which the protocol conversion is performed to the MeeTime cloud service.

S611. The MeeTime cloud service sends the message to the second terminal.

S612. The second terminal processes the information. The processing includes viewing, replying, and the like.

Figure 6B:
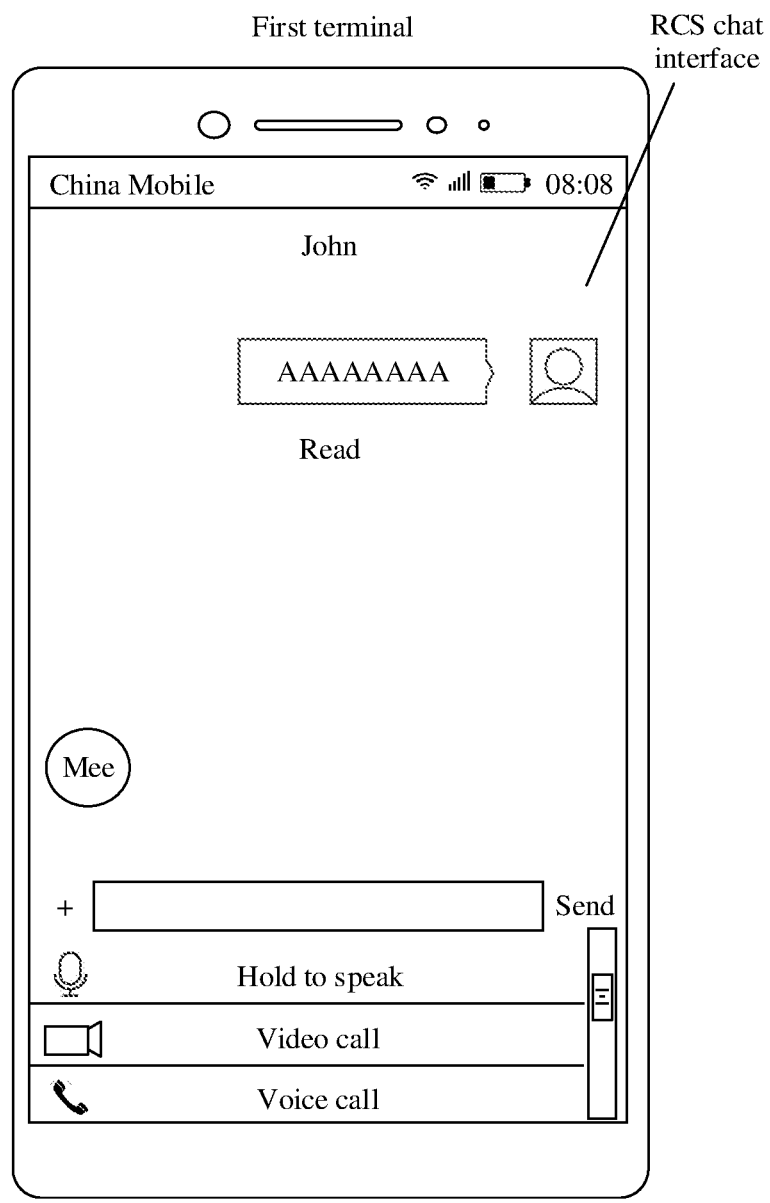

S613. The second terminal sends a receipt message to the first terminal. Specifically, S613 includes S613*a* to S613*g*. The receipt message includes information indicating a message processing status of the peer, like "read", "unread", and "typing". For example, refer to FIG. 6B. The receipt information "read" is displayed in the interface in which the chat with the second user is displayed.

According to the foregoing descriptions of the MeeTime application, a phone number, a system account, and a device identifier may be recorded in the MeeTime cloud service as shown in Table 4. Therefore, before S611 in FIG. 6A-2, when receiving the message from the first terminal, if it is determined that there are at least two devices corresponding to the second number, the MeeTime cloud service may randomly select a device to send the message. Alternatively, a priority may be set. For example, devices corresponding to the second number include a mobile phone and a television. When a priority of the mobile phone is higher than a priority of the television, the MeeTime cloud service sends the message to the mobile phone. When the priority of the television is higher than the priority of the mobile phone, the MeeTime cloud service sends the message to the television. The priority may be set by default, or may be set by a user. This is not limited in this embodiment of this application.

In the foregoing manner, the first terminal does not need to learn devices corresponding to the second number. When receiving the message from the first terminal and determining that a plurality of devices correspond to the second number that is a receiver of the message, the MeeTime cloud service determines a device randomly or based on a priority, and then sends the message to the device. In this manner, the plurality of devices corresponding to the second user in the MeeTime cloud service are not exposed to the first terminal. Therefore, security is high.

Certainly, the MeeTime cloud service may also send device identifiers of the plurality of devices corresponding to the second number to the first terminal. For example, in S508 in FIG. 5A-1, when receiving the MeeTime query request from the RCS Hub, and determining that there are a plurality of devices corresponding to a to-be-queried number in the MeeTime query request, that is, the second number, the MeeTime cloud service may send device identifiers of the plurality of devices to the RCS Hub, so as to send the identifiers of the plurality of devices corresponding to the second number to the first terminal through the RCS Hub. In other words, the first terminal can find whether the second user registers with MeeTime, and if the second user registers with MeeTime, the first terminal can further find the plurality of devices of the second user that register with MeeTime. A correspondence stored in the MeeTime cloud service is the correspondence shown in Table 4. When receiving the MeeTime query request, the MeeTime cloud service determines that the devices corresponding to the second number in the MeeTime query request include a Huawei mobile phone and a Huawei Vision, and sends identifiers of the two devices to the first terminal.

Figure 6C:
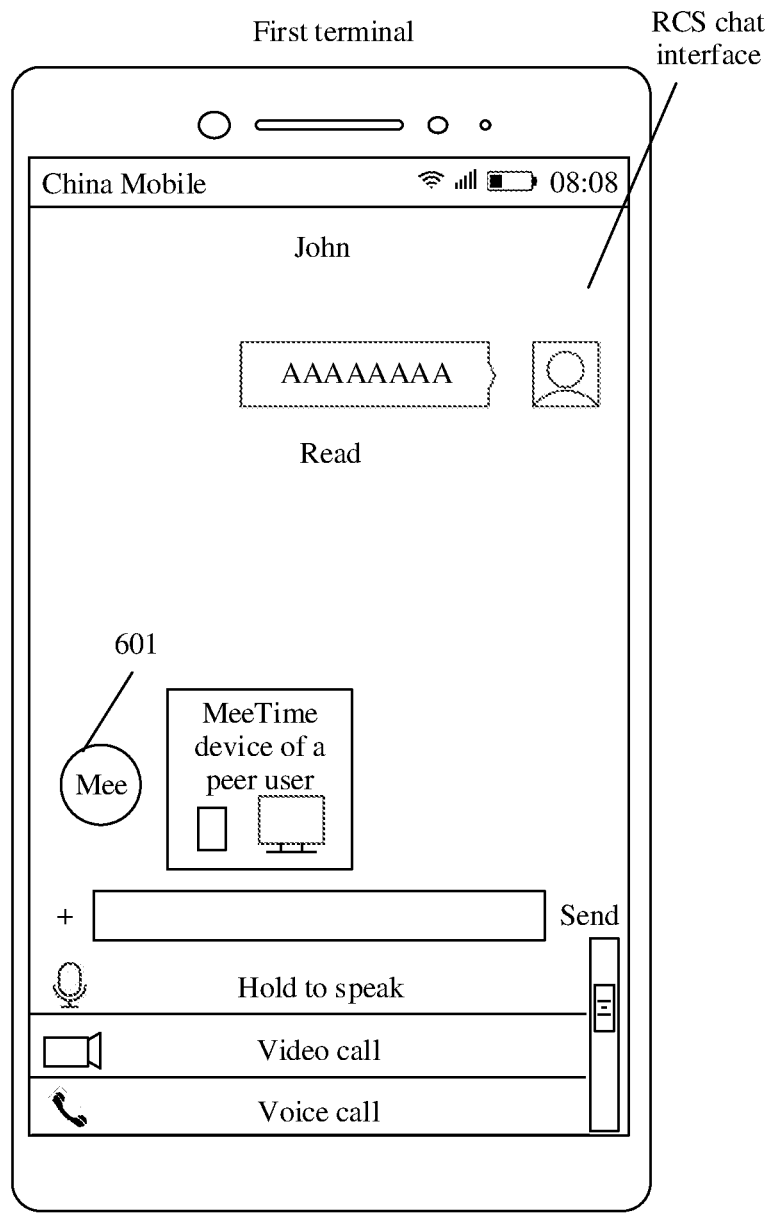

In this way, device identifiers of the plurality of devices corresponding to the second number can be displayed on the first terminal. For example, refer to FIG. 6C. A MeeTime mark 601 is displayed in the RCS interface in which the chat with the second number is displayed. When detecting an operation (for example, a touch and hold operation) on the MeeTime mark 601, the first terminal displays identifiers of a plurality of devices of the peer: a television identifier and a mobile phone identifier. If the television identifier is selected, text information entered by the user in the text box, a voice message, a picture, a location, and the like that are sent are MeeTime messages sent to a television of the peer. If the mobile phone identifier is selected, text information entered by the user in the text box, a voice message, a picture, a location, and the like that are sent are MeeTime messages sent to a mobile phone of the peer.

Figure 7A:
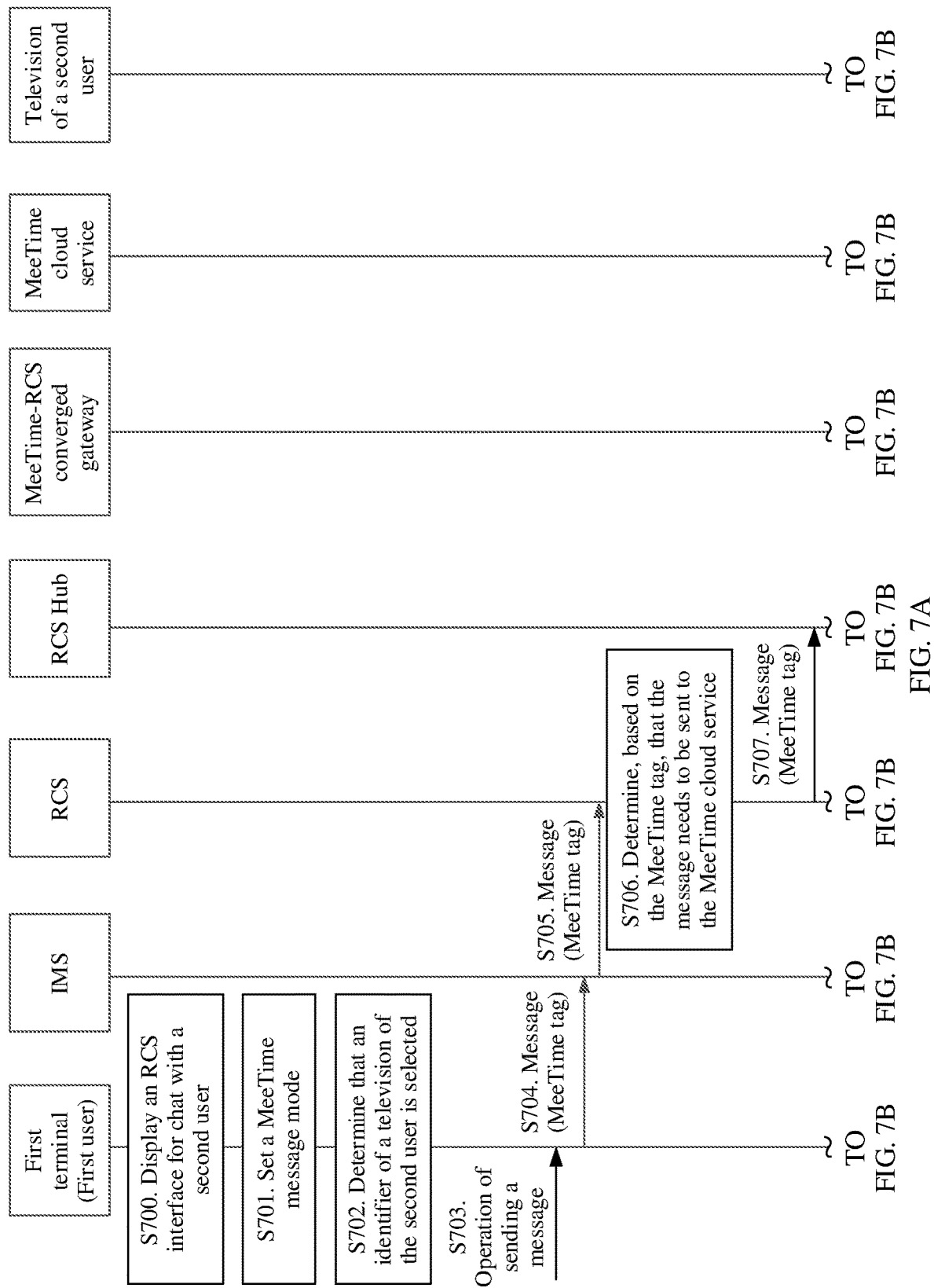
Figure 7C:
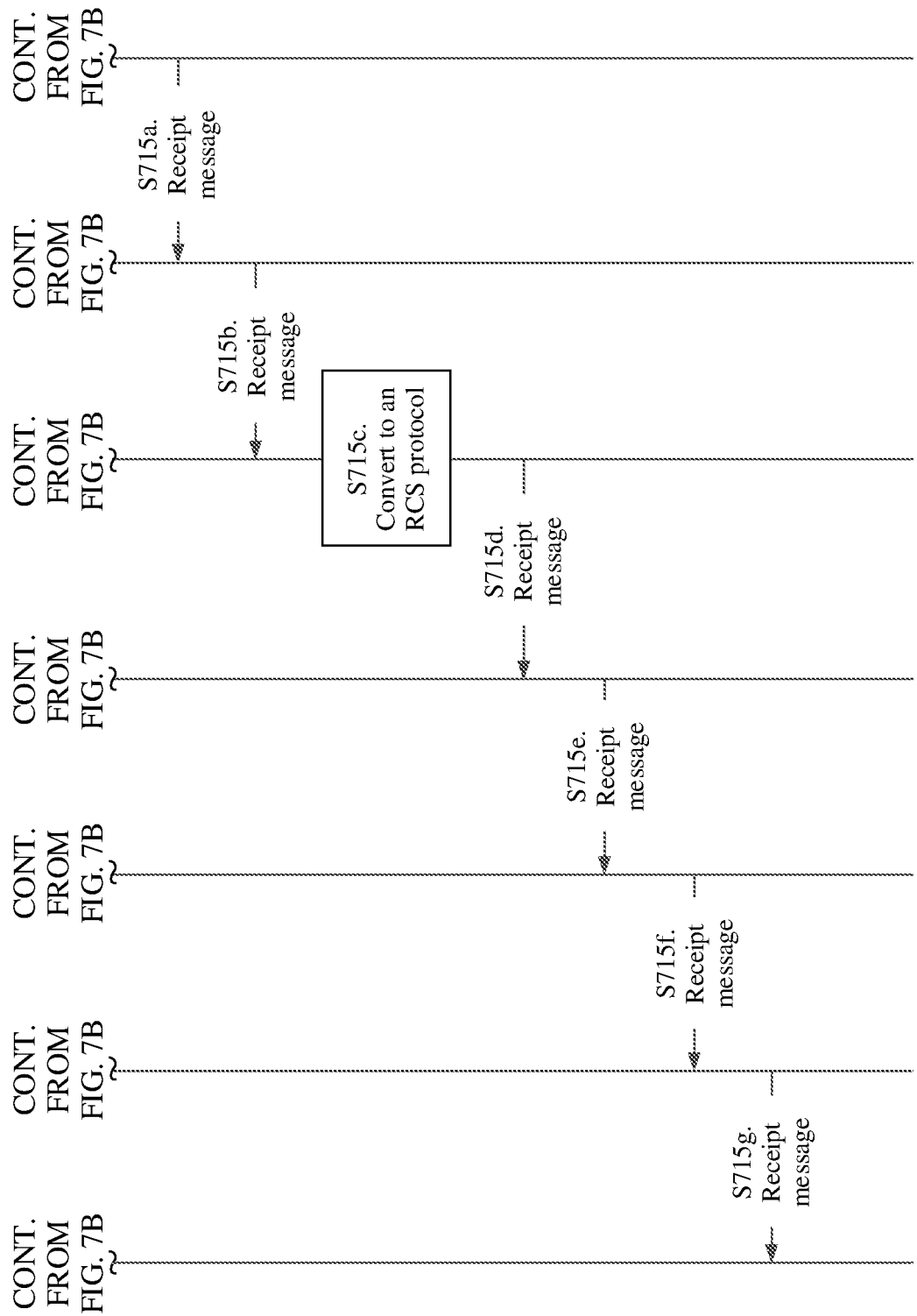

If the television identifier is selected, a process in which the first terminal sends a message to the television of the peer may be that shown in FIG. 7A to FIG. 7C. The process includes the following steps.

S700. In response to an operation, the first terminal displays an RCS interface for chat with the second user in the RCS application.

S701. The first terminal sets a MeeTime message mode. For example, in the interface shown in FIG. 5B, when the MeeTime mark 501 is selected, the MeeTime message mode is set.

S702. The first terminal device detects that the television identifier is selected.

S703. The first terminal detects an operation of sending a message to the second user. The message includes sent content, the second number of the second user, a MeeTime tag, and a television tag.

S704. The first terminal sends a message to the IMS.

S705. The IMS sends the message to the RCS.

S706. The RCS determines, based on the MeeTime tag carried in the message, that the message needs to be sent to the MeeTime cloud service.

S707. The RCS sends the message to the RCS Hub.

S708. The RCS Hub determines, based on the MeeTime tag carried in the message, that the message needs to be sent to the MeeTime cloud service.

S709. The RCS Hub sends the message to the MeeTime-RCS converged gateway.

S710. The MeeTime-RCS converged gateway converts a protocol of the message to a MeeTime protocol.

S711. The MeeTime-RCS converged gateway sends the message on which the protocol conversion is performed to the MeeTime cloud service.

S712. The MeeTime cloud service determines, based on the television identifier in the message, that the message needs to be sent to the television of the second user.

S713. The MeeTime cloud service sends the message to the television of the second user.

S714. The television of the second user processes the information.

S715. The television sends a receipt message to the first terminal. Specifically, S715 includes S715a to S715g.

In this manner, the first terminal can learn that the second user enables the MeeTime function, or learn of MeeTime devices of the peer. The first user of the first terminal may choose to send a MeeTime message to a device. As a result, user experience is good.

Optionally, before sending device identifiers of the plurality of devices corresponding to the second number to the first terminal, the MeeTime cloud service may request confirmation of the second user, and send the identifiers of the plurality of devices corresponding to the second number to the first terminal with consent of the second user. For example, after receiving the MeeTime query request from the first terminal, the MeeTime cloud service sends a confirmation request to the second user, where the confirmation request indicates whether disclosing, to the first user, the plurality of devices corresponding to the second user is approved. If a confirmation instruction is received, the plurality of device identifiers are sent to the first terminal.

Alternatively, the second user sets a whitelist in advance, and sends the whitelist to the MeeTime cloud service. The whitelist includes one or more phone numbers, and indicates that the MeeTime cloud service can disclose the plurality of devices of the second user to the phone number in the whitelist. In this way, after the MeeTime cloud service receives the MeeTime query request from the first terminal, if it is determined that the first number of the first terminal exists in the whitelist, the MeeTime cloud service sends the identifiers of the plurality of devices corresponding to the second user to the first terminal; otherwise, the plurality of devices of the second user are not disclosed to the first terminal.

Embodiment 2

Embodiment 1 describes a process about communication between the MeeTime application on the first terminal and the RCS application on the second terminal. Embodiment 2 describes a process about communication between a MeeTime application on the second terminal and an RCS application on the first terminal.

In Embodiment 2, the MeeTime application on the second terminal can find whether the first terminal enables the RCS, and if yes, the MeeTime application may be used to communicate with the RCS application on the first terminal. For a process in which the MeeTime application on the second terminal discovers the RCS capability of the first terminal, refer to FIG. 8A to FIG. 8C. For a process about communication between the MeeTime application on the first terminal and the RCS application on the first terminal, refer to FIG. 9A-1 to FIG. 9B.

Figure 8A:
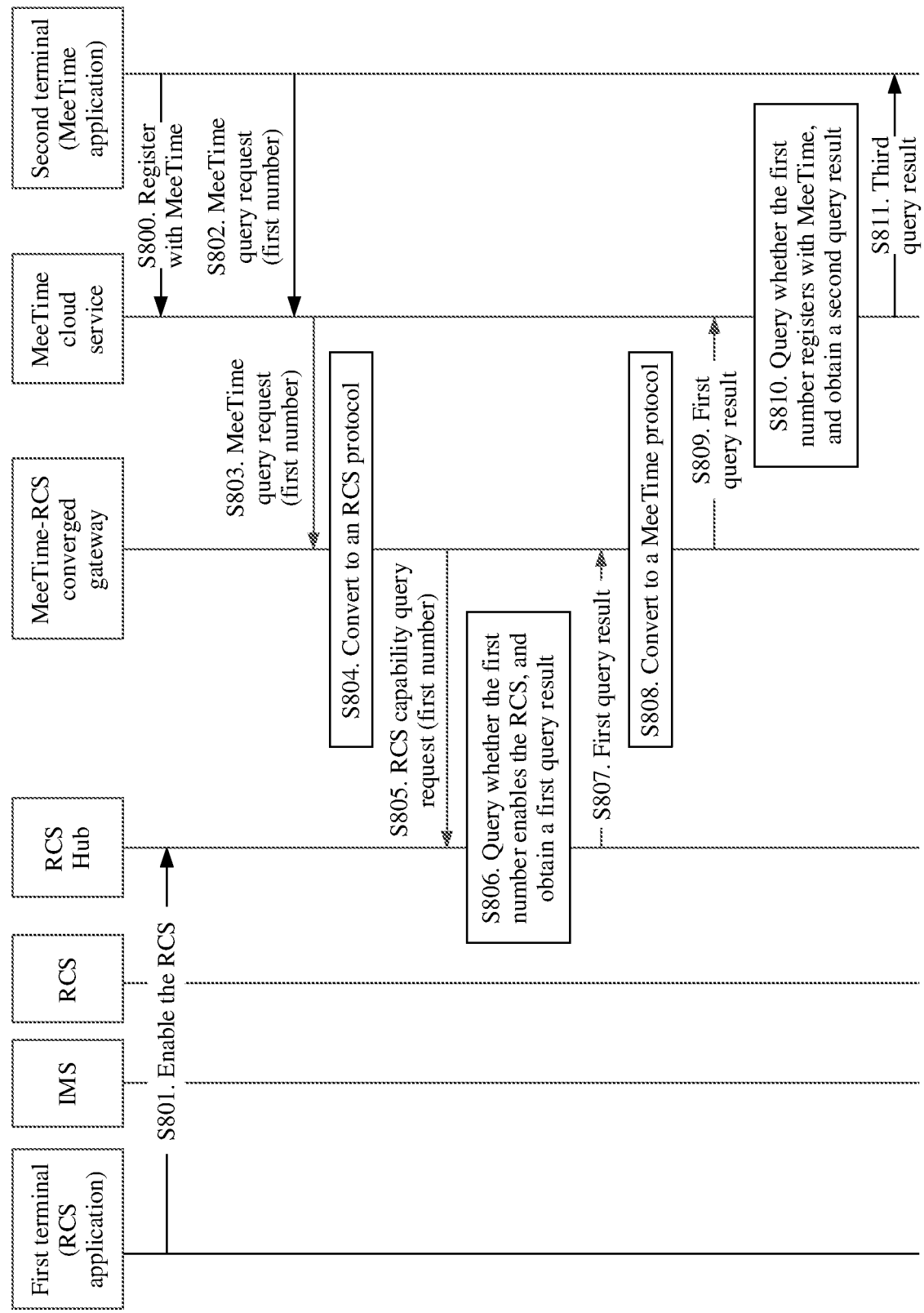
FIG. 8A to FIG. 8C are schematic diagrams of querying, by a MeeTime application on a second terminal, whether a first terminal enables an RCS application according to an embodiment of this application.

Refer to FIG. 8A. FIG. 8A is a schematic flowchart of discovering an RCS function of the first terminal by the MeeTime application on the second terminal. As shown in FIG. 8A, the process includes the following steps.

S800. The second terminal registers with the MeeTime application. For a process in which the second terminal registers with the MeeTime application, refer to the foregoing descriptions of the MeeTime application. Details are not described herein again.

S801. The first terminal enables the RCS. For a process in which the first terminal enables the RCS, refer to the foregoing descriptions of the RCS application. Details are not described herein again.

It should be noted that an execution sequence of S800 and S801 is not limited.

S802. The second terminal sends a MeeTime query request to the MeeTime cloud service. The MeeTime query request includes a to-be-queried number, that is, the first number. The MeeTime query request is used to query whether a MeeTime function of the first number is enabled. The MeeTime query request is encapsulated by using a MeeTime protocol.

S803. The MeeTime cloud service sends an RCS query request to the MeeTime-RCS converged gateway.

For ease of understanding, comparison can be made with the foregoing process in which the MeeTime application in the first terminal queries the MeeTime capability of the second terminal shown in FIG. 2B. In FIG. 2B, when the MeeTime cloud service receives the MeeTime query request, the MeeTime cloud service sends a query result to a query party without forwarding the result to the MeeTime-RCS converged gateway. However, in FIG. 8A, when receiving the MeeTime query request, the MeeTime cloud service needs to query whether the second number registers with MeeTime (S810) and feed back a query result, and needs to send the MeeTime query request to the MeeTime-RCS converged gateway, so as to query, from the RCS through the MeeTime-RCS converged gateway, whether the second number enables the RCS.

The MeeTime-RCS converged gateway may provide a second capability query interface. The second capability query interface is configured to receive a MeeTime capability query request.

S804. The MeeTime-RCS converged gateway converts the MeeTime query request to an RCS protocol, so as to obtain an RCS capability query request. The RCS capability query request is encapsulated by using the RCS protocol.

S805. The MeeTime-RCS converged gateway sends the RCS capability query request to RCS Hub.

S806. The RCS Hub queries whether the first number enables the RCS.

S807. The RCS Hub sends a first query result to the MeeTime-RCS converged gateway, where the first query result indicates whether the first number enables the RCS. The first query result is encapsulated by using the RCS protocol.

S808. The MeeTime-RCS converged gateway converts a protocol of the first query result to the MeeTime protocol.

S809. The MeeTime-RCS converged gateway sends the first query result on which protocol conversion is performed to the MeeTime cloud service.

S810. The MeeTime cloud service queries whether the first number registers with MeeTime, to obtain a second query result.

S811. The MeeTime cloud service sends a third query result to the second terminal, where the third query result includes the first query result and the second query result.

In the foregoing embodiment, the first query result and the second query result are sent to the second terminal together. Optionally, the first query result and the second query result may be sent separately. For example, after S802, the RCS Hub immediately performs S810, to be specific, queries whether the second number registers with MeeTime, and feeds back the second query result. In this case, S810 does not need to be performed after S809, and only the first query result needs to be sent in S811.

When finding that the first number enables the RCS, the second terminal may perform marking. For example, the second terminal may perform marking in the address book or in a MeeTime interface in which chat with the first number is displayed.

Figure 8B:
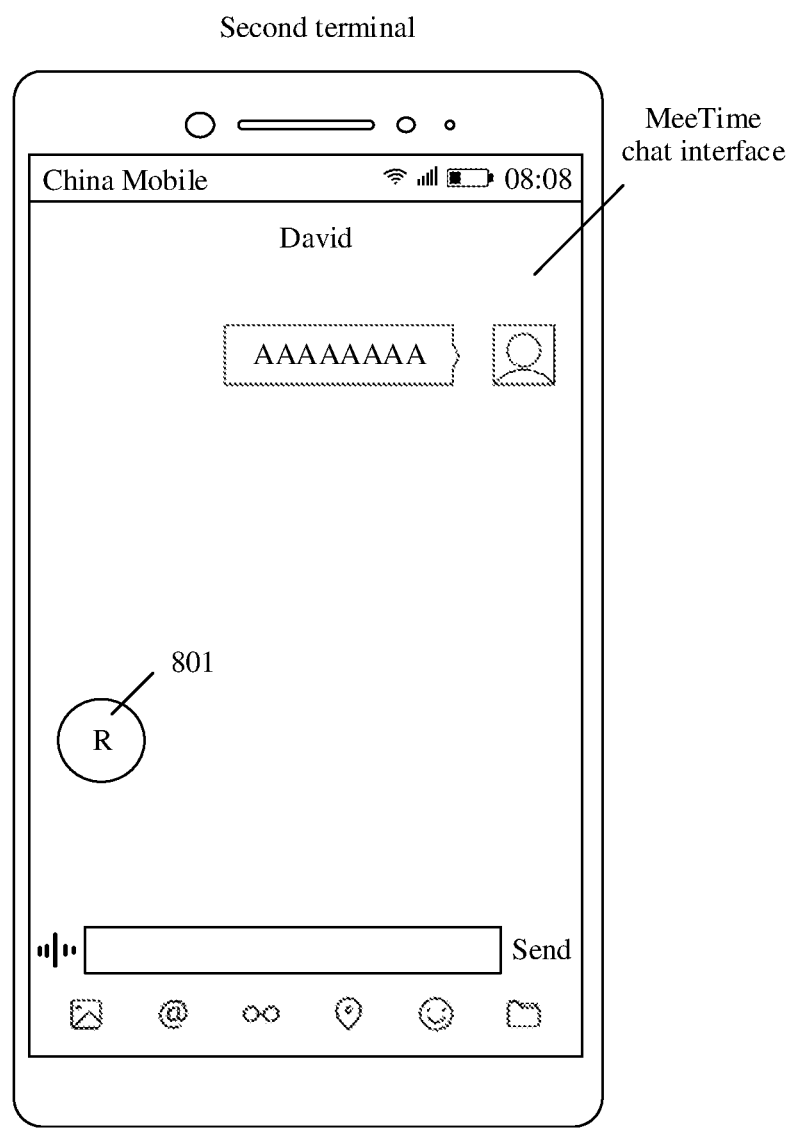

For example, marking is performed in a MeeTime interface in which the chat with the first number is displayed. Refer to FIG. 8B. FIG. 8B is a schematic diagram of the MeeTime interface in which the chat between the second terminal and the first user (that is, David) is displayed. An RCS mark 801 may be displayed in the MeeTime chat interface, and is used to indicate that the first user enables the RCS. Optionally, a display position and a display style of the RCS mark 801 in the RCS interface in which the chat with the first number is displayed are not limited (for example, the mark may be a bubble). For ease of understanding, FIG. 2C(d) may be compared with FIG. 8B. The MeeTime application in FIG. 2C(d) cannot discover an RCS function of a chat peer. Therefore, no RCS mark is displayed in the chat interface. However, the MeeTime application on the second terminal in Embodiment 2 can discover an RCS capability of a chat peer, and display an RCS mark 801 in the chat interface. The interface shown in FIG. 8B is still used as an example. The RCS mark 801 in the interface may be used for switch between a MeeTime mode and an RCS mode. For example, when the RCS mark 801 is selected, text information entered in a text box by the user, a voice message, a picture, a location, and the like that are sent are all RCS messages sent to the RCS application of the peer. That is, when the RCS mark 801 is selected, the MeeTime application on the second terminal communicates with the RCS application on the first terminal. When the RCS mark 801 is not selected, text information entered in a text box by the user, a voice message, a picture, a location, and the like that are sent are all MeeTime messages sent to the MeeTime application of the peer. That is, when the RCS mark 801 is not selected, the MeeTime application on the second terminal communicates with the MeeTime application on the first terminal.

Figure 8C:
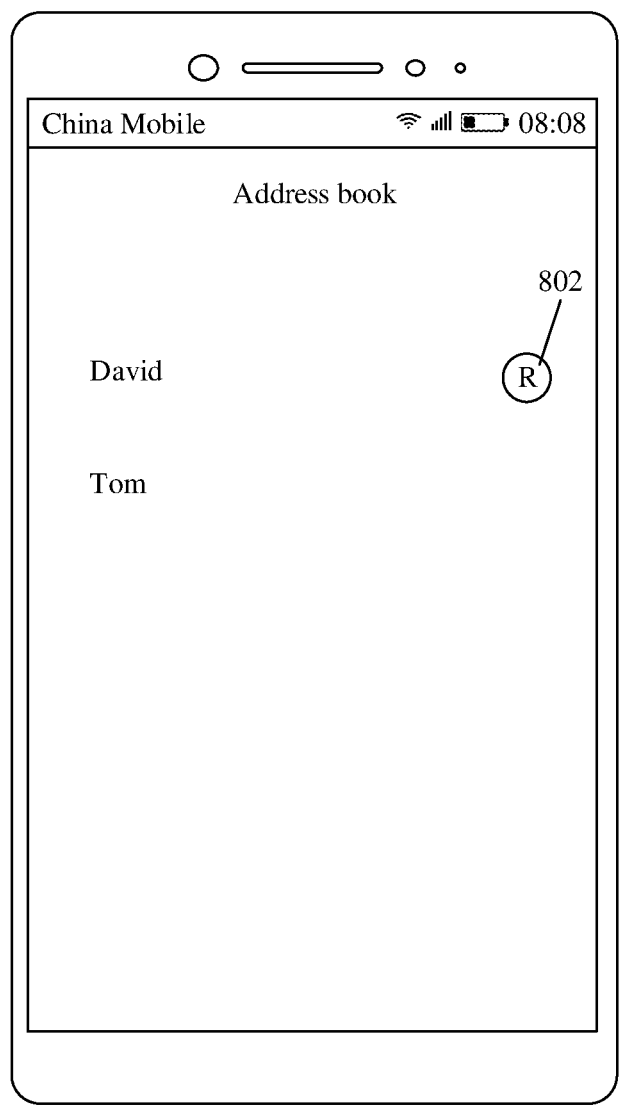

Alternatively, the second terminal may perform marking in the address book. Refer to FIG. 8C. FIG. 8C is an address book interface of the second terminal. The interface includes the contact first user (whose number is the first number) David, and displays an RCS mark 802 of the first user. When detecting an operation for the RCS mark 802, the second terminal may display the interface shown in FIG. 8B, and the MeeTime mark 801 in the interface is selected.

Figures 1, 9A:
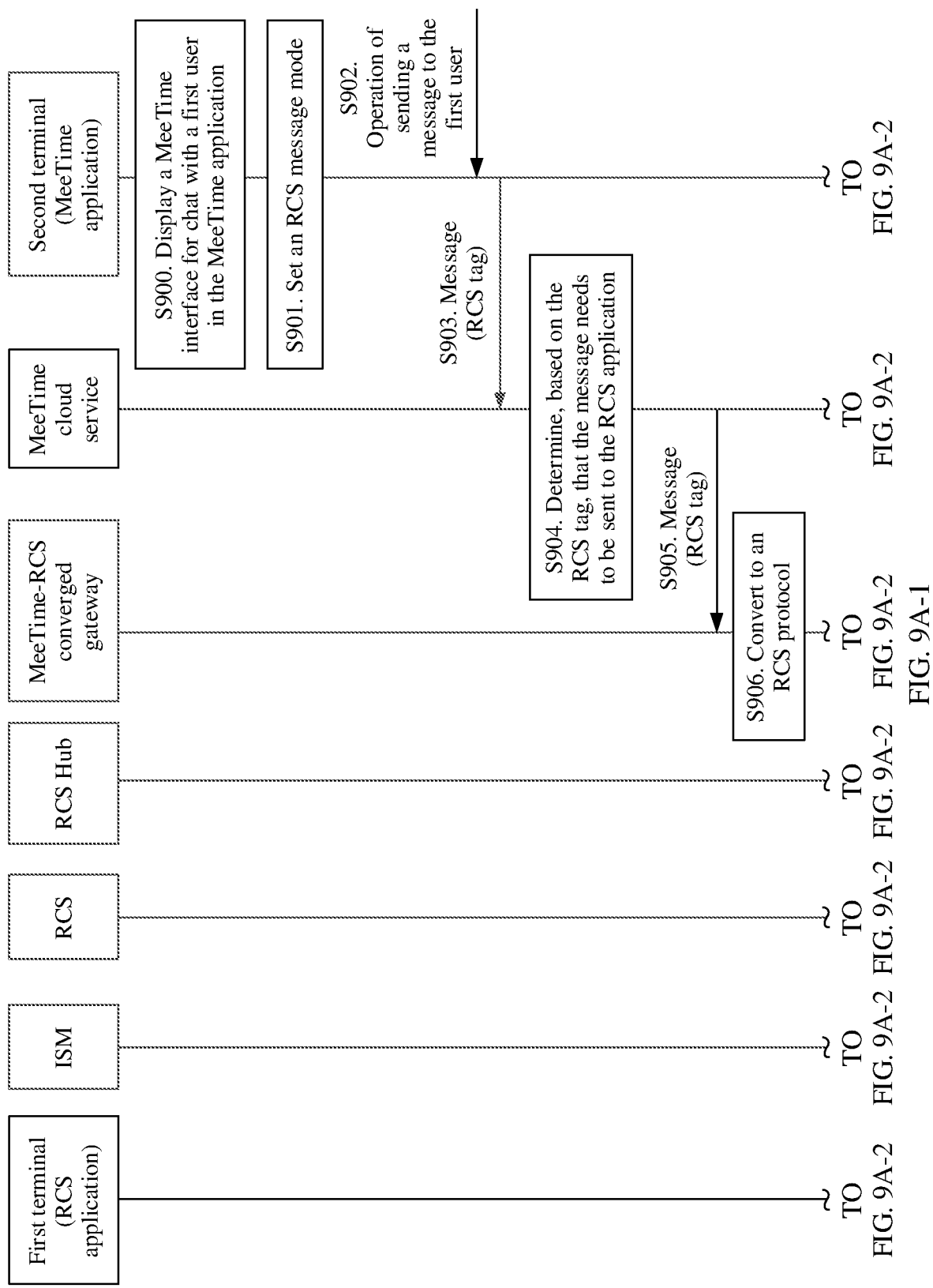
Figures 2, 9A:
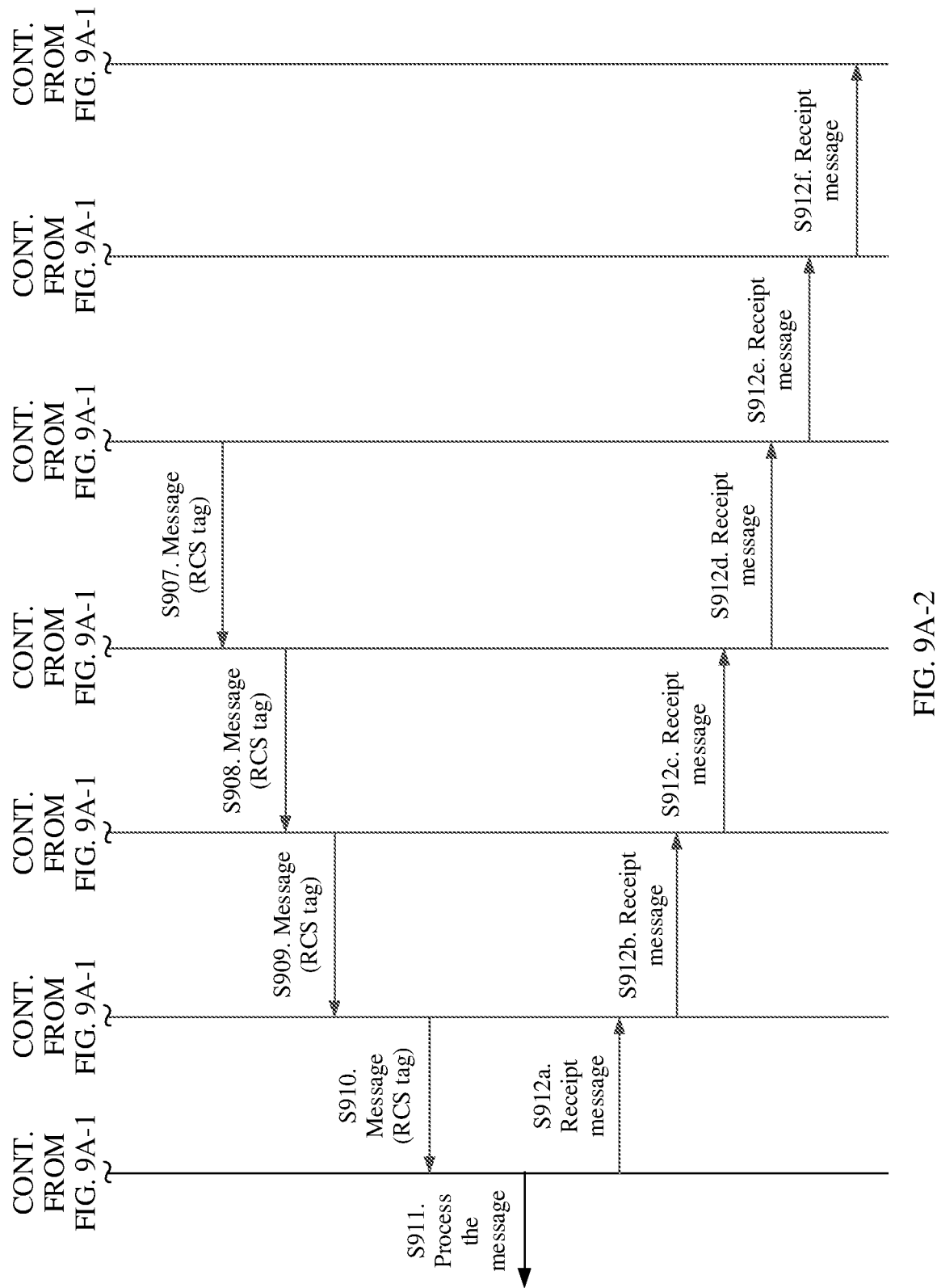

The following embodiment describes a process about interaction between the MeeTime application on the second terminal and the RCS application on the first terminal. Refer to FIG. 9A-1 and FIG. 9A-2. FIG. 9A-1 and FIG. 9A-2 are a schematic flowchart of interaction between the MeeTime application on the second terminal and the RCS application on the first terminal. As shown in FIG. 9A-1 and FIG. 9A-2, the process includes the following steps.

S900. In response to an operation, the second terminal displays the MeeTime interface for chat with the first user in the MeeTime application.

For example, the MeeTime interface in which the chat with the first user is displayed may be the interface shown in FIG. 8B, and includes the RCS mark 801 indicating that the first user enables the RCS.

S901. The first terminal sets an RCS message mode. For example, in the interface shown in FIG. 8B, when the RCS mark 801 is selected, the RCS message mode is set.

S902. The second terminal detects an operation of sending a message to the first user.

Take FIG. 8B as an example. The operation may be an operation of entering text information in a text box and then tapping a "send" button.

S903. The second terminal sends a message to the Mee-Time cloud service, where the message includes specific content sent to the first user, the first number, the second number, and an RCS tag used to indicate that the message needs to be sent to the RCS application. The message is encapsulated by using a MeeTime protocol.

S904. The MeeTime cloud service determines, based on the RCS tag in the message, that the message needs to be sent to the RCS.

S905. The MeeTime cloud service sends the message to the MeeTime-RCS converged gateway.

The MeeTime-RCS converged gateway may provide a second message receiving and sending interface. The second message receiving and sending interface is configured to receive a message from the MeeTime cloud service.

S906. The MeeTime-RCS converged gateway converts a protocol of the message to an RCS protocol.

S907. The MeeTime-RCS converged gateway sends the message on which the protocol conversion is performed to the RCS Hub.

S908. The RCS Hub sends the message to the RCS.

Optionally, before S908, the RCS Hub may further determine a receiver of the message, that is, an RCS corresponding to the first number. Because the RCS Hub stores phone numbers registering with each RCS, the RCS Hub can determine a corresponding RCS based on the first number, and then send the message to the determined RCS.

S909. The RCS sends the message to the IMS.

S910: The IMS sends the message to the first terminal.

S911. The first terminal processes the message. The processing includes viewing, replying, and the like.

S912. The first terminal sends a receipt message to the second terminal. S912 includes S912a to S912f. The receipt message includes information such as "read", "unread", and "typing".

Figure 9B:
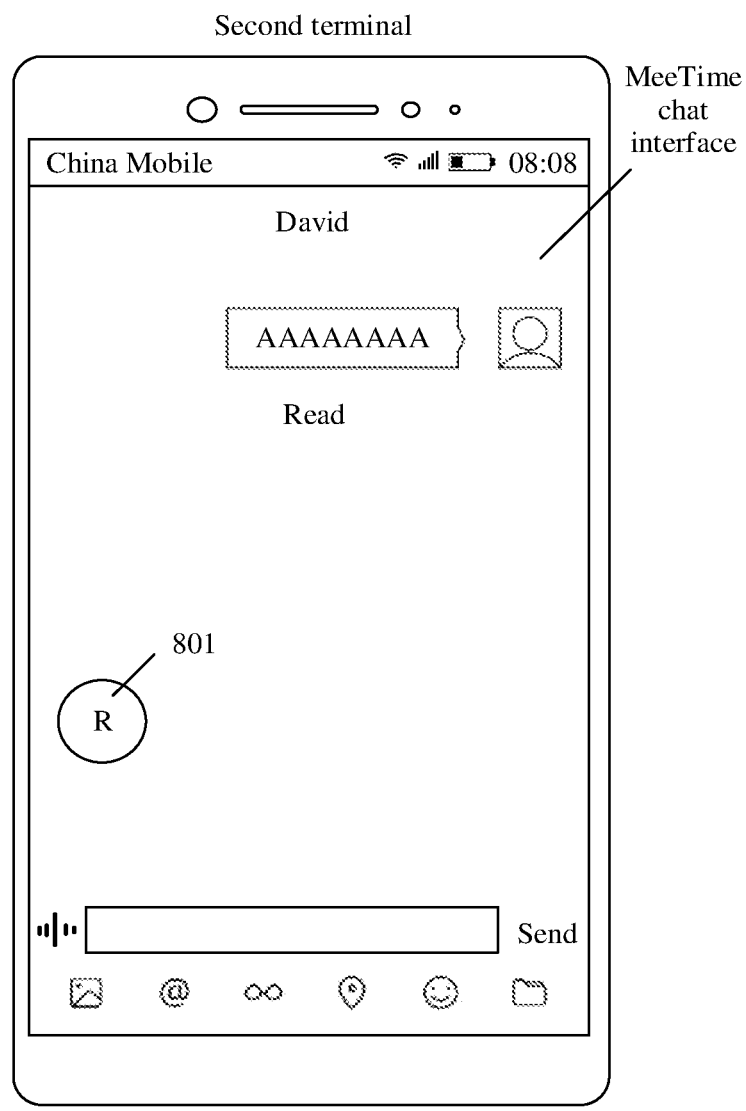

For example, refer to FIG. 9B. The receipt information "read" is displayed in the MeeTime interface in which the chat with the first user is displayed on the second terminal.

Figure 10:
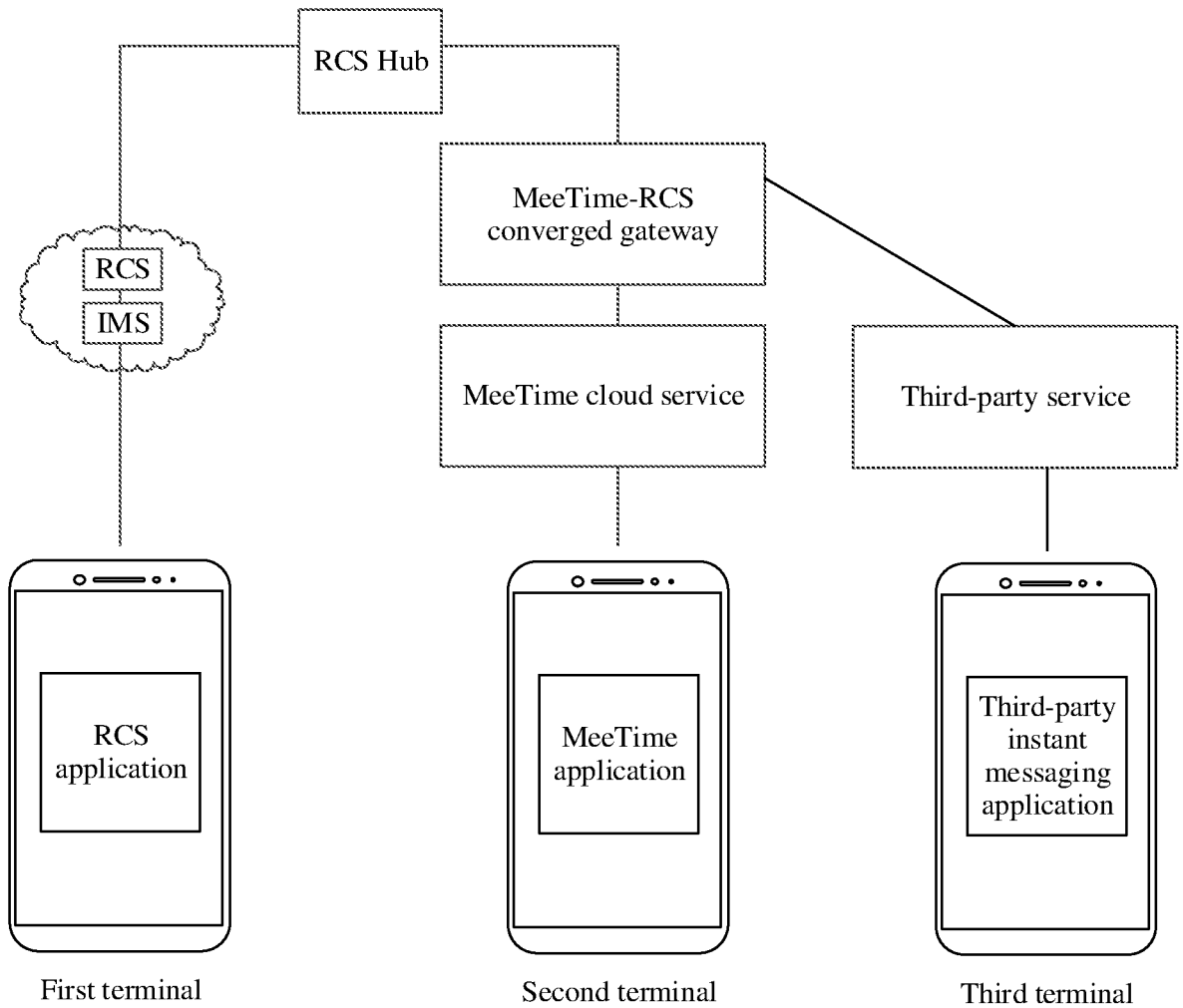
FIG. 10 is a schematic diagram of another communication system according to an embodiment of this application.

In the foregoing embodiments, two terminals are used as an example. In some other embodiments, interconnection can also be implemented between a first instant messaging application on a first terminal, a second instant messaging application on a second terminal, and a third instant messaging application on a third terminal. The first instant messaging application, the second instant messaging application, and the third instant messaging application are not a same application. Refer to FIG. 10. FIG. 10 is a schematic diagram of another communication system according to an embodiment of this application. The communication system includes a first terminal, a second terminal, and a third terminal. The first terminal includes an RCS application. The second terminal includes a MeeTime application. The third terminal includes a third-party instant messaging application. A server corresponding to the third-party instant messaging application is a third-party server. The third-party server may connect to the RCS Hub or the MeeTime cloud service by using the converged gateway, to implement interconnection between the third-party instant messaging application on the third terminal and the RCS application on the first terminal, or interconnection between the third-party instant messaging application on the third terminal and the MeeTime application on the second terminal. A principle of interconnection between the third-party instant messaging application and the RCS application on the first terminal, or a principle of interconnection between the third-party instant messaging application and the MeeTime application on the second terminal is the same as the principle of interconnection between the RCS application on the first terminal and the MeeTime application on the second terminal in Embodiment 1 and Embodiment 2. Details are not described again.

Figure 11:
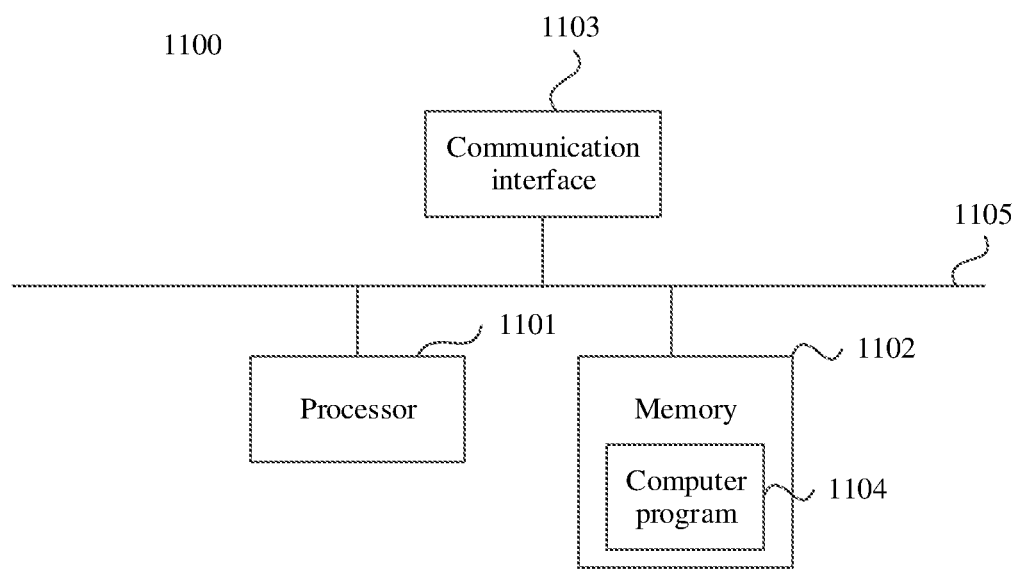
FIG. 11 is a schematic diagram of a structure of an electronic device according to an embodiment of this application.

Based on a same concept, FIG. 11 shows an electronic device 1100 according to this application. The electronic device 1100 may be the first terminal, the second terminal, the first server, the second server, or the third server described above. As shown in FIG. 11, the electronic device 1100 may include one or more processors 1101, one or more memories 1102, a communication interface 1103, and one or more computer programs 1104. The foregoing components may be connected by one or more communication buses 1105. The communication interface 1103 is configured to implement communication with another device. For example, the communication interface may be a transceiver. The one or more computer programs 1104 are stored in the memory 1102 and are executed, through configuration, by the one or more processors 1101. The one or more computer programs 1104 include instructions, and the instructions may be used to perform the steps provided in the corresponding embodiments. For example, when the electronic device 1100 is the foregoing first terminal, the instructions may be used to perform the steps related to the first terminal in the corresponding embodiments; when the electronic device 1100 is the foregoing second terminal, the instructions may be used to perform the steps related to the second terminal in the corresponding embodiments; when the electronic device 1100 is the foregoing first server, the instructions may be used to perform the steps related to the first server in the corresponding embodiments; when the electronic device 1100 is the foregoing second server, the instructions may be used to perform the steps related to the second server in the corresponding embodiments; and when the electronic device 1100 is the foregoing third server, the instructions may be used to perform the steps related to the third server in the corresponding embodiments.

In embodiments provided in this application, the methods provided in embodiments of this application are described from a perspective in which the electronic device (for example, the first terminal or the second terminal) is used as an execution body. To implement functions in the method provided in embodiments of this application, the electronic device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

In the foregoing embodiments, based on the context, the term "when" or "after" may be interpreted as "if" or "after" or "in response to determining" or "in response to detecting". Similarly, based on the context, the phrase "when it is determined that . . . " or "if (a stated condition or event) is detected" may be interpreted as "if it is determined that . . . ", "in response to determining . . . ", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

Reference to "one embodiment", "some embodiments", or the like described in this specification means that one or more embodiments of this application include a particular feature, structure, or characteristic described in combination with the embodiment. Therefore, in this specification, statements, such as "in an embodiment", "in some embodiments", "in some other embodiments", and "in other embodiments", that appear at different places do not necessarily mean a same embodiment. Instead, the statements mean "one or more but not all of the embodiments", unless otherwise specifically emphasized. Terms "include", "contain", "have", and variants of the terms all mean "include but are not limited to", unless otherwise specifically emphasized.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, by using a coaxial cable, an optical fiber, or a digital subscriber line (DSL)) or a wireless manner (for example, by using infrared, radio, or microwave). The computer-readable storage medium may be any usable medium accessible by a computer, or a data storage device, like a server or a data center, integrating one or more usable media. The usable medium may be a magnetic medium (for example, a floppy disk, a hard disk drive, or a magnetic tape), an optical medium (for example, a DVD), a semiconductor medium (for example, a solid state drive (Solid State Disk, SSD)), or the like. The solutions in the foregoing embodiments may be combined as long as the solutions do not conflict with each other.

It should be noted that a part of this patent application includes content protected by copyright. The copyright owner reserves the copyright except for a right of making a copy of a patent document of the patent administration or recorded content of a patent file.

What is claimed is:

1. A method comprising:
    displaying, by a first terminal of a communication system, a first interface of a first instant messaging application;
    displaying, by the first terminal in the first interface, device identifiers of a plurality of devices corresponding to a second user, wherein the second user is registered with a second instant messaging application on the plurality of devices of the communication system, and wherein the first instant messaging application and the second instant messaging application are different applications;
    receiving, by the first terminal, a selection of a first device identifier from the device identifiers, wherein a device corresponding to the first device identifier is a second terminal;
    initiating, by the first instant messaging application, a first communication to the second user in response to a first operation in the first interface, wherein the first communication comprises a video call, a voice call, or a message; and
    displaying, by the second terminal, a second interface of the second instant messaging application, wherein the first communication from a first user is displayed in the second interface, and wherein the first user is a user registered with the first instant messaging application on the first terminal,
    wherein the second user is also a user registered with a third instant messaging application on the second terminal, wherein the third instant messaging application and the first instant messaging application are the same application, wherein a switch button is displayed in the first interface, where in, when the switch button is in a first state, the first instant messaging application initiates a communication to the third instant messaging application on the second terminal, and wherein, when the switch button is in a second state, the first instant messaging application initiates a communication to the second instant messaging application on the second terminal.

2. The method according to claim 1, wherein the first interface is a first chat interface for a chat with the second user, wherein the first operation is an operation of sending a message to the second user in the first chat interface, wherein the first communication is a message to the second user, wherein the second interface is a second chat interface for a chat with the first user, and wherein the second chat interface comprises a message sent by the first user.

3. The method according to claim 1, wherein the first interface is an address book interface of the first instant messaging application, wherein the first operation is an operation of initiating a voice call or a video call to the second user in the address book interface, wherein the first communication is a voice call or a video call to the second user, and wherein the second interface is an interface in which an incoming voice call or an incoming video call from the first user is displayed.

4. The method according to claim 1, further comprising:
querying, by the first instant messaging application, whether the second user is registered with or enabled the second instant messaging application; and
displaying a first mark in the first interface when the first instant messaging application determines that the second user is registered with or enabled the second instant messaging application, wherein the first mark indicates that the second user is registered with or enabled the second instant messaging application.

5. The method according to claim 4,
wherein the communication system further comprises a first server, a second server, and a third server, wherein the first server is a server corresponding to the first instant messaging application, the first server supporting a first communication protocol, wherein the second server is a server corresponding to the second instant messaging application, the second server supporting a second communication protocol, and wherein the third server is connected to the first server and the second server, and
wherein querying, by the first instant messaging application, whether the second user is registered with or enabled the second instant messaging application comprises:
sending, by the first instant messaging application, a first query request to the first server, wherein the first query request carries identification information of the second user, the first query request being used to request to query whether the second user is registered with or enabled the second instant messaging application, and wherein the first query request supports the first communication protocol,
sending, by the first server, the first query request to the third server,
performing, by the third server, a protocol conversion on the first query request to obtain a second query request that supports the second communication protocol,
sending, by the third server, the second query request to the second server,
determining, by the second server based on the second query request, whether the second user is registered with or enabled the second instant messaging application,
sending, by the second server, a first query result to the third server, wherein the first query result supports the second communication protocol,
performing, by the third server, a protocol conversion on the first query result to obtain a second query result that supports the first communication protocol,
sending, by the third server, the second query result to the first server, and
sending, by the first server, the second query result to the first terminal.

6. The method according to claim 1,
further comprising, before initiating, by the first instant messaging application, the first communication to the second user in response to the first operation in the first interface, determining that the switch button is in the second state.

7. The method according to claim 1,
wherein the communication system further comprises a first server, a second server and a third server, wherein the first server is a server corresponding to the first instant messaging application, the first server supporting a first communication protocol, wherein the second server is a server corresponding to the second instant messaging application, the second server supporting a second communication protocol, and wherein the third server is connected to the first server and the second server, and
wherein initiating, by the first instant messaging application, the first communication to the second user in response to the first operation in the first interface comprises:
sending, by the first instant messaging application, first communication information to the first server in response to the first operation, wherein the first communication information comprises a video call request, a voice call request, or a message, and the first communication information supports the first communication protocol;
sending, by the first server, the first communication information to the third server;
performing, by the third server, protocol conversion on the first communication information to obtain second communication information that supports the second communication protocol;
sending, by the third server, the second communication information to the second server; and
sending, by the second server, the second communication information to the second terminal.

8. The method according to claim 1,
wherein the first instant messaging application is an application that supports a first communication protocol and the second instant messaging application is an application that supports a second communication protocol, wherein a first server is a server that supports the first communication protocol and a second server is a server that supports the second communication protocol, and wherein the first communication protocol is an RCS protocol and the second communication protocol is a MeeTime protocol, or
wherein the first instant messaging application is an RCS application and the second instant messaging application is a MeeTime application, wherein the first server is an RCS server and the second server is a MeeTime server, and wherein the first communication protocol is an RCS protocol and the second communication protocol is a MeeTime protocol.

9. The method according to claim 1,
wherein the first instant messaging application is an RCS application,
wherein the second instant messaging application is a MeeTime application,
wherein the communication system further comprises a first server, a second server, and a third server, the first server corresponding to the first instant messaging application and supporting a first communication protocol, the second server corresponding to the second instant messaging application and supporting a second communication protocol, and the third server being connected to the first server and the second server, and
wherein, before displaying, in the first interface, the device identifiers of the plurality of devices corresponding to the second user, the method further comprises:
sending, by the first instant messaging application, a third query request to the first server, wherein the third query request carries identification information of the second user, the third query request being used to request to query a device on which the second user is registered with or enabled the MeeTime application, and the third query request supporting the first communication protocol;

sending, by the first server, the third query request to the third server;

performing, by the third server, protocol conversion on the third query request to obtain a fourth query request that supports the second communication protocol;

sending, by the third server, the fourth query request to the second server;

determining, by the second server based on the fourth query request, the device identifiers of the plurality of devices on which the second user is registered with or enabled the MeeTime application;

sending, by the second server, a third query result to the third server, wherein the third query result supports the second communication protocol;

performing, by the third server, protocol conversion on the third query result to obtain a fourth query result that supports the first communication protocol, wherein both the third query result and the fourth query result indicate the device identifiers of the plurality of devices on which the second user is registered with or is enabled the MeeTime application;

sending, by the third server, the fourth query result to the first server; and sending, by the first server, the fourth query result to the first terminal.

10. A terminal device comprising:
a memory; and
a processor configured to execute a computer program stored in the memory, the computer program including instructions for performing the method according to claim 1.

11. A method comprising:
displaying, by a first terminal of a communication system, a first interface of a first instant messaging application;
displaying, by the first terminal in the first interface, device identifiers of a plurality of devices corresponding to a second user, wherein the second user is registered with a second instant messaging application on the plurality of devices of the communication system, and wherein the first instant messaging application and the second instant messaging application are different applications;
receiving, by the first terminal, a selection of a first device identifier from the device identifiers, wherein a device corresponding to the first device identifier is a second terminal;
initiating, by the first instant messaging application, a first communication to the second user in response to a first operation in the first interface, wherein the first communication comprises a video call, a voice call, or a message; and
displaying, by the second terminal, a second interface of the second instant messaging application, wherein the first communication from a first user is displayed in the second interface, and wherein the first user is a user registered with the first instant messaging application on the first terminal,
wherein the first instant messaging application is an application that supports a first communication protocol and the second instant messaging application is an application that supports a second communication protocol, wherein a first server is a server that supports the first communication protocol and a second server is a server that supports the second communication protocol, and wherein the first communication protocol is an RCS protocol and the second communication protocol is a MeeTime protocol, or wherein the first instant messaging application is an RCS application and the second instant messaging application is a MeeTime application, wherein the first server is an RCS server and the second server is a MeeTime server, and wherein the first communication protocol is an RCS protocol and the second communication protocol is a MeeTime protocol.

12. The method according to claim 11, wherein the first interface is a first chat interface for a chat with the second user, wherein the first operation is an operation of sending a message to the second user in the first chat interface, wherein the first communication is a message to the second user, wherein the second interface is a second chat interface for a chat with the first user, and wherein the second chat interface comprises a message sent by the first user.

13. The method according to claim 11, wherein the first interface is an address book interface of the first instant messaging application, wherein the first operation is an operation of initiating a voice call or a video call to the second user in the address book interface, wherein the first communication is a voice call or a video call to the second user, and wherein the second interface is an interface in which an incoming voice call or an incoming video call from the first user is displayed.

14. The method according to claim 11, further comprising:
querying, by the first instant messaging application, whether the second user is registered with or enabled the second instant messaging application; and
displaying a first mark in the first interface when the first instant messaging application determines that the second user is registered with or enabled the second instant messaging application, wherein the first mark indicates that the second user is registered with or enabled the second instant messaging application.

15. A terminal device comprising:
a memory; and
a processor configured to execute a computer program stored in the memory, the computer program including instructions for performing the method according to claim 11.

16. A method comprising:
displaying, by a first terminal of a communication system, a first interface of a first instant messaging application;
displaying, by the first terminal in the first interface, device identifiers of a plurality of devices corresponding to a second user, wherein the second user is registered with a second instant messaging application on the plurality of devices of the communication system, and wherein the first instant messaging application and the second instant messaging application are different applications;
receiving, by the first terminal, a selection of a first device identifier from the device identifiers, wherein a device corresponding to the first device identifier is a second terminal;
initiating, by the first instant messaging application, a first communication to the second user in response to a first operation in the first interface, wherein the first communication comprises a video call, a voice call, or a message; and
displaying, by the second terminal, a second interface of the second instant messaging application, wherein the first communication from a first user is displayed in the second interface, and wherein the first user is a user registered with the first instant messaging application on the first terminal, wherein the first instant messaging application is an RCS application, wherein the second instant messaging application is a MeeTime application, wherein the communication system further comprises a first server, a second server, and a third server, the first server corresponding to the first instant messaging application and supporting a first communication protocol, the second server corresponding to the second instant messaging application and supporting a second communication protocol, and the third server being connected to the first server and the second server, and wherein, before displaying, in the first interface, the device identifiers of the plurality of devices corresponding to the second user, the method further comprises:

sending, by the first instant messaging application, a third query request to the first server, wherein the third query request carries identification information of the second user, the third query request being used to request to query a device on which the second user is registered with or enabled the MeeTime application, and the third query request supporting the first communication protocol;

sending, by the first server, the third query request to the third server;

performing, by the third server, protocol conversion on the third query request to obtain a fourth query request that supports the second communication protocol;

sending, by the third server, the fourth query request to the second server;

determining, by the second server based on the fourth query request, the device identifiers of the plurality of devices on which the second user is registered with or enabled the MeeTime application;

sending, by the second server, a third query result to the third server, wherein the third query result supports the second communication protocol;

performing, by the third server, protocol conversion on the third query result to obtain a fourth query result that supports the first communication protocol, wherein both the third query result and the fourth query result indicate the device identifiers of the plurality of devices on which the second user is registered with or is enabled the MeeTime application;

sending, by the third server, the fourth query result to the first server; and sending, by the first server, the fourth query result to the first terminal.

17. A terminal device comprising:
a memory; and
a processor configured to execute a computer program stored in the memory, the computer program including instructions for performing the method according to claim 16.

* * * * *